(12) United States Patent
Deskins

(10) Patent No.: US 7,494,592 B2
(45) Date of Patent: Feb. 24, 2009

(54) PROCESS FOR COMBINING SOLIDS THICKENING AND DEWATERING IN ONE VESSEL

(76) Inventor: Franklin David Deskins, 23, Fairway Dr., Alexandria, IN (US) 46001

( * ) Notice: Subject to any disclaimer, the term of this patent is extended or adjusted under 35 U.S.C. 154(b) by 174 days.

(21) Appl. No.: 11/176,195

(22) Filed: Jul. 8, 2005

(65) Prior Publication Data
US 2006/0006114 A1 Jan. 12, 2006

Related U.S. Application Data

(60) Provisional application No. 60/585,854, filed on Jul. 8, 2004.

(51) Int. Cl.
C02F 1/56 (2006.01)

(52) U.S. Cl. .................. 210/712; 210/694; 210/715; 210/725; 210/747; 210/793

(58) Field of Classification Search .................. 210/283
See application file for complete search history.

(56) References Cited

U.S. PATENT DOCUMENTS

| 1,151,313 | A | * | 8/1915 | Wheeler | 210/293 |
| 2,302,450 | A | * | 11/1942 | Laughlin | 210/264 |
| 3,615,019 | A | * | 10/1971 | Early | 210/293 |
| 3,618,766 | A | * | 11/1971 | Morey | 210/745 |
| 3,847,808 | A | * | 11/1974 | Spohr | 210/747 |
| 4,624,604 | A | * | 11/1986 | Wagner et al. | 405/129.7 |
| 4,632,764 | A | * | 12/1986 | Riise | 210/702 |
| 6,051,137 | A | * | 4/2000 | Deskins | 210/283 |
| 6,193,889 | B1 | * | 2/2001 | Teran et al. | 210/609 |
| 7,160,465 | B2 | * | 1/2007 | Kirts et al. | 210/681 |

* cited by examiner

Primary Examiner—Peter A Hruskoci
(74) Attorney, Agent, or Firm—Fisher, Christen & Sabol

(57) ABSTRACT

Process involving repeatedly applying some of the liquid composition to the granular filter media to remove water from the liquid composition by passing through the granular filter media with the particulate solids collecting on top surface of granular filter media. Water is first allowed to fill from below to just above the top layer of the filter media. A non-porous liner is located on the inner, bottom surface of the container. A drain pipe, having small openings, is located on top of the liner in the valley. A porous layer of large filter media, with the drain pipe therein, is located in the bottom of the container. A grid having open passageways, with fine filter media therein, is located on top thereof. A layer of fine filtrate sand is located on top of the grid.

18 Claims, 31 Drawing Sheets

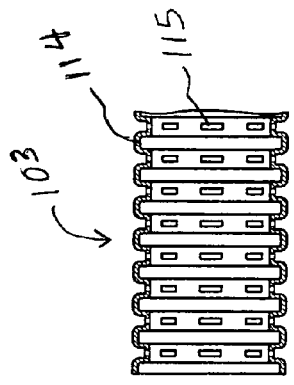
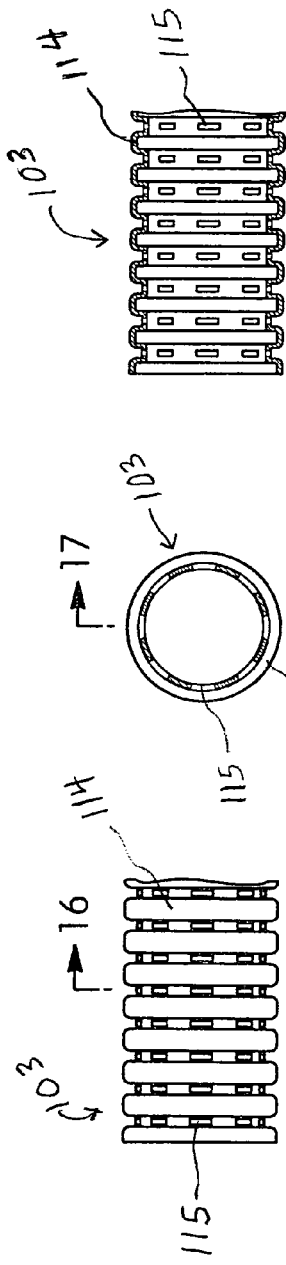
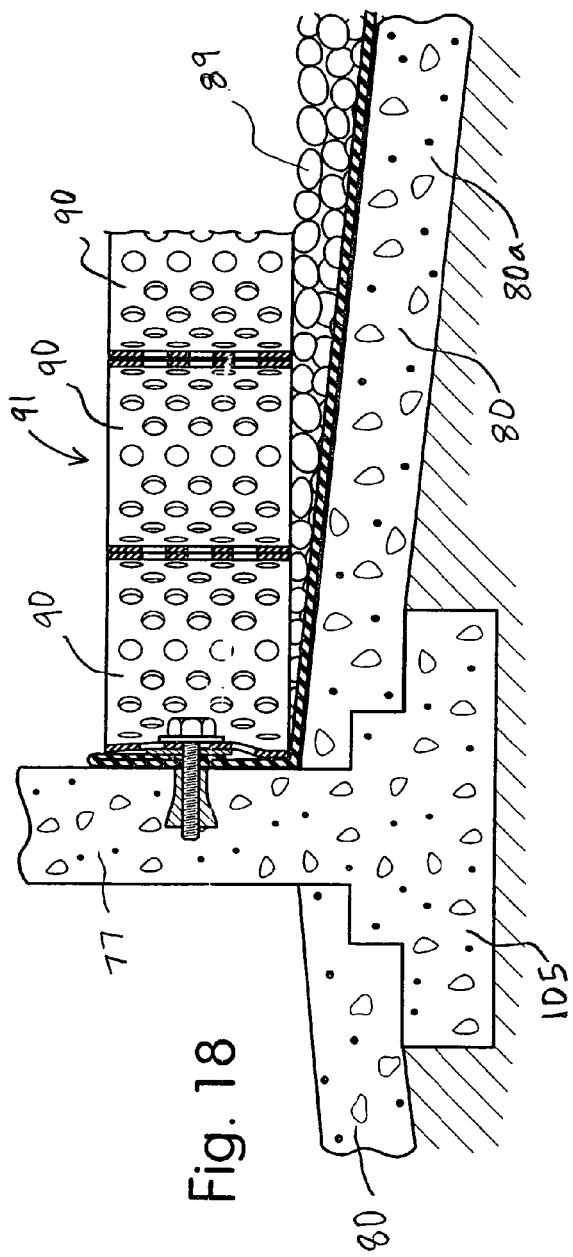

(PRIOR ART - PART A)

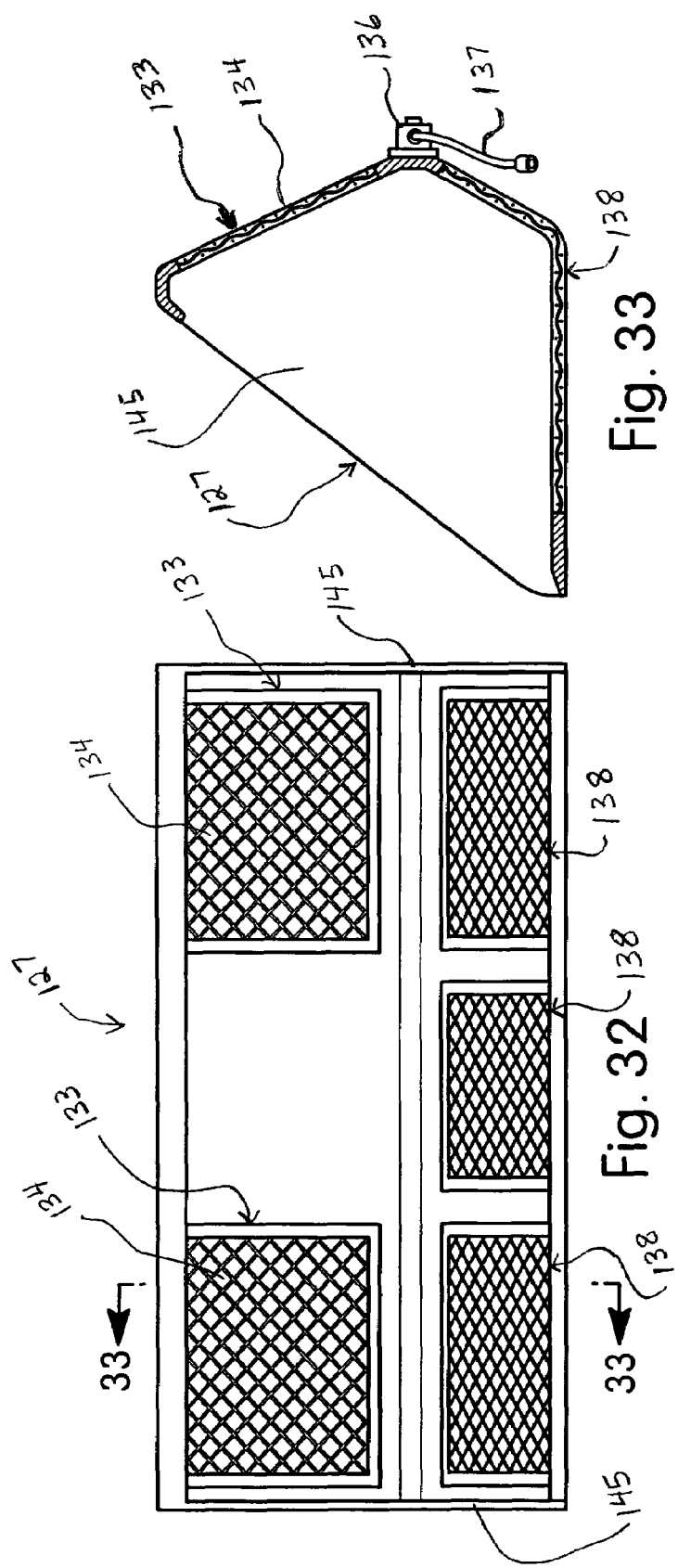
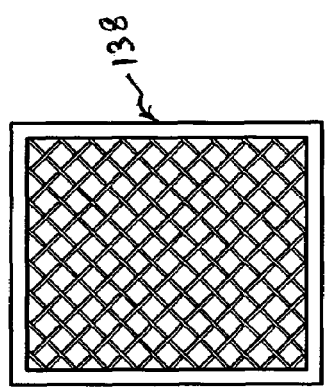
Fig. 33
Fig. 32
Fig. 32A

PROCESS FOR COMBINING SOLIDS THICKENING AND DEWATERING IN ONE VESSEL

This application has priority benefit of U.S. Provisional Application No. 60/585,854, filed on Jul. 8, 2004.

BACKGROUND OF THE INVENTION

1. Field of the Invention

The invention relates to processes for removal of turbidity and suspended solids from treated water from water treatment plants, and equipment to carry out the processes. The invention also relates to sewage and waste water dewatering processes and equipment to carry out the processes.

2. Background Art

According to the New Encyclopaedia Britannica, Micropaedia, Volume X, (1974), page 573, describes water purification as treatment consisting of one or more steps by which water is made safe and acceptable for use. Filtration is still the most widely used method of purification. In slow filtration, the water is allowed to pass through a deep layer of fine sand. Most of the impurities are removed by the top inch or two of sand, which is removed and cleaned from time to time or in modern plants is washed in place by special wash water. In rapid filtration plants, the water is treated with a coagulant, such as aluminum sulfate, ferric chloride, or ferric sulfate. This flocculates particles, carrying most suspended matter to the bottom in sedimentation tanks. After this preparation, the water is passed at a relatively rapid rate through small beds of coarse sand that are washed from time to time. Heavily polluted waters may be chlorinated both before and after filtration. Aeration, mixture of air with the water, is carried out if undesirable amounts of iron and manganese are present; they are held in solution in water only in the absence of oxygen.

The New Encyclopaedia Britannica, Macropaedia, Volume 19, (1974), page 651, discusses water treatment plants. Water that has been collected and conveyed to its point of use is treated to make it hygienically safe, attractive, and palatable, and economically suited for its intended uses before it is distributed. The term treatment may refer to a variety of processes, including long-period storage, aeration, coagulation, sedimentation, softening, filtration, disinfection, and other physical and chemical processes in varying combinations, depending primarily on the characteristics of the water source but also on intended use.

Long-period storage of water, which generally means storage in excess of one month, usually takes place in reservoirs or settling basins through which the water passes before it enters the treatment plant proper. Storage reduces suspended sediment and bacteria.

Aeration, the process of mixing air with water, is accomplished by contact bed or spray, cascade, multiple-tray, or air-injection aerators. Spray aerators force water through nozzles into the air. Cascade aerators consist of a series of steps over which the water falls. In multiple-tray aeration, water falls through nozzles in a series of vertically stacked trays. Contact beds are similar to multiple-tray aerators except that the vertically stacked trays are filled with gravel or some other contact media over which the falling water flows. Air-injection units consist of equipment to force small air bubbles through the water. Aeration is used primarily to reduce odors and tastes, to reduce hardness and corrosiveness by removal of carbon dioxide, and to eliminate iron and manganese.

Alum, sodium aluminate, ferrous sulfate with lime, chlorinated copperas, ferric chloride, ferric sulfate, and often other substances are added to the water, to aid coagulation. The addition of coagulants causes the colloidal, color, and mineral particles to agglomerate into a settleable floc. Coagulation is usually accomplished in two stages: rapid mixing of the coagulant with the water and extended slow mixing during which the settleable floc is formed. The floc is then settled out by gravity in settling basins. Coagulation and sedimentation reduce the bacteria content of the water and are particularly effective in reducing color and turbidity, while indirectly reducing odors and tastes. Some coagulants, however, may increase the hardness and corrosiveness of the water.

Softening is the process of removing calcium and magnesium from the water either by chemical precipitation or by ion exchange. The most widely used process is lime-soda softening, in which lime and soda ash are added to the water to cause calcium carbonate and magnesium hydroxide precipitation. Sedimentation follows the addition of chemicals to permit the precipitates to settle. After the addition of lime or lime and soda ash, the softened waters are unstable and require stabilization by recarbonation or other means.

In the ion-exchange process, water is passed through beds of ion-exchange resins or carbonaceous ion-exchange materials. Cation exchangers, which exchange their sodium ions for calcium or magnesium ions in waters, commonly are used. The action is reversible, and the cation exchangers are regenerated periodically with a salt solution. Both water-softening methods are effective, and the lime-soda process also reduces bacteria, turbidity, odors and tastes, and iron and manganese.

Water filtration includes slow-sand filtration, rapid-sand filtration, and microstraining. In slow-sand filtration, low turbidity raw water or settled water is passed directly into beds of fine sand underlain by gravel and an underdrainage system. The sand beds removed suspended matter from the water. Rapid-sand filters allow the water to flow through larger grain sand at much faster rates but are otherwise similar to slow-sand filters. For rapid filters to be effective, prior treatment of the water by coagulation and sedimentation usually is necessary. Rapid-filter beds may be made of silicas and crushed quartz, or crushed anthracite coal. Both slow and rapid filtration reduce color and remove iron and manganese, bacteria, and turbidity. Odor and taste are reduced as an indirect result of rapid-sand filtration. Modern water-treatment plan designs favor rapid-sand filters over slow-sand filters. Both types of filters require periodic cleaning.

Microstraining removes algae and other microparticles from water, usually prior to rapid-sand filtration. Microstraining can greatly increase the length of the rapid-sand filter runs. The microstrainer is a rotating-filter drum covered with a fine stainless-steel mesh having apertures of less than one micron in size. Water passes from the inner section of the unit outward, and the screen is continuously cleaned by a water spray at the top.

Chlorine is most commonly used for the disinfection of water, but ozone and ultraviolet radiation treatment are also used. Chlorine is applied both before filtration, the prechlorination, and as the final water treatment before distribution, the postchlorination. Most large treatment plants use liquid chlorine; usually it is added to the water in amounts that will ensure a small free chlorine residual throughout the water distribution system. Chlorination is effective in destroying bacteria and inactivating viruses as well as in reducing faint odors and tastes in water; but chlorine causes problems by combining chemically with organic compounds. In the presence of intense odors and tastes, chlorination cannot always be employed because it may produce unpleasant tasting by-products.

There are a number of special water-treatment processes in use. Copper sulfate is used for algae control. Activated carbon removes many organic chemicals and odors. Ammonia with chlorine is used for chloramine disinfection and odor control.

Efficiency and dependability are increased in modern water-treatment plants by automation and centralized control. A typical municipal water-treatment plant is shown diagrammatically in FIG. 29.

Since the 1974 articles there have been further development of water purification and water treatment plants.

Recent concerns over safety and trace contaminants in drinking water have driven the development and acceptance of membrane filter technology ranging from micro-filtration, ultra-filtration, nano-filtration, and reverse osmosis in which clarified water is pumped under pressure through large large bundles of small diameter (less than $\frac{1}{10}$ inch) hollow fibers contained within a collection housing. The fiber bundles are manufactured from a variety of polymeric material, such as, polysulfone or PVDF, which are permeable in the sub-micron range. Permeate (the water which passes through the fiber sidewall) is collected and sent to the distribution system. Reject water (the water and suspended solids, typically less than 0.5 percent, which will not pass through the filter membrane) is discharged as sludge for thickening and dewatering.

Continued increases in demand for potable water has led to the development of ballasted clarification (such as, Kruger's Actific™ process) which utilizes microsand as a seed for floc formation. The microsand provides surface area that enhances flocculation and acts as a ballast or weight. The resulting sand ballasted floc allows for clarifier designs with high flow rates and short retention times, resulting in system configurations that are $\frac{1}{5}$ to $\frac{1}{20}$ the size of conventional clarifiers. The sludge produced by ballasted flocculation is typically less than 0.1 percent concentration.

Sewage is composed of the liquid and water-carried wastes from residences, commercial buildings, industrial plants, and institutions, together with any groundwater, surface water and storm water which may be present. The terms "wastewater" and "sewage" are sometimes used interchangeably herein.

However, wastewater can be defined as water containing impurities, as suspended solids, resulting from industrial processes.

The composition of sewage depends on its origin and the volume of water in which the wastes are carried. Sewage which originates entirely from residential communities is made up of excreta, bathing and washing water, and kitchen wastes. Other wastes can be present from rural/agricultural sources and/or industrial or commercial establishments.

Modern sewage treatment is generally divided into three phases: primary, secondary, and tertiary. Each of these steps produces sludge, which can be disposed of or used for various purposes.

Primary treatment, or plain sedimentation, removes only the settleable solids from sewage. A modern system for primary treatment entails collecting the sewage, conveying it to a central point for treatment, using both screens to remove large objects and grit chambers to remove grit, and using primary sedimentation tanks to remove the suspended settleable solids. This type of system produces about one third of a gallon of wet sludge per person per day, and facilities for handling and disposing of the sludge are also needed. Primary treatment reduces the concentration of suspended solids by about 60 percent and reduces the BOD (biochemical oxygen demand) by about 35 percent.

Secondary treatment involves the addition of a biological treatment phase following plain sedimentation. At best, this treatment removes about 85 to 95 percent of the organic matter in sewage. It has little effect on dissolved materials or on the nutrients that stimulate the growth of algae in the receiving waters. It also discharges all of the nutrients and dissolved solids, as well as any contaminants which may be added to the water by industrial plants.

There are two basic methods often used in modern secondary treatment, that is, the trickling filter and the activated-sludge processes. In small communities, secondary treatment is sometimes accomplished by either the trickling-filter method or the contact bed method, but usually used is the sand filter method. In larger communities, secondary treatment is generally accomplished by the activated-sludge process.

Sand filters are beds of fine sand, usually 3 feet (1 meter) deep, through which the sewage slowly seeps. As it seeps through the sand, the organic matter is decomposed and stabilized by the microorganisms in the sewage. Sand filters require about 4 acres (1.6 hectares) of sand beds for each thousand people. Because of this large space requirement, sand beds have obvious disadvantages. Also, the time required for the sludge to be formed and dried usually takes weeks. This long drying time means that large surface areas of sand beds have to be used to achieve drying with the attendant large cost of constructing, operating and maintaining the sand beds. Rain adds time to the drying function of sand beds, since the sand beds usually are without any roof or other top covering. Covered sand beds require less area than do uncovered beds but still take weeks to achieve drying and have a higher construction cost. Nowadays, about 90 percent of smaller municipalities use sand beds to dewater sewage coming from primary treatment units. The main purpose of sand beds is the reduction of the water content in the primary-treated sewage.

A contact bed, composed of many layers of stone, slate or other inert material, provides a relatively large surface area for the growth of microorganisms. It operates on a fill-and-draw basis, and the organic matter delivered during the fill period is decomposed by the microorganisms on the bed. The oxygen required by the microorganisms is provided during the resting period, when the bed is exposed to the air.

In the trickling filter system, the sewage is applied to the filter through rotary distributors and, then, is allowed to trickle down over large stone or plastic beds that are covered with microorganisms. The beds are not submerged and, thus, air can reach the organisms at all times. The area requirements for trickling filters are about 5 to 50 acres (2 to 20 hectares) per million people.

In the activated-sludge process, heavy concentrations of aerobic microorganisms, called biological floc or activated sludge, are suspended in the liquid either by agitation which is provided by air which is bubbled into the tank or by mechanical aerators. Final sedimentation tanks are needed to separate the floc material from the flowing liquid. Most of the biologically active sludge, then, is returned to the aeration tank with which to treat the incoming water. The high concentration of active microorganisms which can be maintained in the aeration tank permits the size of the treatment plant to be relatively small, about 1 to 5 acres (0.1 to 2 hectares) per million population.

Tertiary treatment is designed for use in areas either where the degree of treatment must be more than 85 to 95 percent or where the sewage, after treatment, is reused. It is mainly intended to further clean or polish secondary treatment plant effluents by removing additional suspended material and by lowering the BOD, generally by filtration. This polishing, however, has little impact on the dissolved solids, including the nutrients, synthetic organic chemicals, and heavy metals. To eliminate these constituents of sewage, other methods of treatment have been devised. These processes include coagulation and sedimentation, precipitation, adsorption on activated carbon or other adsorbents, foam separation, electrodialysis, reverse osmosis, ion exchange and distillation.

Sludge is the semiliquid mass removed form the liquid flow of sewage. Sludge will vary in amount and characteristics with the characteristics of sewage and plant operation. Sludge from primary treatment is composed of solids usually having a 95 percent moisture content. The accumulated solid materials, or sludge, from sewage treatment processes amount to 50 to 70 pounds (22 to 31 kg) per person per year in the dry state or about one ton (0.9 metric ton) per year in the wet state. Sludge is highly capable of becoming putrid, and can, itself, be a major pollutant if it is not biologically stabilized and disposed of in a suitable manner. Biological stabilization may be accomplished by either aerobic or anaerobic digestion. After digestion, sludge-drying beds are usually used.

In modern sewage treatment plants, mechanical dewatering of sludge by vacuum filters, centrifuges, or other devices is becoming widespread. The dewatered sludge, then, may be heat dried, if it is to be reclaimed, or it may be incinerated. In large communities where large amounts of sludge are produced, mechanical dewatering and incineration are commonly practiced. But there are many smaller communities, rural areas, etc., which have economic constraints and which use the sand bed method to dewater sewage. There is a great need to make the sand bed method more economical by reducing the time for drying waste material (sludge) from the primary-treated sewage effluent and by reducing the time for drying the sludge. Reduced drying time would allow reduction of the size of the sand beds needed.

Early sludge treatment schemes included plain sedimentation, followed by chemical precipitation or sedimentation aided by flocculation chemicals. Chemical precipitation fell into disuse, but may be making a comeback. Nowadays, chemicals are often added to the sewage to promote the coagulation of the finer suspended solids, so that these solids become heavy enough to settle in sedimentation in the primary treatment stage. Typical chemical coagulants in the flocculation of sewage are alum, polymers, ferric sulfate, ferric chloride and lime.

Chlorine is often used to minimize odors from sedimentation tanks and in the final effluent as a disinfectant.

U.S. Pat. No. 5,248,416 (Howard) discloses a sewage treatment system which presents a main flow line and a recirculating line, the former for floc which has appreciated in size due to the addition of a polymer and to passage through an area of agitation/turbulence, and the latter for the return of small sized floc to the agitator/turbulence area for size increase. The passageways of the system include movable flaps which serve recirculation purposes, and a ledge or flutter for current creation and floc build-up. Raw liquid sewage enters the system, whereas the outlet leads to a belt press and/or a dry bed to cake the resulting sludge. More specifically, the apparatus for flocculating fluids containing suspended solids comprises conduit means for conducting the fluid to an outlet in the conduit means. There is means introducing a flock-producing agent into the fluid in the conduit means, a vertical drop mounted ledge means in the vertical drop in the conduit means downstream from the means introducing the flock-producing agent, and a movable mounted ledge means in the vertical drop which serves to increase turbulence and to increase the size of accumulating floc in the fluid. There is a vertical rise in said conduit means, downstream from the vertical drop leading to the outlet. The conduit means includes means connecting the vertical drop to the vertical rise, and there are circulation passageway means connecting the vertical rise to the vertical drop for recirculating smaller size flock to the vertical drop.

In Howard, it is said that a particular feature is that no mixer equipment is required. Polymers are injected into the raw sewage, causing water to separate from the raw sewage during the procedure, resulting in floc build-up. The latter is caused when the polymers begin dissolving with the result that a film of concentrated polymer solution builds up about the polymer particles, forming aggregates or agglomerations, identified as "flocks". Turbulence is a key factor, where such is said to be accomplished through a ledge (which flutters) located in the vertical drop conduit and a series of movable flaps disposed within the recirculating conduit. The singular stated purpose of the Howard scheme is to create flock, i.e., solids with a minimum of water content, through separation. Restated otherwise, the Howard scheme, through turbulence or tumbler-mixer action, is said to create additional floc (of a larger size) which goes to output, whereas smaller floc is caused to recirculate said increase, thereby, in size for repeated passage to output.

The Sarasota, Fla. Public Utility Company purchased one vacuumed assist drying bed from USEP (Company). The process consisted of walls, concrete floor with grooves, and a sealed down porous block tile consisting of small stones with epoxy to hold together with a smaller granular material on top. The grooves were used to collect the water when the vacuum was applied. This is similar to the surface of a cement building block. As the utility scraped sludge from the surface, the tiles wore down to the stone and some were completely removed. A thin layer of small stone was placed to level out the bed. A GeoWeb stabilization material was placed directly on the original plates and placed stone. Sand filled the stabilization material and several inches above. By installing the stabilization material and sand the utility vehicle was able to drive on the beds. The beds were decommissioned in 1996. (See FIGS. 27 and 28.)

U.S. Pat. Nos. 6,051,137, 5,770,056, 5,660,733, 5,683,583, 5,725,766 and 5,611,921 disclose a process of dewatering treated sewage, and equpiment and installation used therein or therewith. Such process is usually referred herein as the previous Deskins process-scheme. The previous Deskins process-scheme includes mixing the sewage with a coagulant or flocculant aid, usually activated polymer. The sewage is then mixed and flocculated at conditions which involved extensive mixing turbulence of the sewage and whereby part of the sewage is recycled so as to be again subjected to such mixing and flocculating. Flocks form the solid particles in the sewage. The pH of the sewage is chemically adjusted into the basic pH range or to a higher basic pH. The sewage is applied to a sand bed whereby the flocculated solids in the sewage are separated from the liquid in the sewage, by collecting on the top of the sand bed. The flocculated solids located on the top of the sand bed are air dried. The dried flocculated solids are removed from the top of the sand bed.

The first step/stage in the previous Deskins process-scheme used an inline polymer mixing-feeding (injection) system to incorporate activated polymer into the sewage flow line (see FIG. 25). The inline polymer preparation system eliminated this need for batching tanks, mixers and polymer transfer pumps. The inline polymer system could be a conventional one or an inline polymer mixing-feeding system of the previous Deskins process-scheme. The inline polymer system (chemical pump) of activated precise amounts of neat polymer and water, then metered the fully activated stock solution to the point of use without the need of transfer pumps.

The polymer is an emulsification of long chain organic polymer in oil. The water and mixing opens up of uncoils the polymer to expose charge sites in the polymer chain.

Coagulants or flocculants, such as, alum. ferric sulfate, ferric sulfate, ferric chloride and lime, could be used in place of the activated polymer in the sewage flow line to coagulate or flocculate the solids in the sewage. These coagulants or flocculants cause formation of an insoluble precipitate which adsorbs colloidal and suspended solids.

The second step/stage in the previous Deskins process-scheme used an inline mixing flocculator (see FIG. 24). An inline mixing-flocculating device was used to enhance the chemically induced liquid-solids separation in the sludge dewatering process utilized at most wastewater treatment plants. The flocculator was used in any type of mechanical dewatering scheme that used a chemical as a coagulant or flocculant aid. The overall output and efficiency of the dewatering process was greatly increased by the thoroughness of the flocculating process. Prior art sludge production normally was 14,000 to 16,000 gallons of dewatered sludge per gallon of polymer; the mixer-flocculator unit provided a reduction of 40 to 60 percent in polymer consumption.

The third step/stage in the previous Deskins process-scheme was a chemical induced pH adjustment of the sewage exiting the mixer-flocculating system. Liquid caustic, lime or other suitable base was injected into the discharge side of the mixer-flocculator unit and the temperature of the water to the inline polymer system was increased, thereby increasing the liquid/solids pH balance.

As the liquid/solids content exited the inline mixer-flocculator unit, an electronic driven diaphragm pump or gear driven pump pumped liquid caustic or lime into the discharge line of the flocculator-mixer unit. The pH of the sludge was increased to 12 by the chemical. The pH of the sludge remained at 12 for 72 hours, and, during this period of time, the temperature reached 52° C. and remained at that temperature for at least 12 hours. At the end of the 72 hours period during which the pH of the sludge was above 12, the sludge could then be air dried to achieve a percent solids of greater than 50 percent. The liquid caustic or lime pump could be present on a transportable dewatering trailer with the mixer-flocculating system and the polymer feed system and, thus, was easily transported.

The fourth step/stage in the previous Deskins process-scheme used a sand grid cell in a sand bed used for dewatering sludge (see FIG. 1). The sand-cell was grid used to stabilize filtration media in any new or existing sand drying bed. It was preferably manufactured of heavy-duty polyethylene. Preferably the sand grid was honeycomb shaped or similar shaped. The fixed media (i.e., grid) was best installed in the filtration sand about six inches below the surface. Under load, the sand-cell generated powerful lateral confinement forces and sand-to-cell or stone-to-cell frictions. This process created a bridging with high flexural strength and stiffness. The sand-cell greatly enhanced the dewatering process. Plant operators could drive an end or front loader or tractor over the entire bed thereby significantly reducing cleaning time and eliminating expensive manual labor. Surface and subsurface bed stabilization was achieved using the invention grid. This allowed for excellent manueverability of equipment, eliminated surface and subsurface, compaction of the sand media and produced an excellent drainage environment, and 100 percent saturation and drainage within about 10 minutes from start to pouring of the sewage resulted from the use of the grid.

This step of the previous Deskins process-scheme involved use of a sand-cell media to stabilize filtration sand/media in any new or existing sand drying bed (best constructed of concrete).

A standard sand-cell section could have nominal dimensions of eight feet wide by twenty feet long by six inches deep. However, a standard sand-cell section could have any length, width and height to fully fit into the dimensions of the sand cell in case. All of the individual sand-cells forming a sand-cell section, generally, were uniform in shape and size. Preferably, the individual sand-cells were about 6 inches wide, 6 inches long, about 6 inches deep, hexagonal in shape and, together, formed a honeycomb. The honeycomb is one of the strongest, yet lightest, shapes found in nature. A standard sand-cell section could be made from high-density polyethylene plastic, any other suitable plastic or resin, stainless steel, fiberglass, concrete, wood, or any other suitable metal or material, or any form of fabricated steel, preferably high-density polyethylene plastic.

The sand-cell media was advantageously installed in the filtration sand or stone with its top surface most preferably about six inches, preferably not more than 12 inches or less than 2 inches, below its surface of the sand. Under load, the sand-cell media generates powerful lateral confinement forces and stone or sand to cell frictions. This process created a bridging with high flexural strength and stiffness.

The benefits of using sand-cell media were stated to be numerous. A subsurface which includes sand-cell media does not compact which allows the free water to pass quickly through the media. The high flexural strength and stiffness of a subsurface which includes sand-cell media allowed equipment such as end loaders to drive directly onto the entire sludge drying bed without destroying the integrity of the filtration sand. This, in turn, significantly reduced the loading and cleaning time, and eliminated expensive manual labor. Other benefits of using the sand-cell media were stated to include: lateral slippage or shear of the filtration media was prevented; filtration media replacement costs were reduced; economical standard washed sand or "P" gravel for rapid dewatering could be used (as opposed to conventional drying bed materials); square foot installation costs were reduced by ninety-four percent over the fixed media system; and total maintenance costs were reduced by more than seventy-five percent.

With regard to the previous Deskins process-scheme of FIG. 1, Enclosure 849 contains a sand bed. Onto layer of non-porous material (850), e.g., concrete, a layer of porous material (853) is positioned. Porous material (853) is used as a filter media and usually stone, crushed rock, ceramic shapes, slag and plastics of 1 to 6 inches, practically 2 to 4 inches, in size are used. Stones or pebbles are preferred. At least one—usually more than one—projection of porous material (854) extends from the porous layer (853) into the layer of non-porous material (850). Embedded in each projection channels (848) in porous material (854) is at least one non-porous pipe (855) having at least one hole into which liquid can drain. A layer of sand (857) is positioned above the layer of porous materials (853). The sand-cell media sections (865) are positioned above this layer of sand (857). Sand is located in the passageways in the sand cell grid. Above each sand-cell media section (865) is placed in a layer of sand (861). This layer of sand (861) is usually, though not necessarily, at least six inches in depth.

Walls (851) surround on all four sides of an area having one or more sand-cell media sections. One wall (851) is shorter to allow a front loader or the like into the enclosure. Each surrounding, dividing wall (851) extends upward from one or more footing supports (852) which are positioned, at least partially, in the layer of non-porous material (850). The top of each dividing wall (851) extends above the layer of sand (861) overlaying the sand-cell media section(s). On the top of each dividing wall (851), which runs between two enclosure areas having the sand-cell media sections, is a portable nozzle which is used to pour sewage into the enclosures.

Each sand-cell media section (865) is made up of one or more sand-cells (858) having the same shape and size. Typically, the sand-cell media section (865) is made up of honeycomb-shaped sand-cells (858) which are joined together in a honeycomb formation (i.e., each sand-cell which is not in an outer layer, where it intersects another sand-cell, it intersects three other sand-cells) channel runs through the interior of each sand-cell.

Sewage is poured through the channel into one or more enclosures (849) for the sand beds. The liquid permeates the outer sand layer, flows through the sand in the channels in the grid (865) in the centers of the sand-cells, permeates the layer of sand beneath the sand-cell media and permeates the pebble layer beneath the layer, leaving the collected sludge solids on top of the outer sand-layer to dry from the sun and air.

The fifth step/stage in the previous Deskins process-scheme used a sludge retriever (see FIG. 13) to separate the dried sludge layer from the sand in the sand bed. The sludge retriever was designed to fit any adequately rated (front-end) loader and was powered by the hydraulic system of the loader. Easily operated by one person, the retriever's rotary drum of the efficiently broke up (chops) solid waste and propelled it into a hopper. The sludge was chopped into very small granular particles, enhancing transportation and handling cost. The unique combing action of the rotating drum (preferably having 3-inch adjustable tines) not only removed sludge without significantly disturbing the filtering sand, it also leveled the bed surface to promote uniform drying. Each bucketload of sludge removed by the sludge retriever usually only yielded an insignificant amount of sand for precision sludge clean-up. The sludge retriever (automated) made sludge removal and drying bed preparation a one-man, one-machine operation. It also leveled and aerated the sand bed for the next pouring of sewage into the sand bed.

The sludge removal attachment was capable of removing dried wastewater sludge from sand drying beds. The implement was also capable of being attached to a front end loader. The mechanism had, for example, a two cubic yard bucket, constructed of ¼ inch steel, and a shaft-type rotary drum having multiple three inch tines. The unit was furnished with an expanded steel cover for the rotor and bucket. Rotor end plates were ½ inch steel minimum. The rotary action of the drum accomplished several functions. First, it removed the sludge layer. Second, it simultaneously leveled the surface of the drying bed. Third, by reversing the direction of the rotary drum, the sand bed could be aerated to a depth of three inches. Basically, the sludge was removed by passing the unit over the drying bed and sweeping up the dried sludge.

Alternatively, the sludge removal attachment (retriever) was capable of removing air-dried wastewater sludge from the sand bed. The unit was a bucket or scoop type device. Sludge was removed by passing the unit over the drying bed and scooping up the dried sludge.

Referring to FIG. 36, a previous waste water treatment installation of Deskins is shown. The installation used a sloped trench. There was a shallow rock in the given area and the engineer was trying to prevent a lot of blasting. We maintained a trench however shallow and 3 layers of stone. The third layer from the bottom housing the panels with 6 inch of sand on top.

BROAD DESCRIPTION OF THE INVENTION

An object of the invention is to overcome the disadvantages and problems of the prior art processes for removing turbidity and suspended solids from treated water from water treatment plants. Another object of the invention is to overcome the disadvantages and problems of the prior art sewage dewatering processes. Other objects and advantages of the invention are set out herein or are obvious herefrom to one skilled in the art.

The objects and advantages of the invention are achieved by the sewage dewatering treatment process of the invention and the equipment, devices and apparatus used therein.

The invention involves a process-scheme for removing turbidity and suspended solids from treated water from water treatment plants. The invention also involves a process-scheme for dewatering sewage, usually previously subjected to primary treatment, to obtain dried sludge. Solids are dissolved, suspended, etc., in the liquid sewage.

A water treatment plant uses any application in which water quality is improved through any combination of aeration, oxidation, precipitation, sedimentation, flocculation, clarification and/or filtration, the purpose of which is to render the treated water suitable for use in any or all of the following: industrial, manufacturing, food processing, animal consumption, cooling pulp and paper making, chemical processing, pharmaceutical manufacturing, or potable water for human consumption.

In the such process(es), pretreatment in the form of aeration and/or oxidation causes some dissolved compounds to revert to a solid state and through the addition of chemical coagulants or flocculants to aggregate into "flocs" of sufficient mass to precipitate in a clarifier (clarification). Periodically, this accumulated sludge is drawn-off (clarifier blow-down) for further processing by thickening and dewatering. The clarified water is pumped to filtration where it passes through a medium (sand, anthracite, granular activated carbon, or a membrane filter) where solids which failed to precipitate in the clarifier are captured and extracted when the filter medium is cleaned (back-flushing or backwashing). The sludge generated by both clarifier blow-down and filter backwash is dilute (less than 1.0 percent concentration) and not amenable to mechanical dewatering. This dilute sludge requires an intermediate process (thickening) before it can be dewatered.

Traditional approaches to the handling of dilute solids depends on first thickening by means of a static thickener, DAF or other mechanical methods followed by dewatering such as centrifugation, filter press, or Deskins QuickDry™ Filter, and finally disposal of the dried residual solids.

The invention constitutes a unique process for collecting, thickening, dewatering and disposal of dilute solids with total filtrate recovery, closed loop cycle capturing rain water and adding to the effluent recovery. All of this invention process is in a single procedure, that is an advance over the Deskins Quick-Dry™ Filter Process (see the disclosure in U.S. Pat. Nos. 6,051,137, 5,725,66, 5,660,733, 5,770,056, 5,683,583, and 5,611,921), that involves procedures, apparatuses and control technologies.

The resultant invention process, called the Deskins Backwash Recovery System, with high rate thickening and dewatering technology replaces traditional thickening and dewatering equipment. The Deskins Backwash Recovery System invention advance over Deskins Quick-Dry™ Filter with special cleaning in place (pre-cleaning), a decant control process to provide the capacity to handle large volumes of dilute solids in water through a small filter (vessel). In this process, a Deskins Quick-Dry™ Filter is modified by the installation of a control valve on the filter's underdrain, a level control system, decanting methods, and a reduced media profile. The filter is a sealed vessel on the walls, entrance and exist ramps and bottom. Anchors around the entire parameter of the filter fastens the Deskins Drainage Panel™ in a permanent position.

Dewatering sludge at wastewater treatment plants has traditionally been a major operational concern. Most large operations use mechanical filter presses to efficiently dewater their sludge. For smaller operations this equipment is too expensive and too large for their needs. Therefore, small facilities rely on said filter drying beds for sludge dewatering. This is an excellent method to process sludge; however, most beds were designed without inline dewatering (liquid-solid-separation) or an easy and automated way to remove dried sludge. Expensive time-consuming manual labor has been a tremendous burden to plant operation. The invention process and equipment solves the old sludge bed problems. With simple and easy modifications of existing beds, old non-productive beds can be upgraded to good dewatering devices. The invention process and equipment allows any wastewater treatment plants to change their sludge build-up problem to a modern and cost effective method to dewater, dry and remove sludge.

The invention involves the process of dewatering a composition composed of water and particulate solids. The granular filter media is described below. The granular filter media is usually first pre-cleaned by pushing water up through it to the top surface thereof. The solids left in the filter media come to the surface thereof. The process includes applying at least some of the composition to the granular filter media of the dry cell, filter or bed of the invention whereby the water is removed from the composition by passing of the water through the granular filter media of the dry cell, filter or bed with the particulate solids in the composition collecting on the top surface of granular filter media. The water level is lowered to just above the top of the filter media each time, with solids collecting on top of the filter media. These thickening stages are terminated, the water is allowed to drain through and out of the filter media to leave the solids on top of the filter media. Preferably the applying the composition is done at least twice. More preferably the applying the composition is done five or six times. The solids are allowed to dry in place and are then removed/retrieved.

The invention involves the process of dewatering a composition composed of water and particulate solids where the process includes the sequence of applying the composition to the granular filter media of the dry cell, filter or bed of the at least two containers of the invention whereby the water is removed from the composition by passing of the water through the granular filter media of the dry cell, filter or bed with the particulate solids in the composition collecting on the top surface of granular filter media.

The invention also involves the process of dewatering a composition composed of water and particulate solids where the process includes:
   (a) mixing the composition with a coagulant or flocculant aid;
   (b) mixing and flocculating the composition from step (a), to provide flock-rich composition;
   (c) chemically adjusting the pH of the flock-rich composition of step (b) into the basic pH range or to a higher basic pH;
   (d) applying at least some of the flock-rich composition of step (c) to granular filter medium of a granular filter media dry cell, filter or bed, whereby the water is removed from the composition by passing of the water through the granular filter media of the dry cell, filter or bed with the particulate solids in the composition collecting on the top surface of the granular filter media, and repeating the application, and then dewatering; and
   (c) the particulate solids on the top surface of the granular filter media are dried (or allowed to dry), and the dried particulate solids are removed from the top surface of the granular filter media.

The invention involves a granular filter media dry cell, filter or bed for dewatering a composition composed of water and particulate solids. The process includes a non-porous container that has an exit for liquid and has side walls and a bottom. The bottom has two complementary portions that slant downward toward each other so as to form a valley or depression where the two complementary portions meet. A non-porous liner is located on the inner surface of the bottom. A drain pipe is located on top of the liner in the valley or the depression, and one end portion of the drain pipe extends through the exit. The remainder of the drain pipe has a multitude of small openings around at least a major portion of the circumference thereof.

A porous layer of a large filter media is located in the bottom of the container with the drain pipe being located in the layer of large filter media. A grid having open passageways is located on top of the layer of the large media. A fine filter media is located in the open passageways of the grid. A layer of filter sand is located on top of the grid.

Preferably the liner extends up at least a portion of the side walls of the container.

Preferably at least one means for inserting water into the container is located on or above at least one side wall of the container. Also preferably at least one means for water insertion is located on each of two opposing walls of the container.

Preferably there is means for removing water located on top of the sand layer. Also preferably the means for water removal is a device located on one side wall of the container, and the device is means capable of being moved up or down the side wall.

Preferably the valley or depression is slanted towards the exit of the non-porous container.

Preferably the composition comprised of water and particulate solids is treated sewage.

The invention involves a combination of granular filter media dry cells, filters or beds for dewatering a composition comprised of water and particulate solids. The combination comprises at least two of the non-porous containers of the invention.

Preferably the at least two of the non-porous containers are aligned in line with each other, and adjacent non-porous containers have a common side wall. Also preferably the at least two of the non-porous containers comprise three of the non-porous containers.

Preferably, for each of the containers, the liner extends up at least a portion of the side walls of the container.

Preferably, for each of the containers, a porous layer of a large filter media is located in the bottom of the container with the drain pipe being located in the layer of large filter media. Preferably a grid having open passageways is located on top of the layer of the large media, a fine filter media is located in the open passageways of the grid, and a layer of sand is located on top of the grid.

Preferably, for each of the containers, at least one means for inserting water into the container is located on or above at least one side wall of the container. Also preferably, for each of the containers, at least one means for water insertion is located on each of two opposing walls of the container.

Preferably, for each of the containers, there is means for removing water located on top of the sand layer. Also preferably, for each of the containers, the means for water removal is a device located on one side wall of the container, and the device is means capable of being moved up or down the side wall.

Preferably, for each of the containers, the valley or depression is slanted towards the exit of the non-porous container.

Preferably, for each of the containers, the composition comprised of water and particulate solids is treated water from a water treatment plant.

The processes, equipment, devices, granular filter media dry cells, filters and beds, etc., of the invention can also be used to process primary-, secondary- and tertiary-treated sewage, for example.

U.S. Pat. Nos. 6,051,137, 5,770,056, 5,660,733, 5,683,583, 5,725,766 and 5,611,921 disclose a process of dewatering treated sewage, and equipment and installation used therein or therewith, and the pertinent disclosure in such patents is incorporated herein by reference. Such process is usually referred herein as the previous Deskins process-scheme. The previous Deskins process-scheme includes mixing the sewage with a coagulant or flocculant aid, usually activated polymer. The sewage is then mixed and flocculated at conditions which involved extensive mixing turbulence of the sewage and whereby part of the sewage is recycled so as to be again subjected to such mixing and flocculating. Flocks form the solid particles in the sewage. The pH of the sewage is chemically adjusted into the basic pH range or to a higher basic pH. The sewage is applied to a sand bed whereby the flocculated solids in the sewage are separated from the liquid in the sewage, by collecting on the top of the sand bed. The flocculated solids located on the top of the sand bed are air dried. The dried flocculated solids are removed from the top of the sand bed.

BRIEF DESCRIPTION OF THE DRAWINGS

In the drawings:

FIGS. 5 and 5A are side elevational views of a cross-sectional view in FIG. 4, with the granular filter media present, of the composition pre-cleaning step in a preferred embodiment of the invention;

FIG. 15 is a side elevational view of the ribbed-perforated drain pipe;

FIG. 16 is a vertical cross-sectional view of the ribbed-perforated drain pipe along line 16-16 in FIG. 15;

FIG. 17 is a vertical cross-sectional view of the ribbed-perforated drain pipe along line 17-17 in FIG. 16;

FIG. 18 is a partial cross-sectional view of the container showing the position and attachment of the grid;

FIG. 32 is a front elevational view of the bucket of the invention with screens;

FIG. 32a is a top view of the screen that can be used in place of the bars in FIG. 30;

FIG. 33 is a vertical cross-sectional view of the bucket along line 32-32 in FIG. 32;

DETAILED DESCRIPTION OF THE INVENTION

Figure 2:
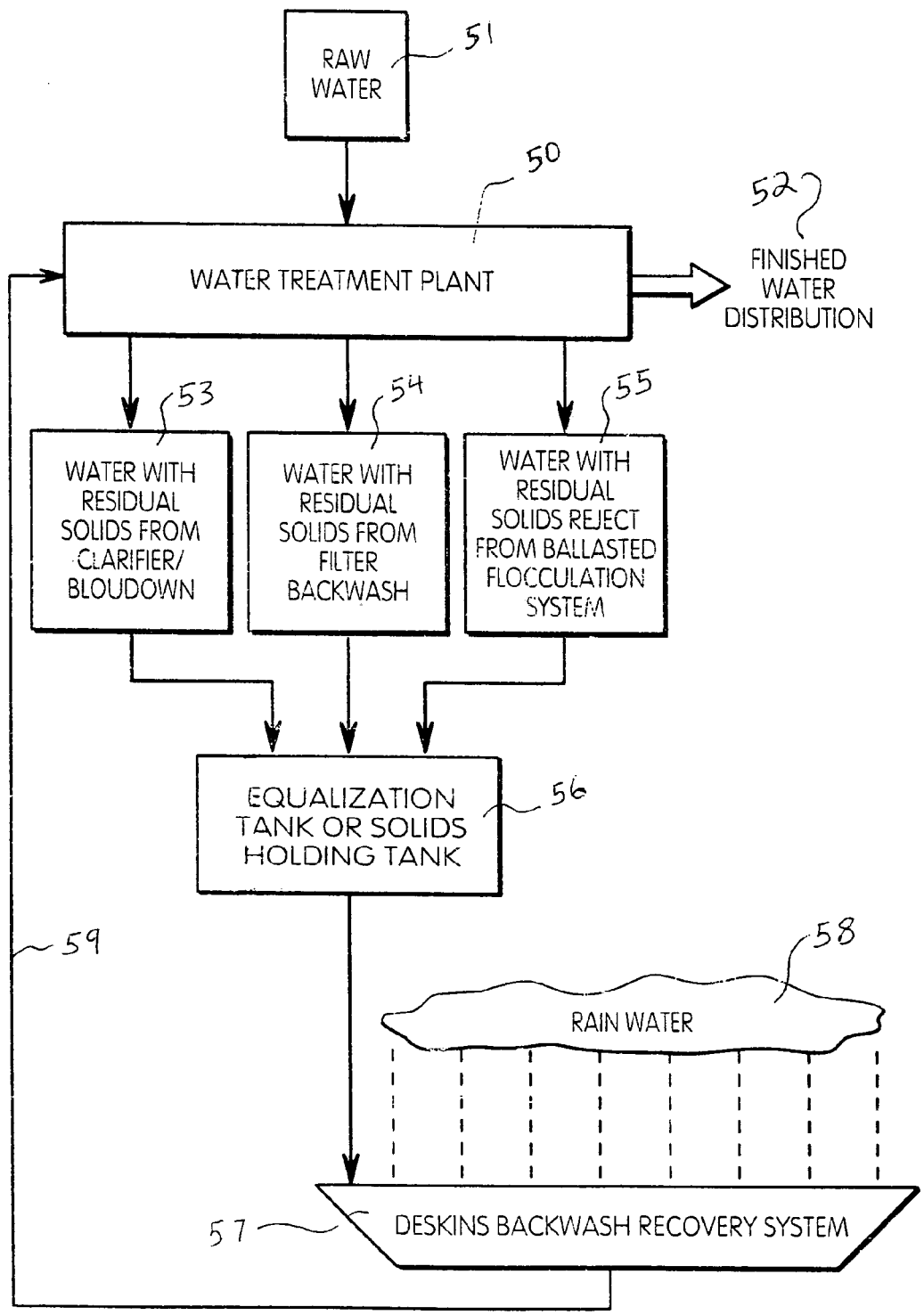
FIG. 2 is a schematic diagram of the steps or stages in a preferred embodiment of the invention processes/methods.

The overall scheme of the invention as regards treatment of water from a water treatment plant (50) to reduce the turbidity thereof and residual solids therein is shown in FIG. 2. Raw water (51) is passed to water treatment plant (50) for treatment that is described in detail alone in the Background Art section. Finished water is distributed (52) to users from water treatment plant (50). Water (53) with residual solids from the clarifier/blowdown, water (54) with residual solids from filter backwash, and water (55) with residual solids reject from ballasted flocculation system, all three treated water being from water treatment plant (50), are sent to equalization (EQ) tank (56) or solids holding tank (56).

Water to be treated from equalization tank (56) is passed for treatment into the invention Deskins backwash recovery system (57). The water from water treatment plant typicaly has a turbidity of 50 to 1,500 NTU. The Deskins backwash recovery system (57) treats such water so that it has a turbidity of 2 NTU or less. Such treated water is returned (line 59) to water treatment plant (5).

An advantage of the invention Deskins backwash recovery system (57) is that it catches rainwater (58) that falls in the containers/enclosures (57) and allows such rainwater (58) to be saved and passed on to water treatment plant (50). The amount of rainwater (58) retained and passed to the local water treatment plant (50) can often be quite significant in amount (volume) as the total of containers/enclosures (57) sometimes covers a substantial number of acres.

Figure 3:
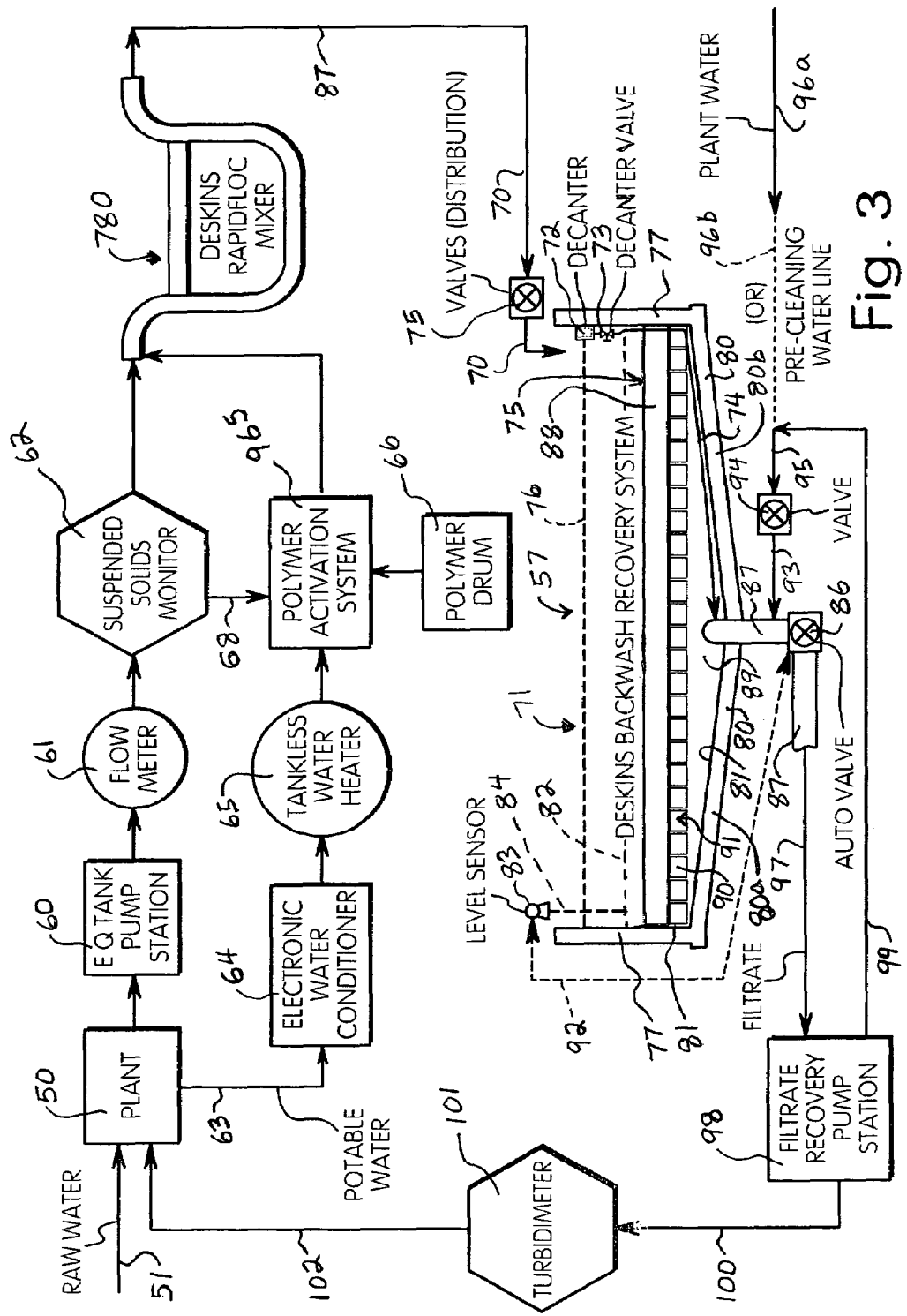
FIG. 3 is a detailed schematic diagram of a preferred embodiment of the invention process/method.
Figure 4:
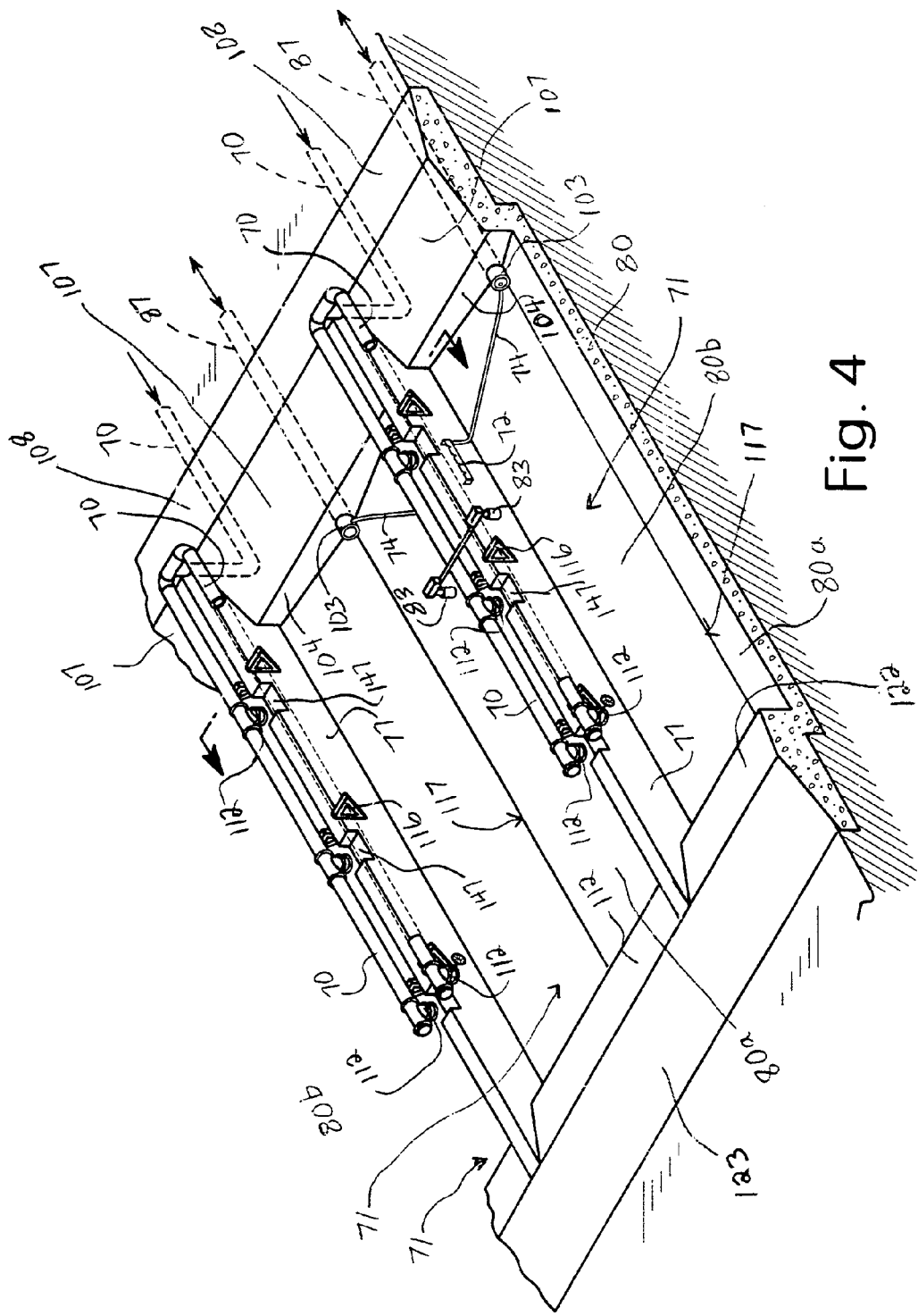
FIG. 4 is a perspective view of a preferred embodiment of one of the containers of the granular filter media dry cell, filter or bed for dewatering a composition composed of water and particulate solids.
Figure 5:
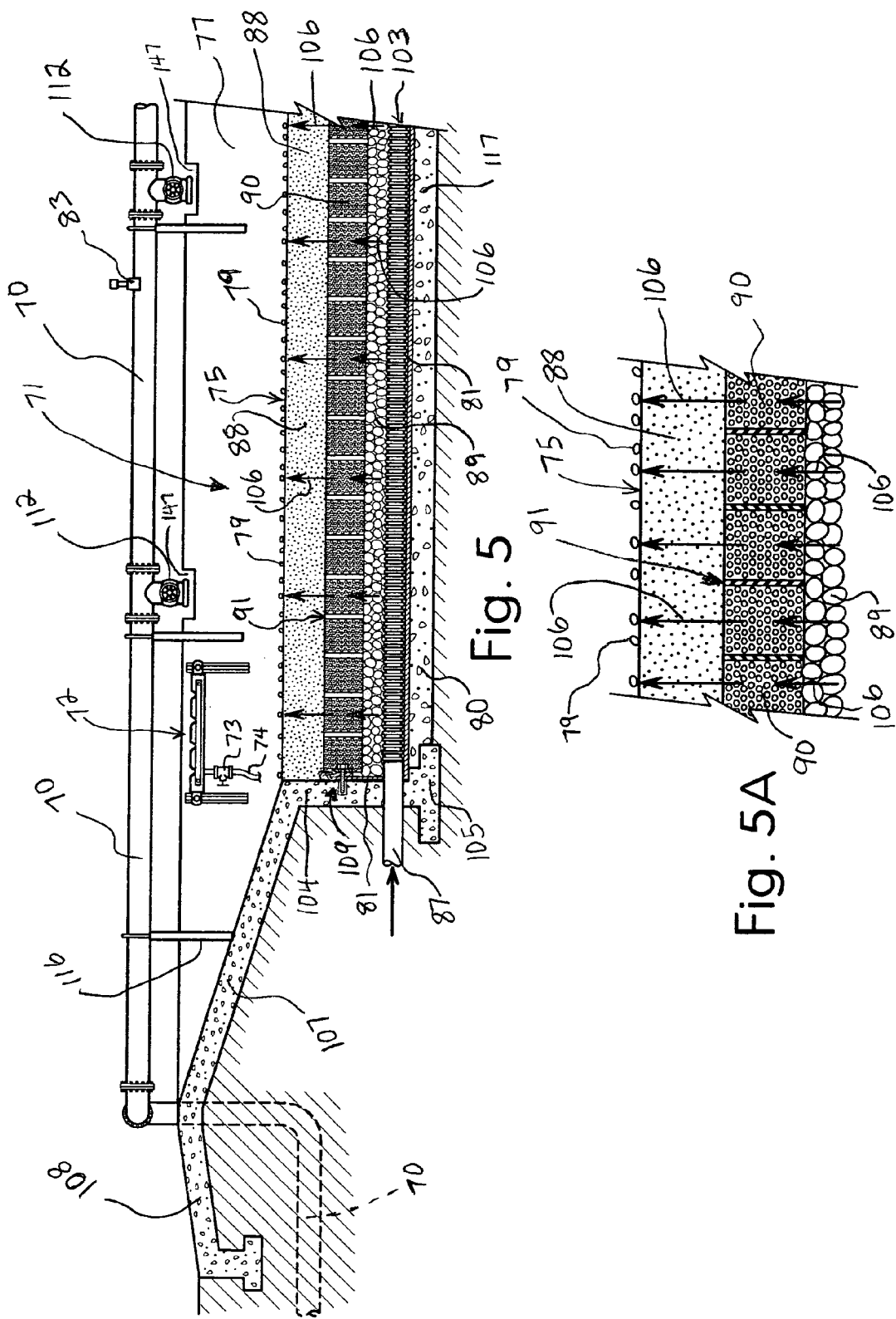
Figure 6:
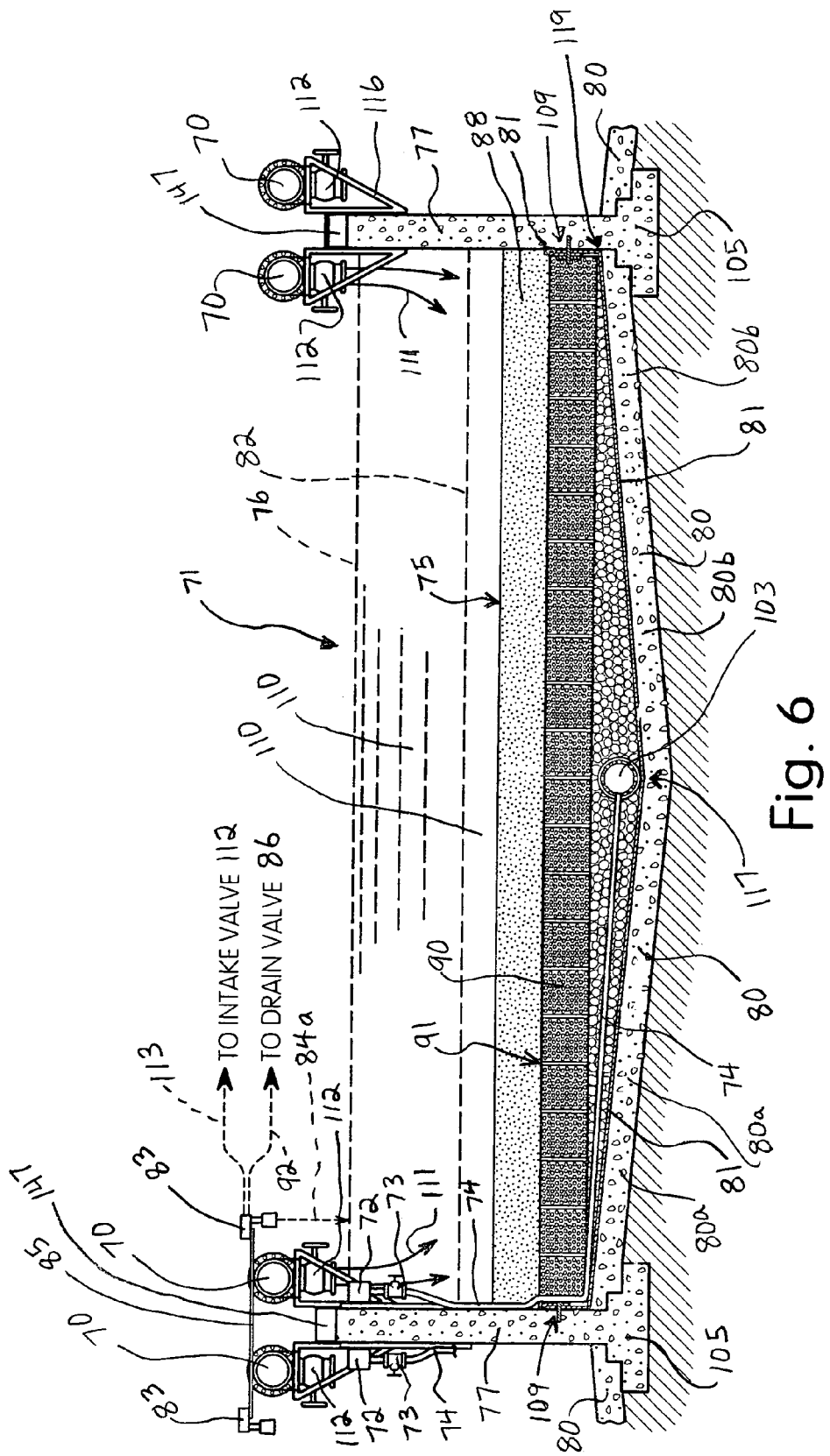
FIG. 6 is a front elevational view of a cross-sectional view, as indicated in FIG. 4, with the granular filter media present, with insertion of the liquid composition as the start of the first cycle of the dewatering scheme of the invention.
Figure 7:
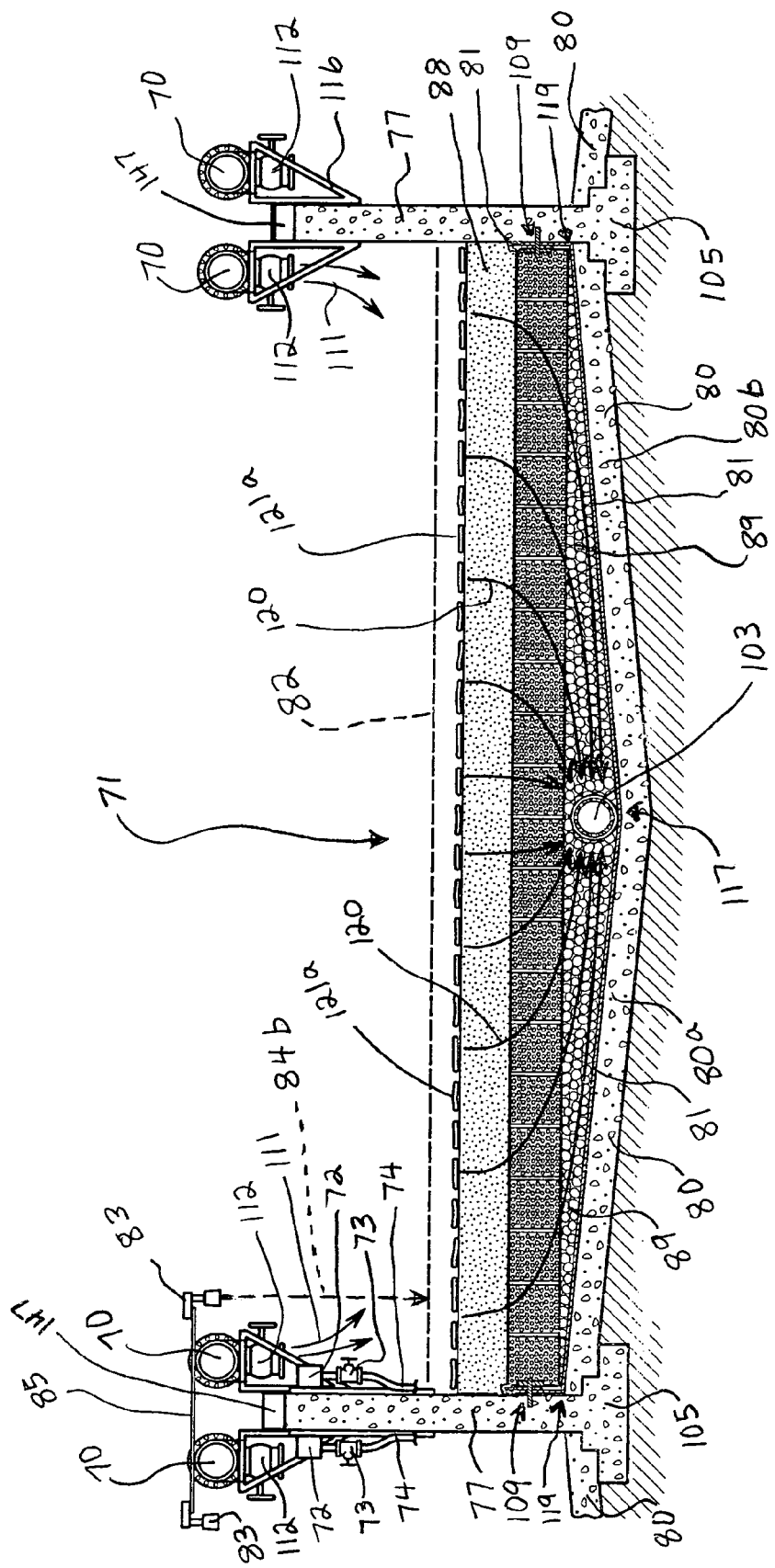
FIG. 7 is a front elevational view of a cross-sectional view, as indicated in FIG. 4, with the granular filter media present, with the filtration of the first cycle complete.
Figure 8:
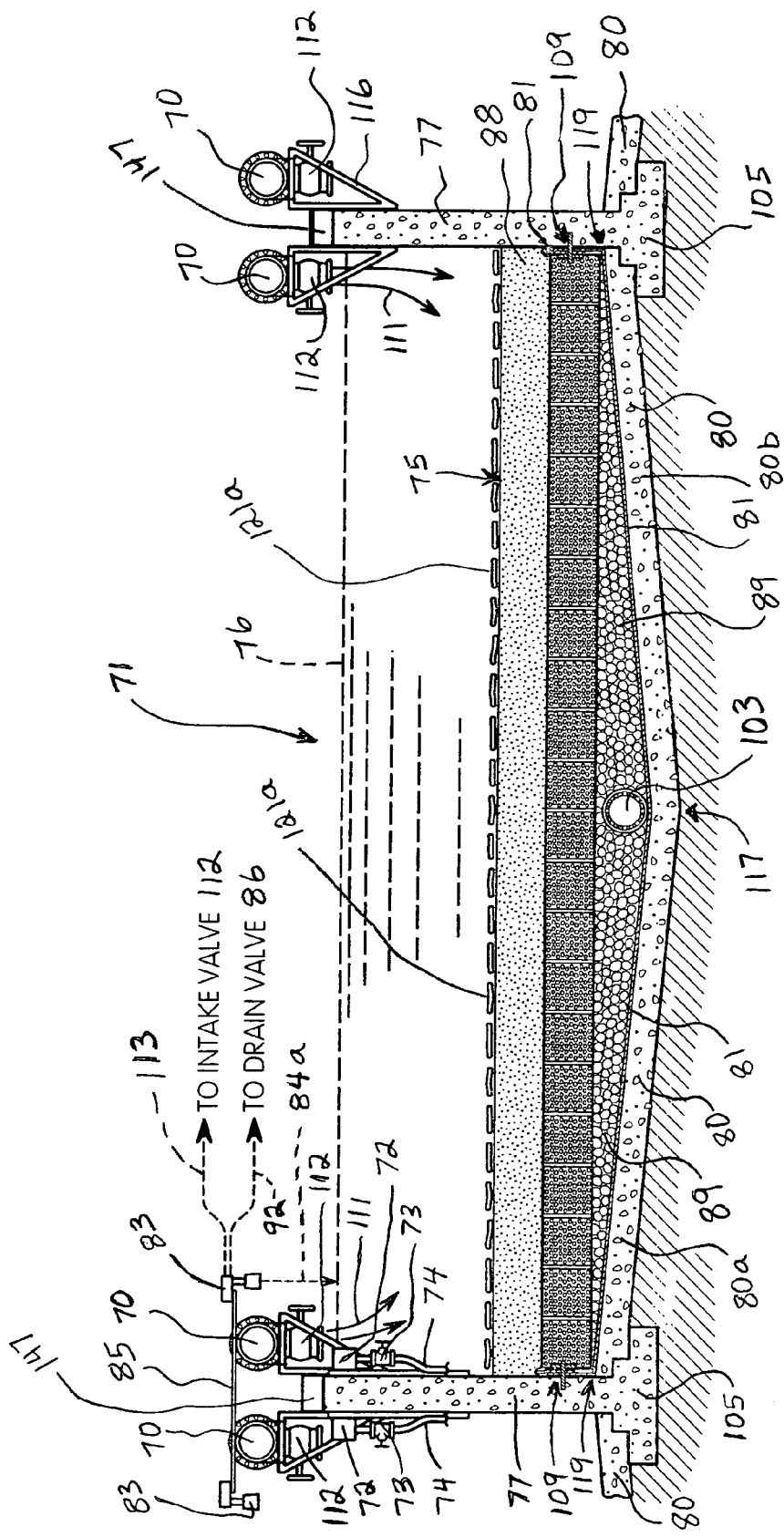
FIG. 8 is a front elevational view of a cross-sectional view, as indicated in FIG. 4, with the granular filter media present, with the start of the second dewatering cycle.
Figure 9:
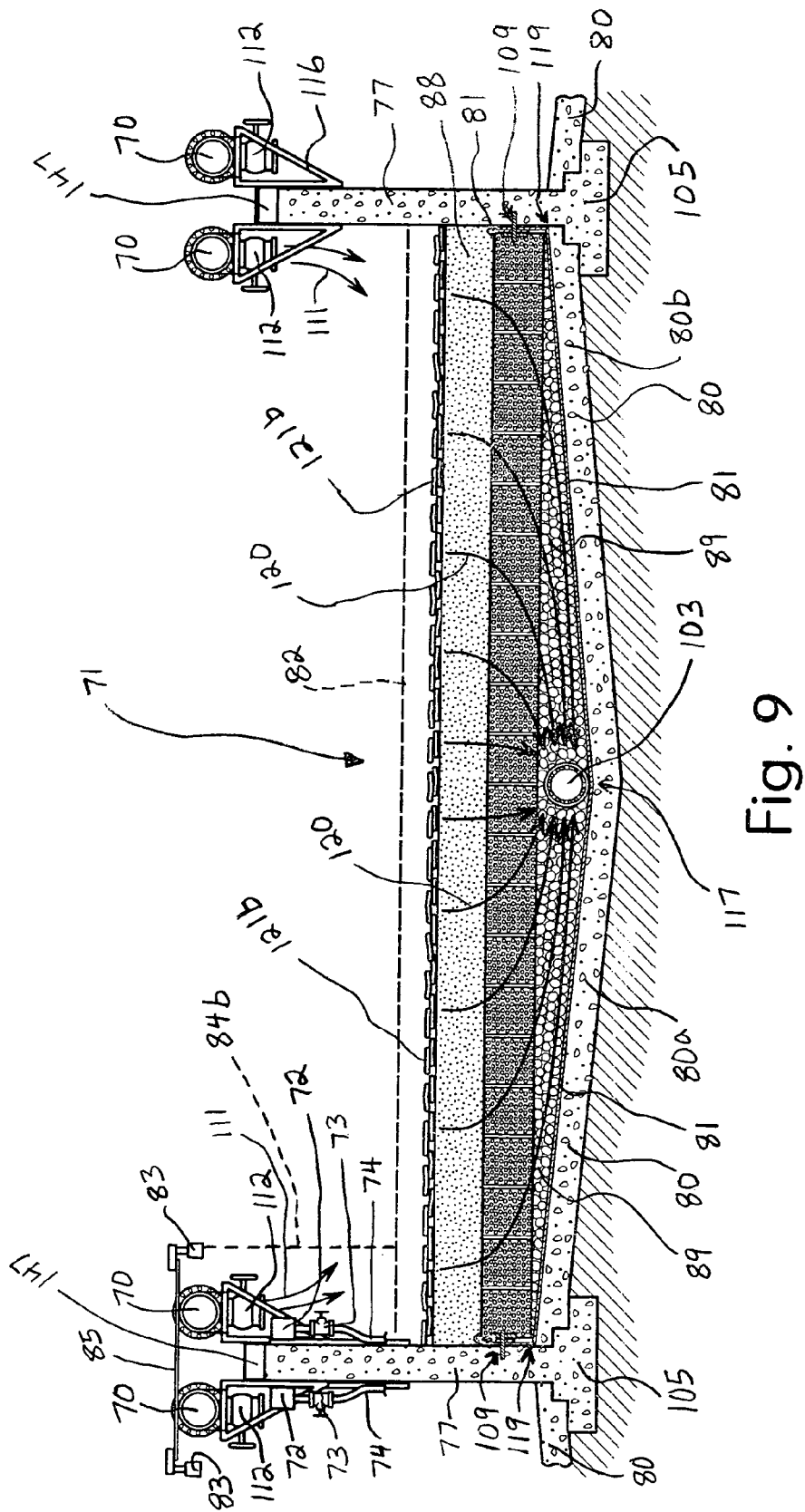
FIG. 9 is a front elevational view of a cross-sectional view, as indicated in FIG. 4, with the granular filter media present, with the filtration of the second cycle complete.
Figure 10:
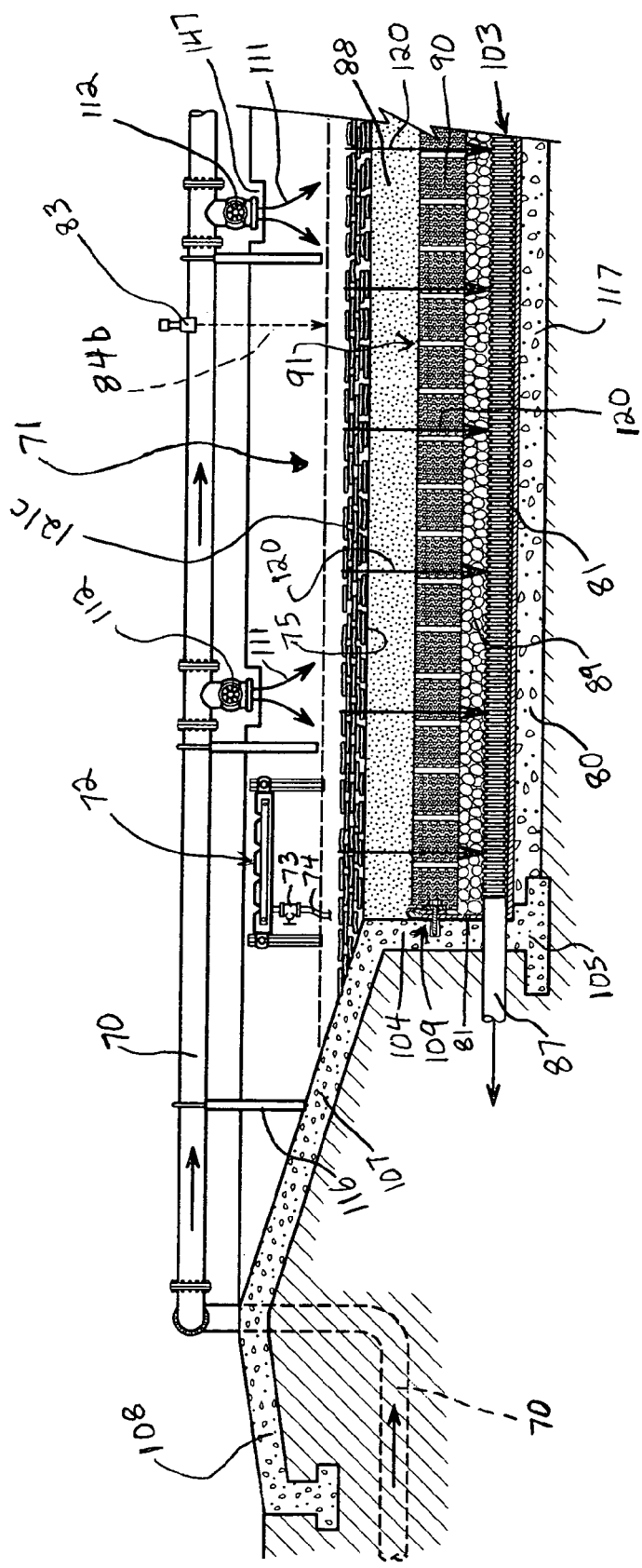
FIG. 10 is a side elevational view of a cross-sectional view, in FIG. 4, with the granular filter media present, with the filtration of a further cycle complete.
Figure 11:
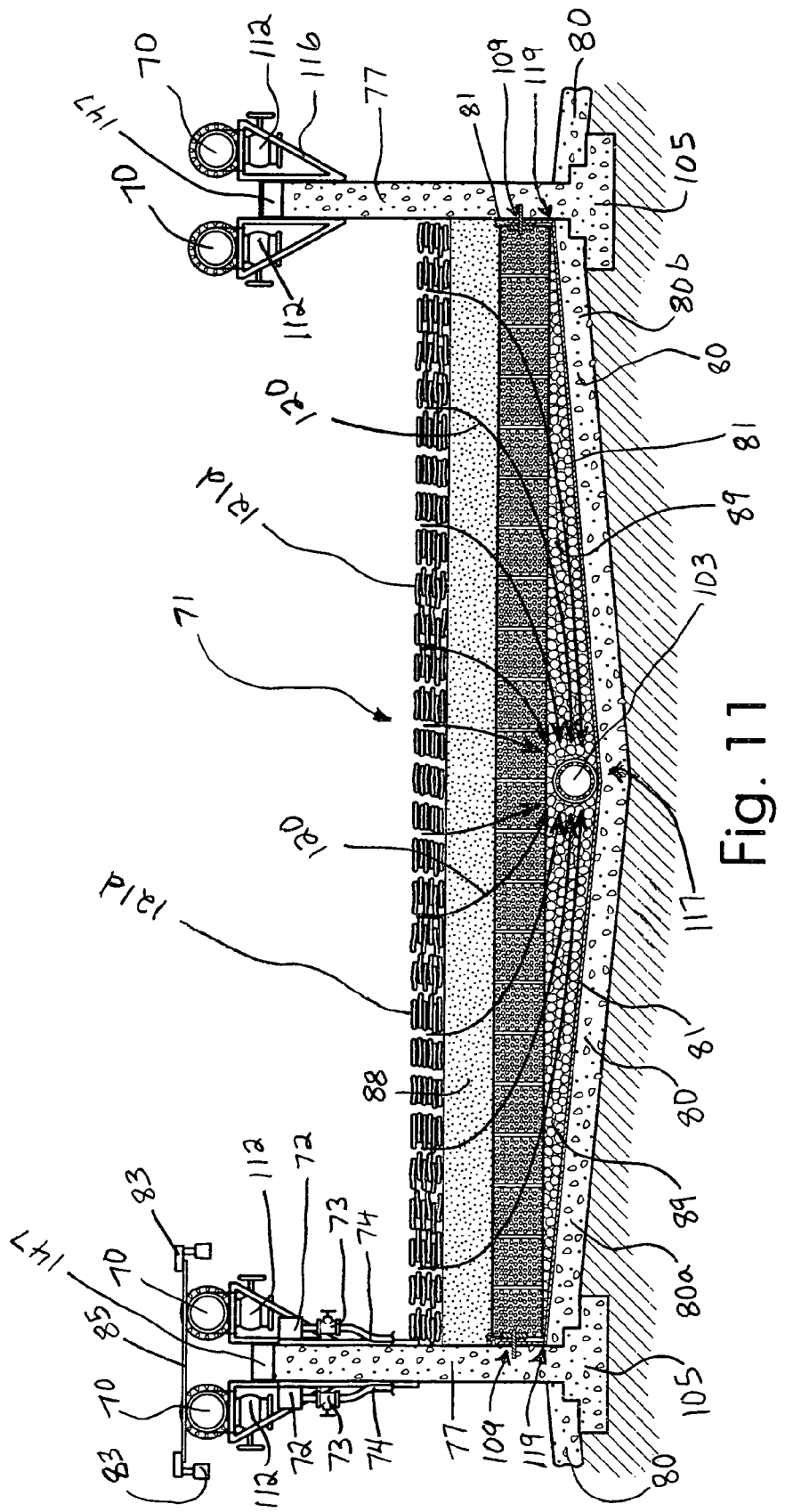
FIG. 11 is a front elevational view of a cross-sectional view, as indicated in FIG. 4, with the granular filter media present, with the last cycle of the process completed.

FIG. 3 shows the invention scheme treatment of the water from EQ tank pump station (60) [for equalization tank (56) or solids holding tank (56)]. The water goes to suspended solids monitor (62) with the water in the pipe first being subjected to measurement by flow meter (61).

The invention can use any type of flow instruments (61) as long as they are non-intrusive (i.e., there is no part of the flow element sticking into the flowing stream). Preferably the invention uses either a magnetic flow meter (61) (the element is a lined orifice the same diameter as the pipe) or a strap-on ultrasonic flow meter (61) [the transponders are strapped to the outside of a pipe, and the delay in sound waves reflecting back to the second transponder (the Doppler effect) is directly correlated to the velocity of the water in the pipe, which is converted into flow units].

Magnetic flowmeters (61) (that must be non-intrusive) are preferred.

Ceramic (i.e., ceramic-lined) magnetic flowmeters (61) (that must be non-intrusive) having either pulse output or analog output are most preferred. Ceramic magnetic flowmeters have abrasion-resistant liners typically made of alumino ceramic instead of the typical elastomer linings usually found in magnetic flowmeters. They often permit higher temperature operation, and because their electrodes are typically part of the ceramic substrate, they tend not to offer a leek path between the electrode and liner.

Since non-intrusiveness is required magnetic flowmeters (61) must be electrodeless. So-called electrodeless magnetic flowmeters employ electrodes that are not in direct contact with the fluid. These electrodes are either embedded in the liner or located behind the liner and are usually capecitatively-coupled to the flowing liquid. Usually the invention uses medium flow magnetic flowmeters include flanged and water-style meters that are between 0.5 inch (12 mm) and 300 to 450 mm (12 to 18 inches) in diameter. Many commercially available magnetic flowmeter models fit into this category. While many liquids, including slurries, produce signals that contain large amounts of noise, the commercial magnetic flowmeters are designed to produce usable flow measurements even in high-noise environments. Preferably two-wire or loop-powered magnetic flowmeters are usually used.

Traditionally, to generate a sufficient magnetic field, magnetic flowmeters required separate writing to a source of power in addition to analog signal wiring. Two-wire, or loop-powered magnetic flowmeters are designed to operate on the power available from the loop power supply. Most two-wire designs run on available 4 to 20 mADC loop power, but some designs require higher power levels to operate over two wires.

Suspended solids monitor (62) [or nephelometer (62)] works just like a turbidity instrument (turbidimeter), except that at the higher suspended solids concentration, the monitor can be calibrated into percent of solids in suspension. The water from equalization tank (56) continues onto Deskins Rapidfloc mixer (780).

A nephelometer (or suspended solids monitor) is an instrument for determining the concentration or particle size of suspensions by means of transmitted or reflected light. A turbidimeter is an instrument for measuring and comparing the turbidity of liquids by viewing light through them and determining how much light is cut off. A nephelometer is classified as a turbidimeter.

Nephelometric Turbidity Unit or NTU is a unit used in water treatment for measurement at 90° (i.e., 90° scattered light measurement) as prescribed by the Environmental Protection Agency (EPA). For use, the meters are calibrated. Turbidity is measured in NTU units, which is a measure of suspended matter (organic and silt particles) in drinking and other water. NTU is a unitless ratio of absorbances (comparison of measurement with standard reference suspension).

The nephelometric procedure (90° scattered light procedure) best records the measured values in low measuring ranges.

Instrument for measuring turbidity, suspended solid material, and the like are precalibrated (and are to be checked/recalibrated during use as needed). Formazine standards form the basis for all turbidity measurements.

Method 180.1, Analytical Method For Turbidity Measurement, draft June 2003, EPA, sets out an analytical method applicable to drinking water samples in the range of 0 to 40 NTU (or higher values if the sample is diluted). The method is applicable to drinking, ground, surface and saline waters, and industrial wastes. In the analytical method, the turbidimeter shall have a nephelometer, with light source for illuminating the sample, and one or more photo-electric detectors with a readout device to indicate the intensity of light scattered at right angles to the path of the incident light. See also Method #: 180.1, approved for NPDES, Editorial Revision 1974, 1978.

Turbidity instruments measure the average volume of light scattering over a defined angular range. Both particle size and the concentration of suspended solids, as well as the level of dissolved solids can affect the reading. Turbidity is defined as an expression of the optical property that causes light to be scattered and absorbed, rather than transmitted, in straight lines through the sample. Simply stated, turbidity is the measure of relative sample clarity.

Turbidity instruments can measure not only turbidity but also suspended solids. Turbidity is measured in Nephelometric Turbidity Units or NTU, which represents the average volume scattering over a defined angular range. Both particle size and concentration of suspended solids as well as dissolved solids can affect this reading. When measuring suspended solids, the instruments measure concentration, often in parts per million.

In the invention, preferably a suspended solids instrument is used that works just like a turbidity instrument, except that at the higher concentrations, the unit can be calibrated into percent of solids in suspension.

Suspended solids monitors and instruments are commercially available, and can be used in the invention (as well as non-commercially available monitors and instruments).

A typical suspended solids monitor utilizes an insertion-type sensor. (A submersible sensor can be used for open channel applications.) The sensor can be inserted in any size pipe. In-situ measurements provide instantaneous readings. It usually uses a pre-focused incandescent lamp to direct a beam of light through the process fluid. Particulate matter in the fluid absorbs light in proportion to particulate concentration. The transmitted light is usually detected by a silicon detector which generates a current signal proportional to the particulate concentration. The electronic signal converter amplifies and scales the current signal to provide a readout on a meter and an isolated output signal.

Turbidity meters are commercially available, and can be used in the invention (as well as non-commercially available meters). To facilitate practical interpretation of the turbidity value, turbidimeters are calibrated with a standard suspension. Hence, the reading is shown not in the form of the measured light intensity, but as a concentration of the calibration suspension. When a given suspension is measured, therefore, the reading shown means that the liquid in question scatters the same amount of light as the standard suspension of the concentration indicated.

Turbidity meters can use an insertion-type sensor, a submersible sensor, etc. Displays for the instruments can be analog meters, a numeric or alphanumeric digital display or video, CRT, or LCD. An option is to have no local display at all and have the data gathered by another instrument. Likewise, the user controls can also be analog or digital or can be operated through a host computer. To simplify the instruments, preprogrammed devices without user controls can be used. Electrical output options are the standard voltage and current outputs as well as an analog frequency or a change in state of switches or an alarm. Serial and parallel interfaces can help connect these instruments to a host computer. Some features available for many turbidity instruments include battery power for greater portability and built-in signal processing filters. Built-in calibration ability and self-test functions can be used.

Potable water is sent from water treatment plant (50) to polymer activation unit (965). In a normal installation about 300 gallons of potable water is, for example, used per day in polymer activation unit (965).

Figure 24:
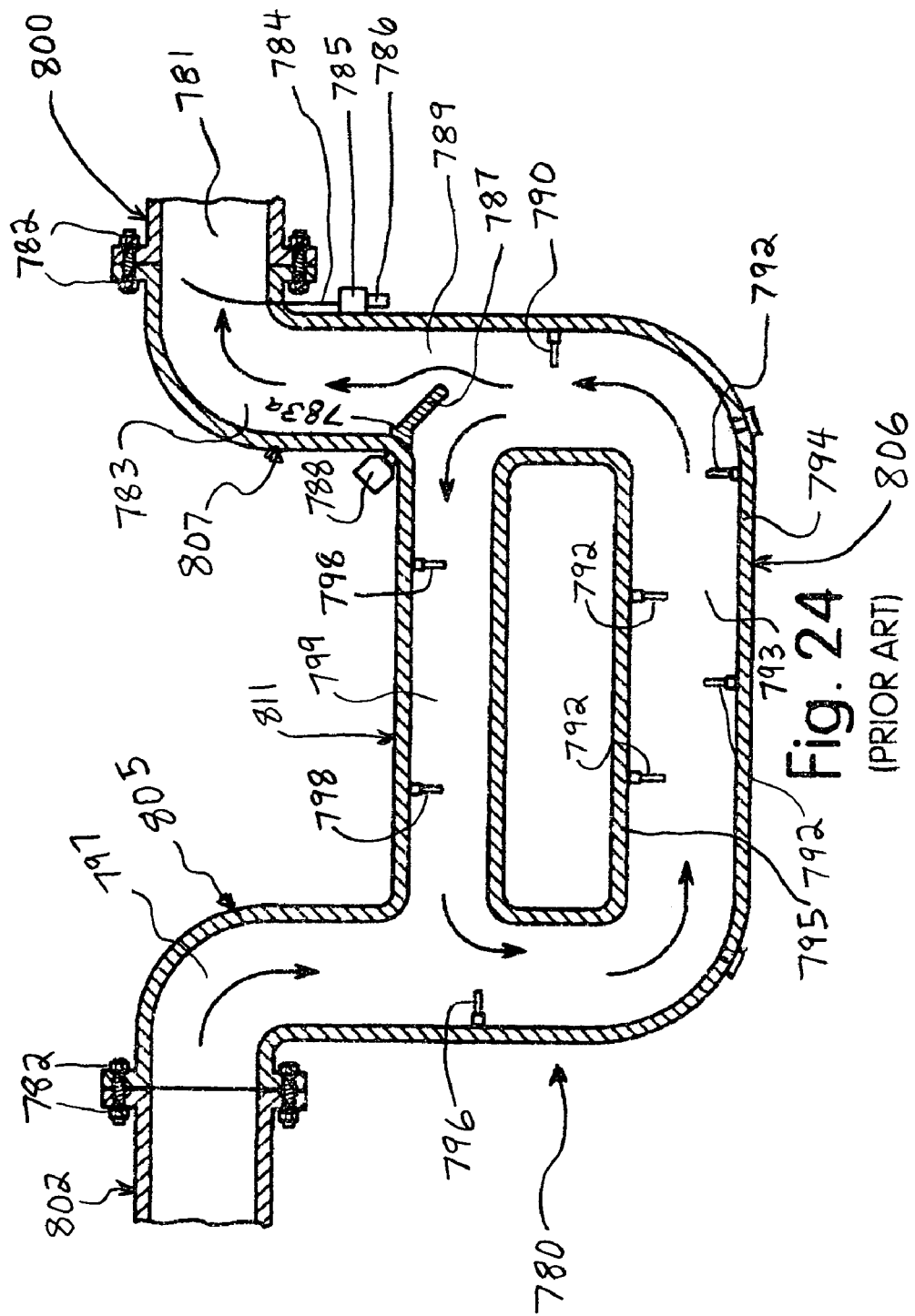
FIG. 24 is a side cross-sectional view of the mixing-flocculating unit of the previous Deskins process-scheme.
Figure 25:
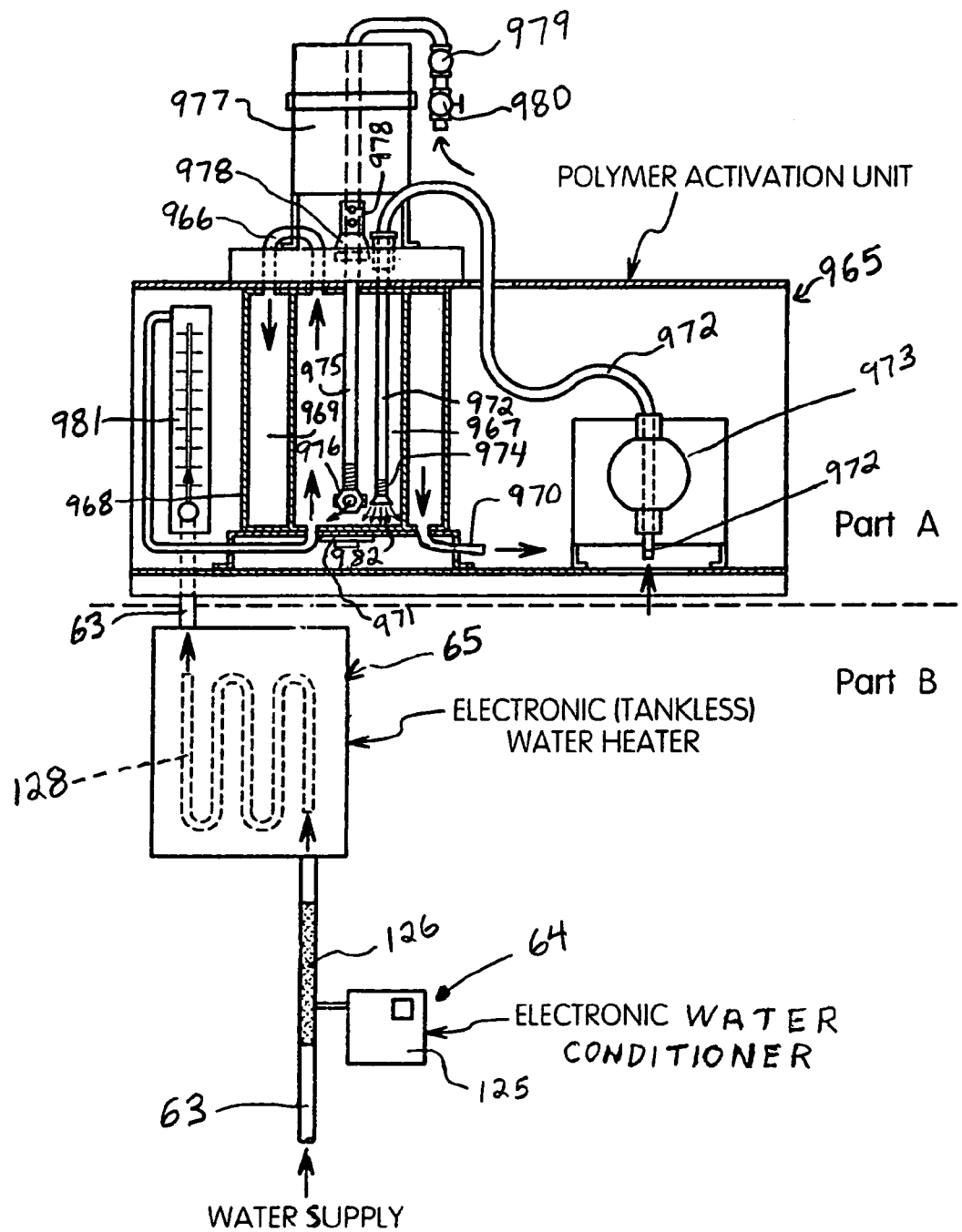
FIG. 25 is a side elevational view, partially cutaway, Part A, of the polymer mixing-feeding device of the previous Deskins process-scheme, and Part B that represents the water supply therefor of the invention.
Figure 26:
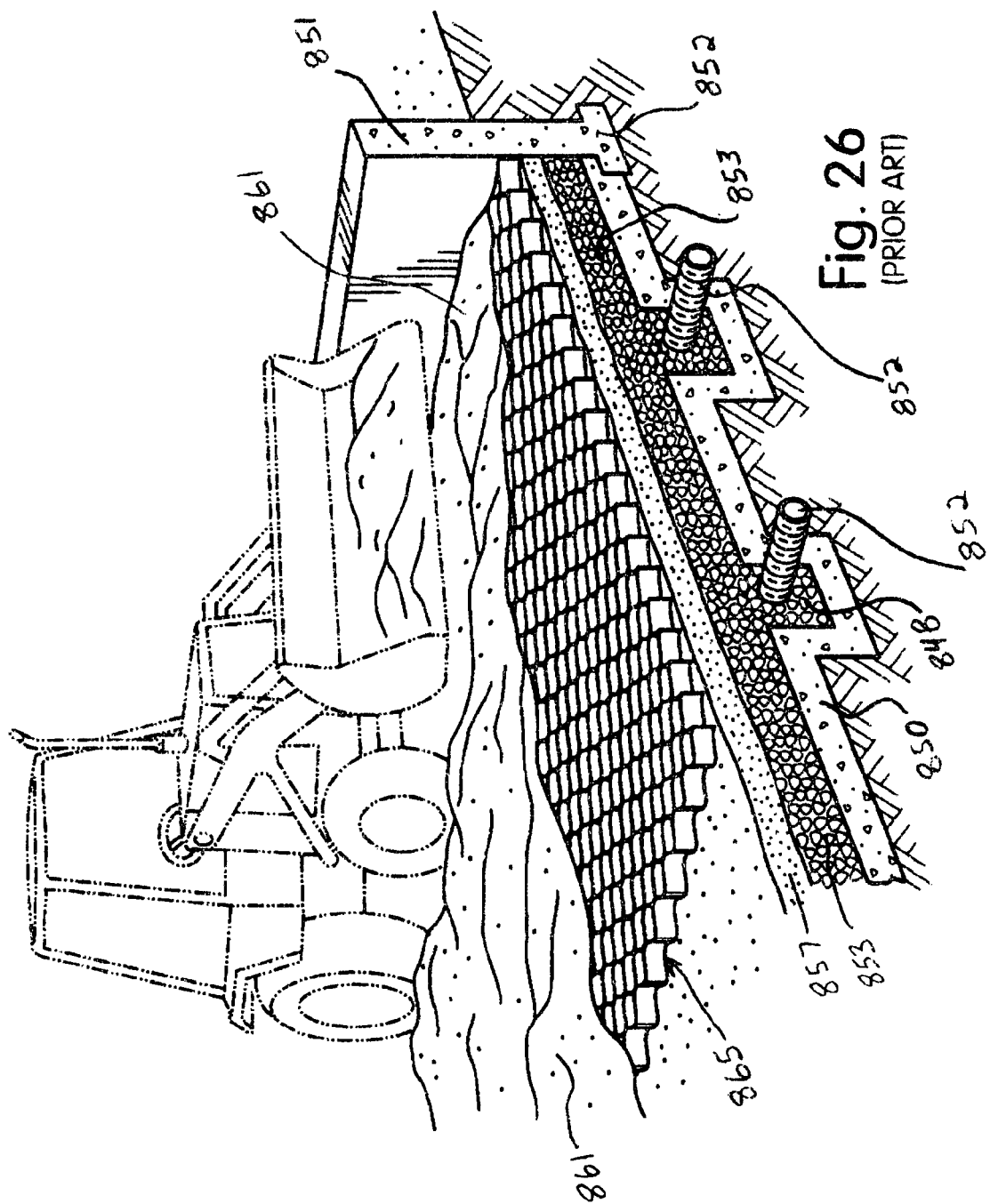
FIG. 26 is a perspective view with vertical cross-sectional view of the sand filter set-up of the previous Deskins process-scheme.
Figure 27:
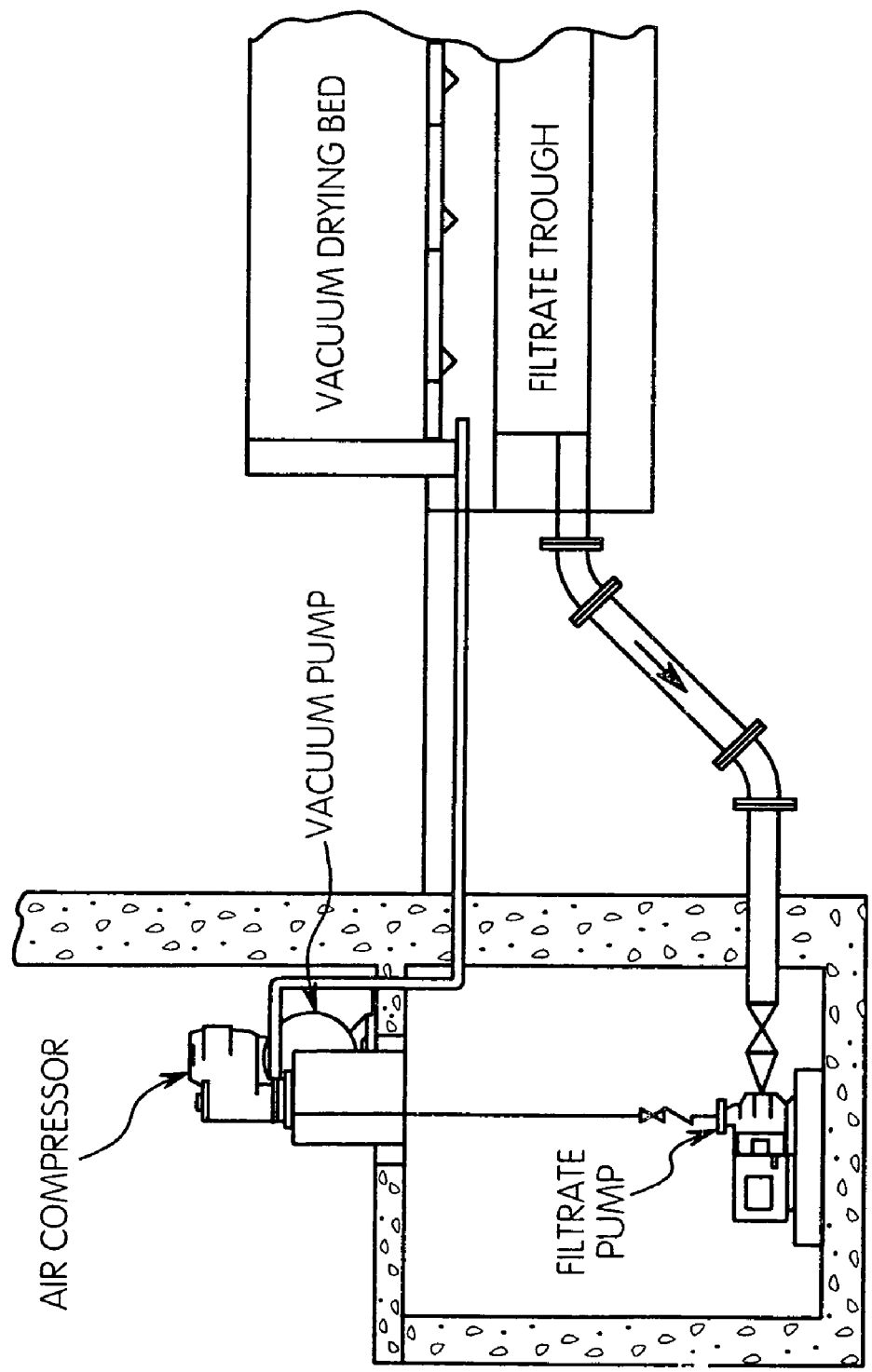
FIG. 27 is a side elevational view, partially cutaway, of a prior art installation.
Figure 28:
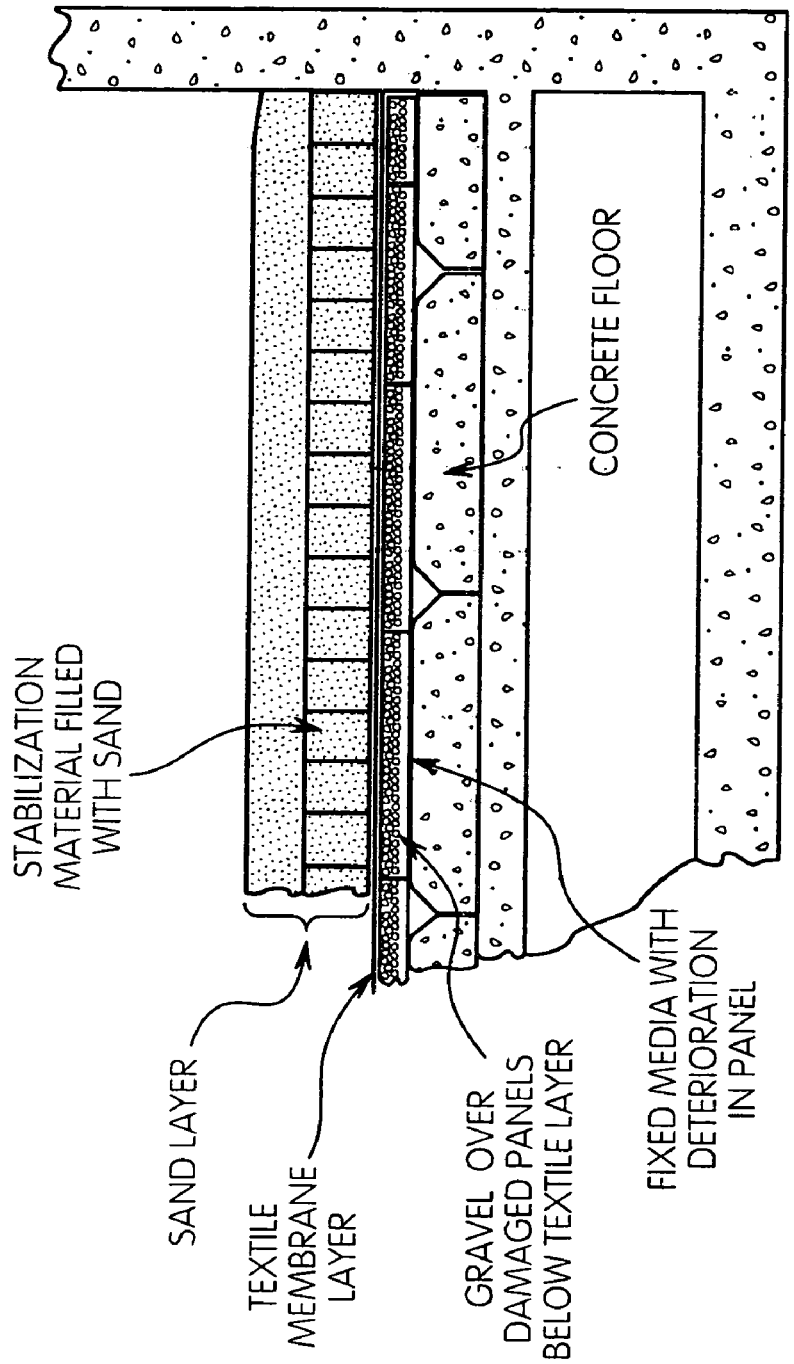
FIG. 28 is a partial, side elevational view of the modified drying bed of FIG. 27.
Figure 29:
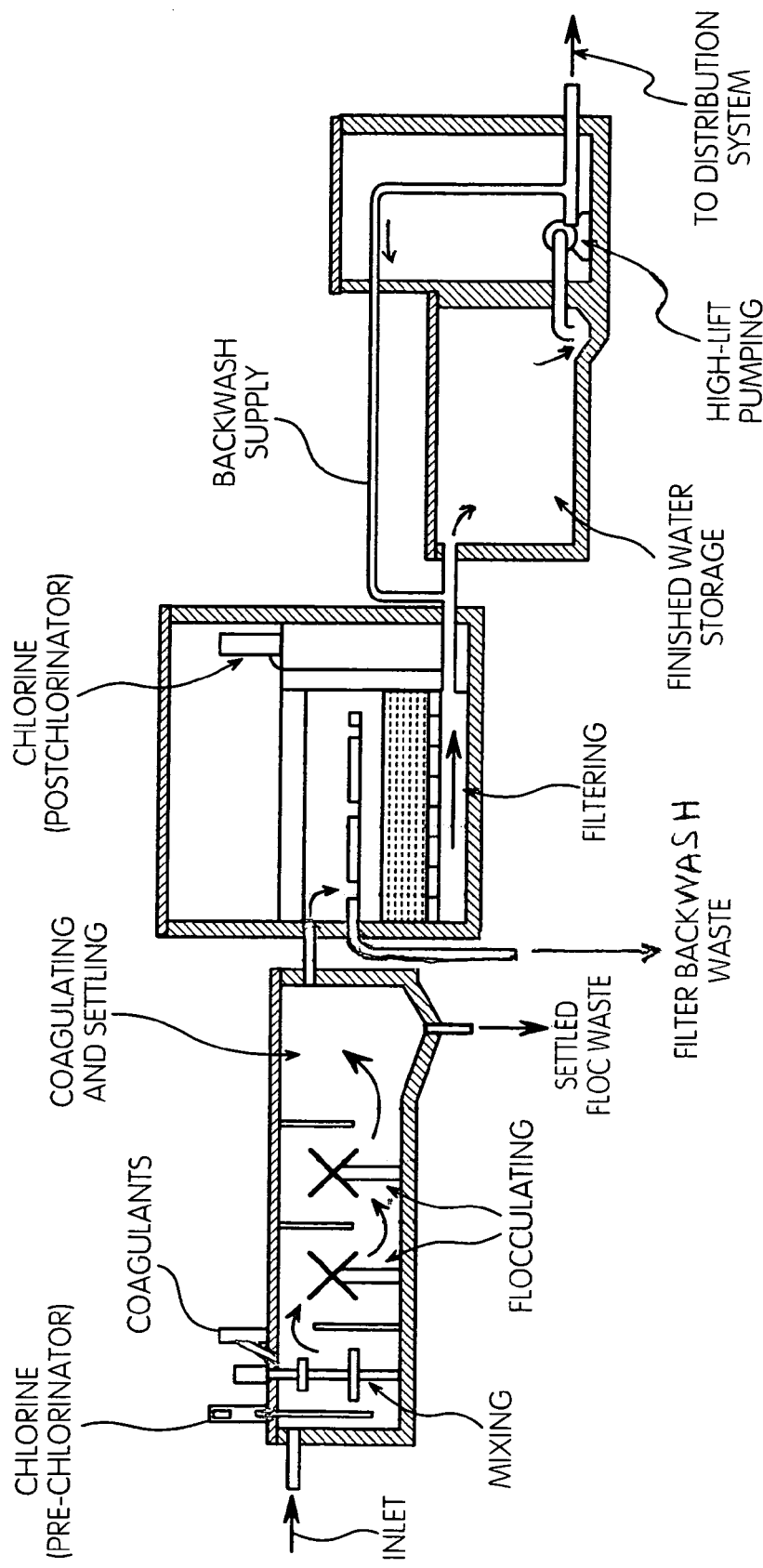
FIG. 29 is a diagrammatic scheme of the parts of a prior art type of a water treatment plant.

Reference is made to FIGS. 3, 24, and 25. Polymer activation unit (965) is prior art and is shown in detail in Part A of FIG. 25. The entities in Part B of FIG. 25 is part of the invention.

Electronic water conditioner (64) and electronic (tankless) water heater (65) are located on portable water line (63) before polymer activation unit (965).

The invention uses any non-intrusive electric water conditioner (64) that provides the results desired. Commercial non-intrusive electric water conditioners are available. Preferably a non-intrusive electromagnetic water conditioner (64) is used. The non-intrusive electric water conditioner inhibits scale formation and removes existing scale deposits.

Typically the preferred non-intrusive electromagnetic water conditioner (64) uses pre-programmed micro-chips to transmit pulses of electrical charge into the water at varying frequencies and amplitudes. These signals cause some of the salts in the water to form sub-microscopic clusters. The clusters act as nucleation seeds upon which the calcium carbonate (limescale) precipitates. These invisible fine crystals are carried away with the flowing water.

The preferred non-intrusive electromagnetic water conditioners (64) use non-intrusive windings (126) around the pipe. No plumping is required. There is no waste water or salt to remove. The preferred type of conditioner is as effective as conventional water softeners.

Electronic (tankless) water heater (65) heats the potable water in heated pipe coil (128) that is fed into polymer activation unit (965). Electronic (tankless) water heater (65) can be any suitable unit such as the outdoor unit of Rinnai water heaters. The unit has remote control, such as, remote water temperature control. A tankless water heater is a direct-fired, flow-through heater in which continuously flowing water surrounds an electric heating element, or alternately, the flowing water line is fitted with metallic fins which are directly heated by a gas flame (natural gas or propane). A thermostat on the discharge side of the heater regulates the electric pulses or the gas flame to maintain a constant temperature setpoint.

See FIG. 3 for the orientation of polymer activation system (965). Polymer mixing and injecting device (965) is more fully shown in FIG. 25. The polymer mixing-feeding (injecting) (965) system is an integrated equipment package which automatically meters, activates, dilutes and feeds liquid polymer and water. Concentrated polymer and water are blended in a complete high energy chamber.

Polymer (i.e., coagulant or flocculent aid) is supplied from polymer drum (66) to polymer activation system (965) via tube (972). The mixture of water and polymer from polymer activation system (965) is fed to Deskins rapidfloc mixer (780) as is the water from equalization tank (56). Suspended solids monitor (62) continuously or periodically measures the suspended solids or turbidity in the water from equalization tank (56), and then electronically sends control signals (68) to polymer activation system (965) on how much polymer-water mixture to send to Deskins rapidfloc mixer (780).

The prepared solution via tube (966) exits the original chamber (967) through the top of the vessel (968). It then re-enters an outer retention chamber (969) and exits the chamber (969) via tube (970) at the bottom of the vessel to the polymer injectors. A round access plate (971) is fabricated in the bottom of the primary chamber (967) for repair and service. The chamber (967) can be constructed of polyvinyl chlorides, stainless steel or any other suitable material. Polymer is transported in tube (972) by means of metering pump (973). Unit (973) mixes water with the polymer. The polymer is injected into the chamber (967) through a tube (172) passed through the top of the chamber (167). The tube (972) is designed to be adjustable in length giving variations in depth or placing the polymer closer to the aspirator or mixing energy. At the end of the tube (972), a spring loaded check valve (974) allows polymer to spray into the mixing area in a thin filming process (982). Energy for polymer activation is created by a ⅝ inch or any size stainless steel hollow shaft (975) which at the end of the shaft is a polyvinyl chloride or stainless steel 4-way aspirator (976). With the aspirator turning at 3,450 rpm, a tremendous vacuum occurs drawing free air down the hollow shaft (975) into the chamber (967). This process causes high energy mixing. The stainless steel shaft (975) is driven by a hollow core motor (977). The motor (977) and shaft (975) are attached by a coupler (976). The ⅝ inch or any size shaft (977) with aspirator (976) is placed inside the chamber (976) and that chamber (976) is made water tight with exterior mechanical seals (978). Inline check (979) and ball valves (980) are installed on the top or inlet side of the motor (977). These valves (980) can regulate the amount of air passed through the hollow shaft (975) to the mixing chamber (976). The one way directional flow check valve (979) is used to prevent liquid from exiting through the aspirator (976) and shaft (975) when the motor (977) is in the off position. The mixer has a brass solenoid valve for on/off control of dilution water supply (not shown), and a rotameter-type flow indicator (981) equipped with integral rate-adjusting valve. Water is supplied to primary chamber (967) via tube (983). The flow indicator is machined acrylic and has valve stop and guided float. Water flow rate is adjustable 0 to 500 USGPH. Water supply input and stock solution output fittings are 0 to 500 FNPT. The drive motor (977) of the unit is powered by a 2500 watt generator (not shown) producing 120 V—15 amps.

Suspended solids monitor (62) analyzes the suspended solids content of the incoming water and sends an electronic 4 to 20 milliamp signal (68) to polymer activation system (67) to increase or decrease the polymer dosage to Deskins rapidfloc mixer (780).

Reference is made to Deskins rapidfloc mixer (780) in FIGS. 3, 24, and 25. Deskins rapidfloc mixer (780) is prior art and is shown in detail in FIG. 25.

In mixer-flocculator unit 780, sewage enters pipe (702) of the mixing-flocculator unit (780) through an elbow. The elbow is attached to a vertical inlet pipe segment which is, in turn, attached to another elbow. This latter elbow has a flange (782) which is attached to a flange on the end of a downflow segment (805). The downflow segment (806) continues into a horizontal bottomflow segment (806). A recycle segment (811) contacts the downflow segment (805). An electrical control-drive unit (788) turns a threadedly adjustable rod extending through the wall of the device to contact the top of adjustable baffleplate (787). Baffleplate (787) is pivotally attached (787a) to the side of to the downflow segment (805) near the top where the downflow segment (805) and recycle segment (811) intersect. The adjustable, nonflexible baffleplate (787) is located at an angle (which could be readily changed) within the downflow segment (705). The electrical control-drive unit (788) can, instead, be a manual control (of the angle of the adjustable baffleplate), such as, manually turning the rod. The other end of the recycle segment (811) and the other end of the bottomflow segment (806) are joined to openings in a upflow segment (807). At one end of the upflow segment (807) is a flange (782) which is attached to a flange (782) at one end of an elbow. The other end of this elbow is attached to a vertical, exit pipe segment. Attached to the other end of the vertical, exit pipe segment is another elbow through which the sewage exits.

Running into the elbow which is attached both to the vertical inlet pipe segment and the downflow segment (805) are polymer or flocculent injection lines.

Sewage enters an elbow and runs through the vertical inlet pipe segment (804). It then passes through another elbow into the downflow segment (805). As the sewage/flow passes into the downflow segment (805), it passes through a 45 degree angle. This area is called mixing zone 1 (783). As the sewage/flow runs through the downflow segment (805), it encounters an adjustable baffleplate (787), which is positioned at an angle. The adjustable baffleplate (787) restricts the vessel's flow by about 50 to about 80 percent, thus increasing the original flow velocity by as much as 600 percent. Then, the sewage/flow is fanned in one direction—towards the bottomflow segment (806). A fixed baffle (790), which restricts typically 40 percent of the vessel's size, is positioned in the downflow segment and serves to oppositely direct and fan the passing sewage/flow. The area between the adjustable baffleplate and the fixed baffle is called mixing zone 2 (789). Then, the sewage/flow is directed into a 45 degree round angle into the bottomflow segment (806). Positioned within the bottomflow segment are at least two (preferably, a number of) fixed, horizontal baffles (792), the positioning of which causes the sewage/flow to pass under and over and under these fixed, horizontal baffles (792) in a serpentine flow pattern, thereby reducing the flow velocity. This area is called mixing zone 3 (793). The sewage/flow, then, enters the upflow segment (807) in a 45 degree round angle which causes the sewage/flow to move in a spiraling pattern. Positioned in the upflow segment (807) is (at least one) fixed vertical baffle (96). Mixing zone 5 is in the exit end of upflow pipe 807 where it bends to the horizontal. Before the sewage/flow exits the mixer-flocculator unit (780), and before it enters an elbow and the vertical exit pipe segment (208), it passes a horizontal pipe/recycle segment (811) which causes a portion of the sewage/flow to divert through this line, because of the pressure drop causes by the adjustable inlet baffle (787) placed at an angle. The bypass velocity can be increased, if the size of the pipe is increased and with baffle adjustments. Also before the sewage/flow exits the mixer-flocculator unit (780), and before it enters an elbow and the vertical exit pipe segment, but after it passed the horizontal pipe/recycle segment (811), it passes through a 45 degree angle. This area is called mixing zone 4 (799). Recycle segment (811) has a smaller diameter than the rest of the pipes of the unit.

A drainage plug is present in the downflow segment (805), close to where the sewage/flow enters the bottomflow segment (806). A flush plug is present in the upflow segment (807) close to where it joins together with the bottomflow segment (806).

The mixed-flocculated water exits Deskins rapidfloc mixer (780) via line 87 that turns into lines 70 for distribution into Deskins backwash recovery system (57).

The Deskins Backwash Recovery System™ replaces traditional thickening and dewatering equipment. The Deskins Backwash Recovery System™ improves upon the Deskins Quick-Dry™ Filter by providing a Sealed Vessel. Passive cleaning, decant control, filtrate control, filtrate recovery, uniform solids distribution, and solids dewatering within a Single Vessel. In the invention, the Deskins Quick-Dry™ Filter is modified by the installation of a control valve on the filter's underdrain (filtrate line), level controls, variable decant control, unique anchoring system for the Deskins Drainage Panels™, a barrier membrane to create a sealed vessel, and a reduced media profile. The process of this invention is inherently different from earlier technologies (including vacuum assisted drying beds and rigid perforated media drying beds—whether plastic panels, panels fabricated from metal such as stainless steel, or panels of epoxy treated sand and/or gravel) is the ability of the process to thicken extremely dilute slurries (0.001 percent to up to 9 percent concentrations) before beginning the dewatering process and doing both the thickening and dewatering in one vessel.

A major difference between this invention and the previous version is in the method of operation permitted because of the improved features. In the Quick-Dry™ filter process, pre-thickened sludge (1.0 to 5.0 percent solids concentration) is conditioned with polymer and pumped to the Quick-Dry™ filter over a short period of time (a batch procedure) where it is allowed to drain and then air dry for 4 to 7 days. The enhanced drainage promotes faster drying resulting in sludge cakes of 30 to 75 percent depending on sun, temperature, and relative humidity. The new invention, the Deskins Backwash Recovery™ System, can handle dilute sludge concentrations (0.01 to 0.9 percent solids concentrations).

The invention operation begins when the operator selects one of the Deskins Filters to become the active filter. He closes the filtrate control valve and opens the valve on the pre-cleaning (saturation) passive cleaning line. Water flows into the filter through the underdrain lines and begins to fill the filter. When this water rises to the top of the media, it flushes out any solids which have been retained in the media. At this time the pre-cleaning valve is closed and the filter is ready for service. The operator turns on the level sensors and opens the valve on the sludge header line to the selected filter. When sludge flow begins, the polymer activation system (including the inline heater and electronic water conditioner) starts delivering polymer solution to the RapidFloc™ Mixer where the polymer solution and sludge slurry are mixed. The resulting flocculated sludge is directed into the filter through one or more of the valved outlets. Flocculated sludge is permitted to accumulate in the vessel until reaching a predetermined elevation (the high set-point-typically 30" deep) at which point the level sensor sends a signal to the filtrate control valve which opens and allows filtrate to drain to the recovery pump station, from whence it is pumped back to the influent of the treatment plant. The operator may elect to accelerate the drainage by decanting. When conditions warrant (during periods of heavy rainfall or near the end of the thickening phase), the operator opens the valve on the decanter allowing clarified water to be drawn off the surface of the water and directed to the underdrains without passing through the filter media. When the level of flocculated sludge drops to the pre-determined low set-point (typically 6 to 12 inches), the level sensor sends a signal to the filtrate control valve to close, allowing the sludge to again accumulate. This phase of the operation is the thickening phase. This phase continues unabated for several days until sufficient solids have accumulated on the surface of the media (2 to 3 lbs. Per square foot), as determined by sludge concentration and volume pumped to the filter. At this time, the operator puts the next filter into operation and begins the dewatering phase for the previous filter.

In the dewatering phase, the operator shuts the main valve on the sludge line to the filter, turns off the level sensor, and opens the filtrate control valve. This allows al of the retained water to drain to the filtrate recovery pump station. The dewatered sludge remains on the filter where it is exposed to the sun and wind. The operator may remove the dried sludge following a period of time (usually 4 to 7 days) in which the sludge has reached the desired solids concentration (dryness).

Removal and disposal, the Deskins Backwash Recovery™ System includes one or more machines for the mechanical retrieval of dried solids from the filter. The AquaTrac 300 & 400 series of tractors are articulated, four-wheel drive tractors equipped with turf tires to enable the tractors to "float" on the filter media. The modifications to the AquaTrac Bucket make the removal procedure easier and faster.

Webster's Ninth New Collegiate Dictionary, (1989), page 463, defines a filter bed as a sand or gravel bed for filtering water or sewage.

Containers/enclosures (71) have front wall (104), a back wall and side walls (77). The front and back extensions (107 and 108; 122 and 123) are sloped for easy access for a vehicle to come in to remove the dried solids (121) when the container (71) is in use with granular filter media (118) is present.

Granular filter media (118) in containers (71) has from top to bottom, top filter sand layer (88), cell media section (91), and coarse stone layer (89). Fine stone is placed in cells (90) of cell media section (91). The steepness of the gradation of the size of the three layers is a very important feature of the invention. The gradation of the granular filter media is clearly one of the factors that makes this invention "backwash recovery system" novel and work so well with treated water from a water treatment plant. The bottom layer of stone that is placed around the underdrain and bottom liner should be a natural rounded washed rock with an effective size of 19 mm to 38 mm (¾" to 1½"). The next layer which is located in the drainage panel, shall be an effective size of 6.35 mm to 9.53 mm (¼" to ⅜") natural rounded washed material. The sand, or top layer, should have an effective size of 0.6 mm to 1.2 mm natural rounded washed material.

Top layer 88 is a sand layer of filtrate sand that is very important to successful operation of the invention process for the treatment of treated water from a water treatment plant to reduce its turbidity to less than 2 NTUs. The filtrate sand is a natural, rounded sand material with an effective size range of 0.6 mm to 2.0 mm and a coefficient of uniformity of less than 3.5. Preferably the filtrate sand has a size range of 0.6 mm to 1.2 mm with a coefficient of uniformity of less than 2. The preferred sand yields slightly better performance when prolonged loading events are necessary. However, the broader size range is more readily available, less expensive and provides acceptable performance.

As a general guideline, the fracture, hardness and specific gravity of the filtrate sand should meet or exceed the AWWA B100-1 specifications.

Top layer (88) of filter sand generally is 2 to 12 inches thick, preferably 6 inches thick. Cell media (91) generally has a height of 2 to 12 inches, preferably 6 inches. Coarse stone layer (89) should not have a thickness of greater than 12 inches in order to comply with the profile aspect/requirement of the invention. Coarse stone (89) has a thickness of 2 to 12 inches, preferably 2 inches.

The invention process of thickening and dewatering treated water from water treatment plants can provide water having turbidity of 2 NTU or less. At the Clovis, Calif. water treatment plant a long term test of the invention process has been conducted and has been reported on official documents to the State of CA known as the DHS reports. The turbidity from the Actiflow (mechanical dewatering system) to the Deskins filters is 100 to 1,000 NTU. The return water from the Deskins filters to the plant inlet raw water is less than 1 NTU as documented on the April 2005 report to California on the "Monthly Summary of Monitoring for Surface Water Treatment Regulations" System # 101003. The invention Deskins backwash recovery with high rate thickening and dewatering performs the task of removing residual solids (NTU) by the process of adding a properly activated polymer to the incoming flow containing residual solids reported in NTU from 100 to 1,000. With the process of recirculation in the Deskins rapidfloc mixer the polymer has a better contact with the residual solids causing the residual solids to form a floc and freeing encapsulated water. The solids and the water are placed on the top granular media layer. This layer acts as a filter to allow the water to pass, collect the solids and further polish (clean) the effluent water. The clean in place process will clean and lift any residual solids not captured on the surface of the granular media. The effluent being discharged through the filters (vessel) contains 2 NTU or less, as per the official report. This water is returned to the plant raw water inlet. This test results shows the unobviousness and advantages of the process and equipment of the invention.

Another advantage of the invention is the use of carbon in the drainage panels, or a mixture of carbon and sand in the drainage panels. Preferably carbon is used as top layer (88) (six inch layer preferred), or a mixture of carbon and sand as top layer (88). The carbon is preferably an activated carbon, such as, AquaSorb 1500 that is a high activity granular activated carbon manufactured by steam activation from selected grades of bituminous coal (it has a high density adsorption for drinking water; surface area, 1050 $m^2g^2$). The activated carbon best has a particle size of 0.02 mm to 0.25 mm, but larger or smaller particles can be used. The GAC will remove: organic compounds: benzene, toluene, gasoline, almost all hydrocarbons; oxidizers: chlorine, bromine, fluorine, iodine, ozone; odors; reductants; sulfur dioxide, etc.; heavy metals: mercury, lead; and radio-active compounds: radon.

An advantage of the invention is that the invention process (and apparatus) provides energy conservation (electrical horsepower) in that the invention process will save 95 percent of the electricity that is used in mechanical dewatering equipment. The use of non-mechanical means in the thickening, dewatering and drying requires minimal electricity that is what would be for the operation of the automatic valves, polymer machine and pumps to return the filtrate.

An advantage of the invention is that it captures all of the rainfall for water reclamation within the given areas of the invention's filter and the entrance and exit ramps. This water would have been lost to storm sewers, drainage ditch, etc. The invention captures the water to be sent to the plant raw water supply for domestic usage.

Drain pipe (103) is located in coarse stone layer (89). Underdrain (89) has a series of ribs (114) and a series of holes (115) in the valleys between ribs (114). The ribs helped prevent clogging of the holes (115) by stones (89). See FIGS. 15 to 17. Water can flow in or out of drain pipe (103) and this is explained below.

The invention, in one sense, involves among other things a design modification to provide a shorter profile for the construction of a Deskins Quick-Dry Filter (see the disclosure of U.S. Pat. Nos. 6,051,137; 5,725,766 and 5,660,733, the pertinent portions thereof are incorporated herein by reference). Subsequent reduction in granular media (113) volume results in cheaper construction costs, reduced drainage time (increased drainage efficiency) and speedier air drying of captured solids. Identifying the different layers starting from the bottom of the filter (113) where the underdrain (103) is located can have a stone depth of 2 to 12 inches, the second layer containing the Deskins Quick Dry Drainage panel consisting of a honeycomb design panel manufactured from PVC, stainless steel or any suitable ridged compound with a vertical and horizontal flow transfer measuring 2 to 12 inches in height filled with small rock (pea gravel) or granulated carbon, the top layer is composed of a coarse sand (media) comprising of a gradation of fine to large with angular shapes and can be a layer of 2 to 12 inches. The grid (91) usually has cells that are 6 inch by 6 inch in the horizontal plane.

A standard cell grid section may have nominal dimensions of eight feet wide by twenty feet long by six inches deep. However, a standard cell grid section can have any length, width and height to fully fit into the dimensions of the cell in case. All of the individual cells forming a cell section, generally, are uniform in shape and size. Preferably, the individual cells are about 6 inches wide, 6 inches long, about 6 inches deep, hexagonal in shape and, together, form a honeycomb. The honeycomb is one of the strongest, yet greatly increased by the thoroughness of the flocculating process.

There is a cleaning in place (pre-cleaning) control valve (86). The valve is installed on the outlet drain line of each filter (vessel) to flood the media with water thereby enhancing solids distribution and providing a gauge for proper volume control Redistribution of the pre-cleaning water, radial orientation of openings in underdrain piping provides superior method of introducing pre-saturation water. Upflow from distribution (96a or 96b) generates a clean-in-place phenomenon whereby residual solids retained in the media from previous filtration cycles are lifted to the surface. Water flows can be increased to scrub all filter layers. Scrubbing means passing water in voids around media and shifting sand particles.

A commercially available perforated drainage pipe (for example, ADS Hancor Hi-Q) doubles as the distribution pipe (103) for clean in place (pre-saturation) and a method to remove the freed and captured water from the process. The pipe serves the function of loading and unloading the filter (vessel). The pipe can be a slotted or perforated structure with holes at 1° to 365° the length of the pipe. It can be smooth or corrugated. This pipe is placed on top of the base liner which can be constructed of concrete, PVC, HDPE, or any compound surface that would prevent leakage. The pipe will be perforated and contained under the filter (vessel) media and will come to a point of location where the pipe will change to a solid structure to pass through the sealed liner (81) to the exterior of the filter [vessel (71)]. The solid pipe will provide the placement of the clean in place (pre-cleaning) line and the automatic/manual valves (86) that discharges into the effluent line.

FIGS. 5 to 12 show the invention process of pre-cleaning granular filter media (113), the several steps of adding/inserting plant treated water into containers (71), allowing the water to filter through the filter media to a certain level, repeating the filling and thickening as desired, and dewatering in the same vessel (71).

Level sensors (83) allow control of water levels and process stages.

In cold climate conditions where wet media may freeze prior to the Deskins Quick Dry™ Filter being loaded, it may be necessary to introduce heat via heat exchanger to thaw the media so that free drainage may occur. A carbon layer can be placed on top of the granular sand media which will allow the transfer of water through the carbon and collect the solids on top. The carbon prevents the freeze from the sand and prevents the captured solids from freezing to the sand layer. Carbon can be mixed with the sand media and installed on top of the Deskins Drainage Panel layer or placed within the drainage panels to filter out unwanted materials in the returned freed water. The clean in place process (pre-cleaning) helps purge the mixed carbon on each cycle used or can go through a series of load and discharge cycles using the clean in place (pre-saturation) process. The floating weir decanter (72) can be used to remove the back flush and dispose to the proper assigned location.

In very cold climates, rapid air movement across the solids will freeze dry the solids through the process of sublimation.

When dealing with extremely dilute solids (typically at concentrations of 0.1 percent or less), a level-control signal is used to open and closed the pre-cleaning control valve thereby decanting filtered water which may be captured and reused. Decanting weirs are mounted to the filter (vessel) walls. Weirs are adjustable vertically to increase or decrease desired flow. A floating weir decanter could also be used to remove volumes of freed water from the filter (vessel), but is not preferred; both fixed and floating decanters discharge into the effluent return line. Decanters are primarily used to collect rain water and decrease evaporation. The vertical position of decanters (72) can be adjusted by sliding up and down in slides. Plate (151) on the decanter (71) that moves vertically via foam blocks will not have any spacers between plate and fixed decanter. When use of metal and/or rubber spacing, there was a dragging or locking as simulated water movement passing over the v-notches was done. Surface to flat surface is the only way this would work. Spraying commercial Teflon protects the surface. Water overflow goes via line (74) to drainpipe (103).

The method of loading dilute solids in a repetitive thickening cycle using the level sensor and automatic valve to decant through the filter to a specific level of containment in the Filter (vessel). The specific area which is the space between the top of the sand layer and can be from 2 to 12 inches will accumulate the flocked solids. This area is described as a thickening zone based on collections of solids, set level sensors and time schedule. The water above the thickening zone can be removed with fixed or floating weirs and will discharge that water to the effluent underdrain. The accumulated solids is maintained until a specific accumulation has been acquired. The Filter (vessel) is usually loaded to 2 to 3 lb. per sq. ft. and can accommodate up to 20 lb. per sq. ft. At the end of the accumulation cycle automatic valve is opened and the freed water surrounding the collected solids drains through the sand layer, total media to the underdrain effluent return line. The accumulates solids are dried on the top surface of the sand media layer.

A liner (81) fabricated of concrete, soil cement, bituminous materials, PVC or other smooth and impervious material placed in a shallow "V" to direct the released water to the underdrain. Said material to provide a sealed barrier between the filtered water and the ground water. Cell media grid (91) is affixed to concrete side wall (77) by bolt (153). The folded over edge of liner (81) is between concrete side wall (77) and grid (91).

Figure 22:
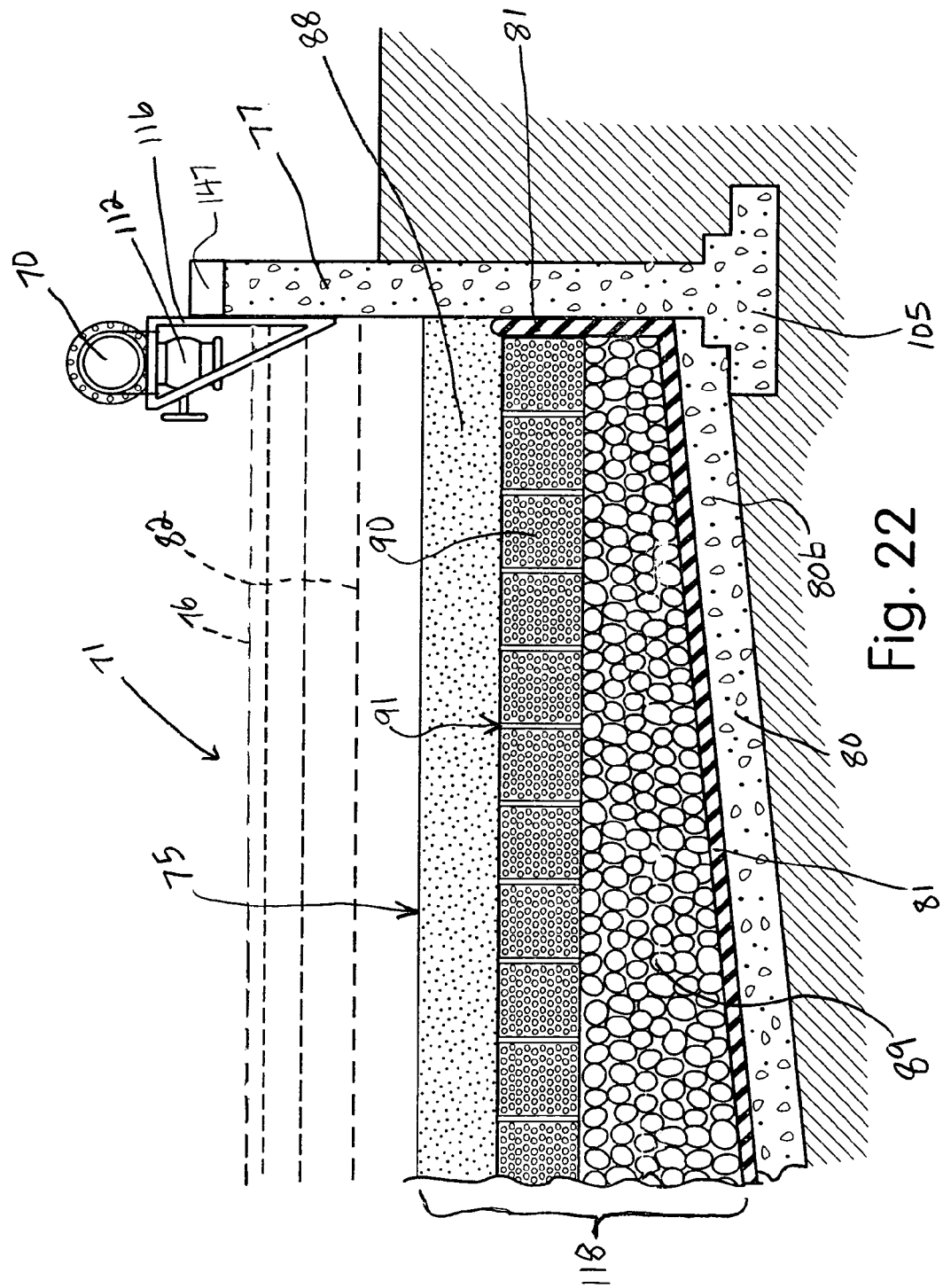
FIG. 22 is a partial, vertical cross-sectional view of one embodiment of the invention.
Figure 23:
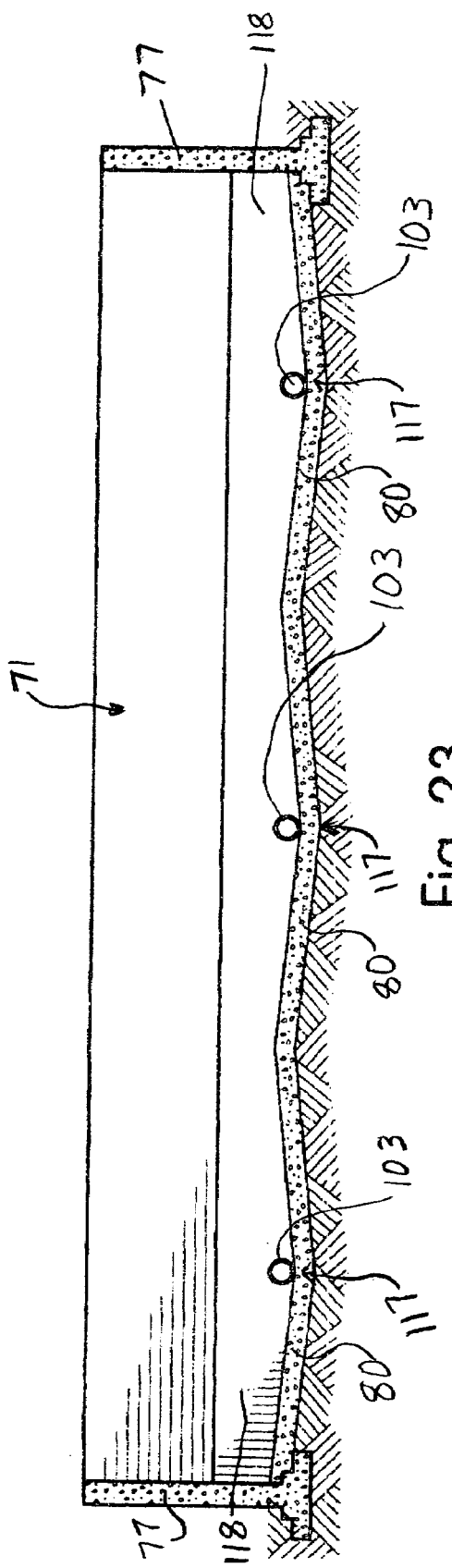
FIG. 23 is a front elevational view of a cross-sectional view container, including the granular filter media, of the invention.

See FIG. 18. The lower edge of cell media grid (91) fits into the V-formed by the intersection of sloped floor portion (81) and side wall (77). This is very important in maintaining a shallow profile for granular filter media (118). The edge of cell media grid (91) should always be within 2 vertical inches of said intersection on at least one side of cell media grill (91). (FIG. 22 shows one end beyond such range but is within the scope of the invention).

Opening (147) in the common wall between filter cells to provide overflow protection in case of level control system failure by means of overflow decanters (147). Water will transfer between all interior filters (vessels). The operator can use this approach to control operation, levels, etc.

A series of formed horizontal grooves or painted lines indicating sand level and accumulation levels for thickening zone and fill line (3 stationary bench marks) of solids loading are provided.

Bucket (127) modified is with slots in the bottom to allow discharge of sand during retrieval procedure. Bucket (127) modification to include one or more (2 preferred) viewing ports on upper rear wall of bucket to assist in positioning the leading edge for optimal operation. There is grill with mesh or screen fitted at an angle allowing visibility while preventing passage of material. Bucket (127) can be equipped to receive high frequency vibrators. This will allow the application of vibration to the bucket causing media particles to be released from the solids being retrieved. Bucket (127) is provided with point of attachment to tractor (for example: articulated, 4 wheel drive loader).

The Deskins Backwash Recovery from Plant Residuals includes solids thickening and dewatering in one vessel (filter).

The level sensor is set to allow the filling of the Filter to a high level. When the water (sludge content) reaches the established level the sensing device will send a signal to a controller that will open an electronic valve on the discharge side of the under drain. The sensing level will also be set at a shut off height which will send a signal to the electronic valve to close.

The volume of remaining solids is collected from the shut off level to the top of the sand level. This loading and discharge becomes a "Thickening zone" of the filter. The loading and draining of the filter (vessel) may occur numerous times to accumulate flocked solids and on a time schedule to achieve required pounds per sq. ft. per filter.

The clean-in-place (pre-cleaning) inlet line with valve and line can range in size from ¼ to 6 inch I.D.

Water is pumped into the under drain and exits in a 1 to 360 degree pattern. The underdrain can be slotted or drilled holes, it can have a pattern from 0 to 360 degree pattern. The pressurized water fills the voids between the stone and sand layers. Water pressure can be increased to scrub all media layers. Scrubbing means passing water around the voids of all media to remove any infiltration of solids. The top sand media layer can be displaced. This pre-saturation method also provides for the continuous leveling of the sand and will bring to the surface any compressed sludge solids which will be encapsulated during the previous loading cycle. The pre-cleaning and holding of water in the filter (vessel) also allows the filter (vessel) to be loaded to the proper fill depth and will distribute the flocked solids evenly across the filter. Once the solids have been filled to the proper level the underdrain valve will be opened (automatic/manual). The pre-cleaning water contained in the voids of the stone and sand combined with the freed water from the solids rapidly exits through the under drain line. This forms a natural vacuum which enhances the drainage of the water and the compaction of the solids from the natural vacuum process. A mechanical vacuum can be installed after the automatic/manual valve to produce a vacuum though the filter (vessel) underdrain and will act as a method of pulling the free liquid through the media layers.

The filling of water through a valve into the under drain system forces the water through the 360 degree loading surface up to and through the sand layer. If the sand is frozen, warmer water from pre-saturation will thaw the sand from underneath to the top surface. This is especially beneficial during extreme cold applications.

When loading the filter with flocked solids a head-pressure condition occurs. By opening the discharge valve on the under drains the volume of water from the sludge with the pre-saturated filter creates a natural vacuum as it exits through the round length of under drain. This vacuum draws the water through the voids between the stone and sand layers. The vacuum accelerates drainage and pulls the water from the flocked sludge causing the floc to compress to a thin layer of solids.

Flocked sludge in the thickening zone can accumulate to the desired concentration: example: 0.0001 up to 8 percent concentration. The freed water can also be removed from the filter by the use of a fixed wall decanter or a floating skimmer decanter. The water from each weir will be discharged to the effluent line. The thickened solids will be collected on the sand layer.

The decanter or baffle for thickened sludge removal can be flat, smooth surface or v-notched.

Water forced into the under drain system exits the under drain (1" to 12") through slots that are formed in the pipe in a 360 degree pattern. The pressurized water fills the voids of the stone and sand. The water exiting the filter follows the voids of the sand and stone and re-enters the under drain, through the spiral slots of the pipe in a close loop cycle.

A liner fabricated of concrete, bituminous materials, PVC, plastic, steel or any other smooth surface material directs the water into the under drain system. The under drain is placed directly on top of the liner. Sloped walls direct the exiting water to the under drain pipe allowing the water to exit in a 360 degree pattern.

Pressurized water through the under drain system rock layers allows the water to come in contact with the top layer (sand). When the sand layer is frozen, the water pressing against the sand layer thaws the sand and allows for water penetration and thawing of the sand layer. Water temperature can be natural or can be increased in degrees to excel the thawing of the sand.

A pattern of horizontal lines can be placed in the stabilization material for the purpose of assisting in the thawing of the sand layer. The lines can be manufactured of PVC, metal or any other supportive material. The lines can be filled with warmer water to act as a conduit of heat transfer. The lines can also be perforated from 1 to 360 degree to allow the exiting of warmer water, air, steam or any other suitable liquid into this thawing zone. Heat traced lines can also be installed in the transfer lines or replace transfer lines with heat trace lines.

Air can be moved across the dewatered sludge in colder climates by using vents and blowers. The moving of air across the dewatered solids provides for extended dewatering creating a freeze environment, producing granular type solids. Air can be move across the dewatered sludge in any environment causing the sludge to accelerate the extended dewatering process.

Water supply line to the polymer activation unit is equipped with (2) devices to improve polymer activation. An instant-heat device or any other water heating equipment to increase the temperature of the supply water to a higher degree will improve the activation of the polymer. A second device is installed after the first device and that unit is an electronic water softening process using the ion exchange technology or any other water softening method to hold all hardness in the flow of water and will prevent any scaling collection, etc. improving polymer activation.

The filter is a sealed vessel on the walls, entrance and exit ramps and bottom. Anchors around the entire parameter of the entire Filter (vessel) fastens the drainage panels in a permanent position.

Bucket for retriever modified with slots in bottom to allow discharge of sand during retrieval procedure. Bucket modification to include one or more (2 preferred) viewing ports on upper rear wall of bucket to assist in positioning the leading edge for optimal operation. Grill with mesh or screen fitted at an angle allowing visibility while preventing passage of material. Bucket will be equipped to receive high frequency vibrators. This will allow the application of vibration to the entire bucket causing media particles to be released from the solids being retrieved. Bucket provided with point of attachment to tractor (for example: articulated, 4 wheel drive loader).

1. Level sensor. The level sensor monitors the level of the slurry (sludge) accumulated in the filter vessel and signals the filtrate control valve to open or close as programmed to maintain optimum operating parameters.

2. Filtrate Control valve. An automated valve installed on the underdrain (filtrate) line to control the release of the filtrate water. Automation of the valve may be electrically actuated.

3. Thickening. Controlled release of the filtrate during the fill cycle allows for continuous operation of the filter, allowing the dilute solids to be concentrated or thickened on top of the granular filter media.

4. Passive cleaning and pre-saturation. A pipe ranging in size from <1" to 6" ID with a control valve (manual or automatic) connected to the filtrate or underdrain line upstream of the filtrate control valve allows clean water to flow in a reverse direction into the underdrain line, thus filling (pre-saturating) the filter from beneath the granular filter media. The effect is to raise any dried solids which were not removed during the removal process, preventing them from migrating into the media and eventually causing a reduction in flow through the media. A concomitant benefit is the improved distribution of the slurry over the saturated filter media. Pre-saturation has been a feature of the Deskins Quick-Dry Filter™ process to improve the distribution of sludge in batched dewatering processes. The difference is that in continuous filtering or thickening, there is a greater tendency for the filtrate to carry solids into the filter media. This method of presaturation provides the passive cleaning necessary to prevent this from occurring.

5. Conditioning the filter. In cold climates where the Backwash Recovery Filters are exposed to ambient conditions, the filter media may freeze before the filter is put into use. Presaturation will thaw the frozen media, allowing the filter to operate as intended.

6. Heat exchanger. An alternative method of thawing the filter media. Adding self-regulating electric heat cable such as Chemelex™ (manufactured by Raytheon), or fluid filled radiant heat piping installed into either of the top two media layers.

7. Freeze drying. An option available in very cold (less than 15 degrees F.) weather. Whether the Deskins Backwash Recovery™ filter is sheltered, enclosed, or not, the drained sludge is allowed to freeze and then cold air is blown across the filter (using blowers or fans), resulting in sublimation or "freeze drying". The sludge dries overnight at 65% dry solids or higher.

8. Enhanced Polymer Activation. The Deskins Quick-Dry™ Process has always included a polymer activation system and RapidFloc™ mixer for adding polymeric flocculants to the sludge. This enhancement includes the addition of an electronic water conditioner on the polymer dilution water. The electronic water conditioner enhances the solubility of polymer in water, meaning a more rapid activation of the polymer, resulting in less polymer required in the process.

9. Tankless Water Heater. All chemical processes are affected by temperature. The activation of emulsion polymers occurs more favorably between 60-90 degrees F. Therefore, Deskins is incorporating a water heater (such as an in-line tankless water heater) or heat exchanger on the dilution water line to maintain optimum dilution water temperature for polymer activation.

10. Decanting. A procedure to accelerate the removal of clarified water from the filter vessel by drawing water from the surface over a weir and into a receptacle having an outlet connected directly to the underdrain. This decanter is mounted to the die of the filter vessel and can be adjusted to operate at any elevation 6" above the filter media up to the overflow weir into the next adjacent filter. The decanter weir can be straight or notched.

11. Water recovery. The Quick-Dry™ Process is most often used in wastewater applications where filtrate water is still not suitable for release into the environment, so it is returned to the head of the wwtp for further processing. Because this water is not yet usable, there was no need to isolate the filtrate from other sources of water being returned to the head of the plant (sometimes, the filtrate may drain directly into the headworks pumping station). Because the filtrate water from the Deskins Backwash Recovery System™ is to be processed into potable water, the filtrate is directed into a dedicated pump station to be returned to the influent chamber of the treatment plant. Because of this, the entire filter vessel, including entrance and exit ramps is a collection vessel for rainwater, adding to the volume of water ultimately recovered (10" of rainfall over 10,000 square feet of basin yields 62,330 gallons of recovered water).

12. Zero Discharge. Because all water released from the solids is captured, the Deskins Backwash Recovery System™ is, by definition, a "Zero Discharge Process." The only water lost in the process is that which is lost to evaporation (approximately 1.0 gallon per square foot per filter cycle).

13. Removal of Dewatered solids. Deskins has improved the removal process by modifying the bucket mounted on the front of a small front end loader or tractor. These modifications include slots (typically ½" on 1½" centers) cut into the bottom of the bucket and extending from front to back to allow any sand which may be picked up to be sifted back into the filter. Viewing ports or windows (2 preferred) are also cut into the back of the bucket to provide a clear viewing path from the operator's seat to the front edge of the bucket so the operator can see the angel at which the bucket is presented to the sludge, to prevent retrieving too much sand.

Figure 1:
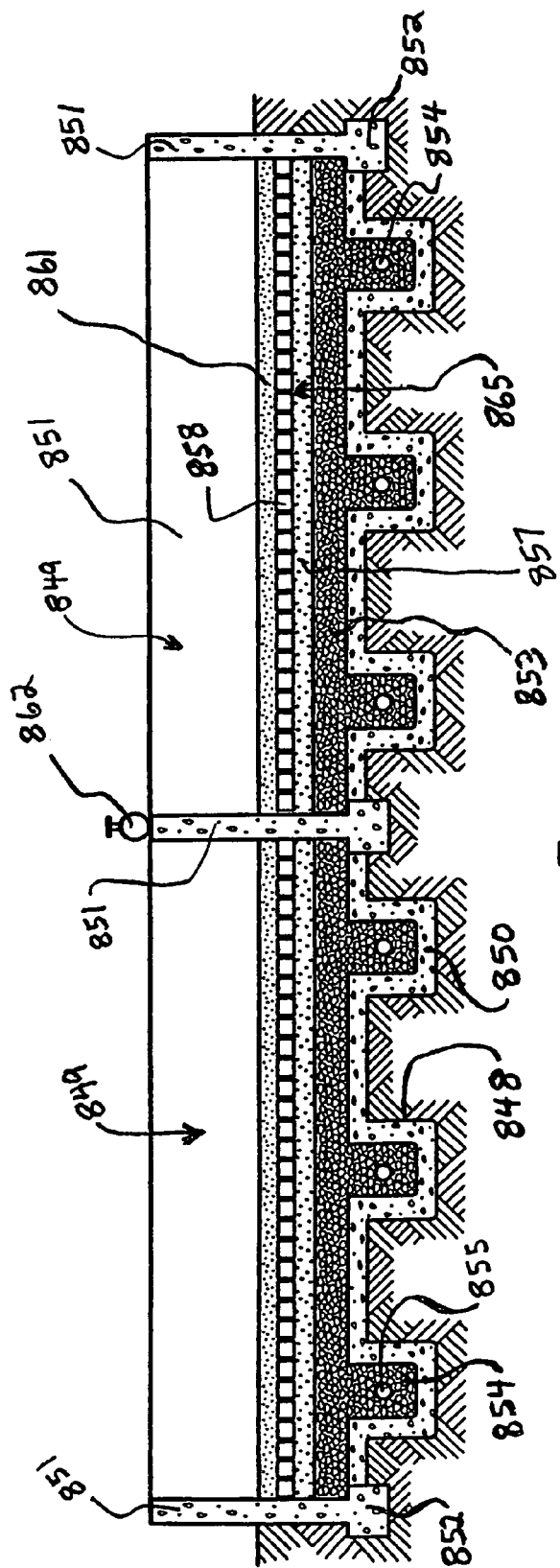
FIG. 1 is a front elevational view of a vertical cross-section of the prior art filter set-up, disclosed in U.S. Pat. Nos. 6,051,137, 5,770,056, 5,660,733, 5,683,583, 5,725,766 and 5,611,921, including a layer of sand, a sand-cell media in the sand layer, a porous (e.g., stones of pebbles) layer, non-porous pipes having holes therein, and a non-porous bottom layer.

With regard to the previous Deskins process-scheme, see FIG. 1. Enclosure 849 contained a sand bed. Onto layer of non-porous material (850), e.g., concrete, a layer of porous material (853) was positioned. Porous material (853) was used as a filter media and usually stone, crushed rock, ceramic shapes, slag and plastics of 1 to 6 inches, practically 2 to 4 inches, in size were used. Stones or pebbles were preferred. At least one—usually more than one—projection of porous material (854) extended from the porous layer (853) into the layer of non-porous material (850). Embedded in each projection channels (848) in porous material (854) was at least one non-porous pipe (855) having at least one hole into which liquid can drain. A layer of sand (857) was positioned above the layer of porous materials (853). The sand-cell media sections (865) were positioned above this layer of sand (857). Sand was located in the passageways in the sand cell grid. Above each sand-cell media section (865) was placed in a layer of sand (861). This layer of sand (861) was usually, through not necessarily, at least six inches in depth.

Walls (851) surround on all four sides of an area having one or more sand-cell media sections. One wall (851) was shorter to allow a front loader or the like into the enclosure. Each surrounding, dividing wall (851) extends upward from one or more footing supports (852) which were positioned, at least partially, in the layer of non-porous material (850). The top of each dividing wall (851) extended above the layer of sand (861) overlaying the sand-cell media section(s). On the top of each dividing wall (851), which runs between two enclosure areas having the sand-cell media sections, was a portable nozzle which was used to pour sewage into the enclosures.

Each sand-cell media section (865) was made up of one or more sand-cells (858) having the same shape and size. Typically, the sand-cell media section (865) was made up of honeycomb-shaped sand-cells (858) which are joined together in a honeycomb formation (i.e., each sand-cell which is not in an outer layer, where it intersects another sand-cell, it intersects three other sand-cells) channel runs through the interior of each sand-cell.

Sewage was poured through the channel into one or more enclosures (849) for the sand beds. The liquid permeated the outer sand layer, flowed through the sand in the channels in the grid (865) in the centers of the sand-cells, permeated the layer of sand beneath the sand-cell media and permeated the pebble layer beneath the layer, leaving the collected sludge solids on top of the outer sand-layer to dry from the sun and air.

Figure 21:
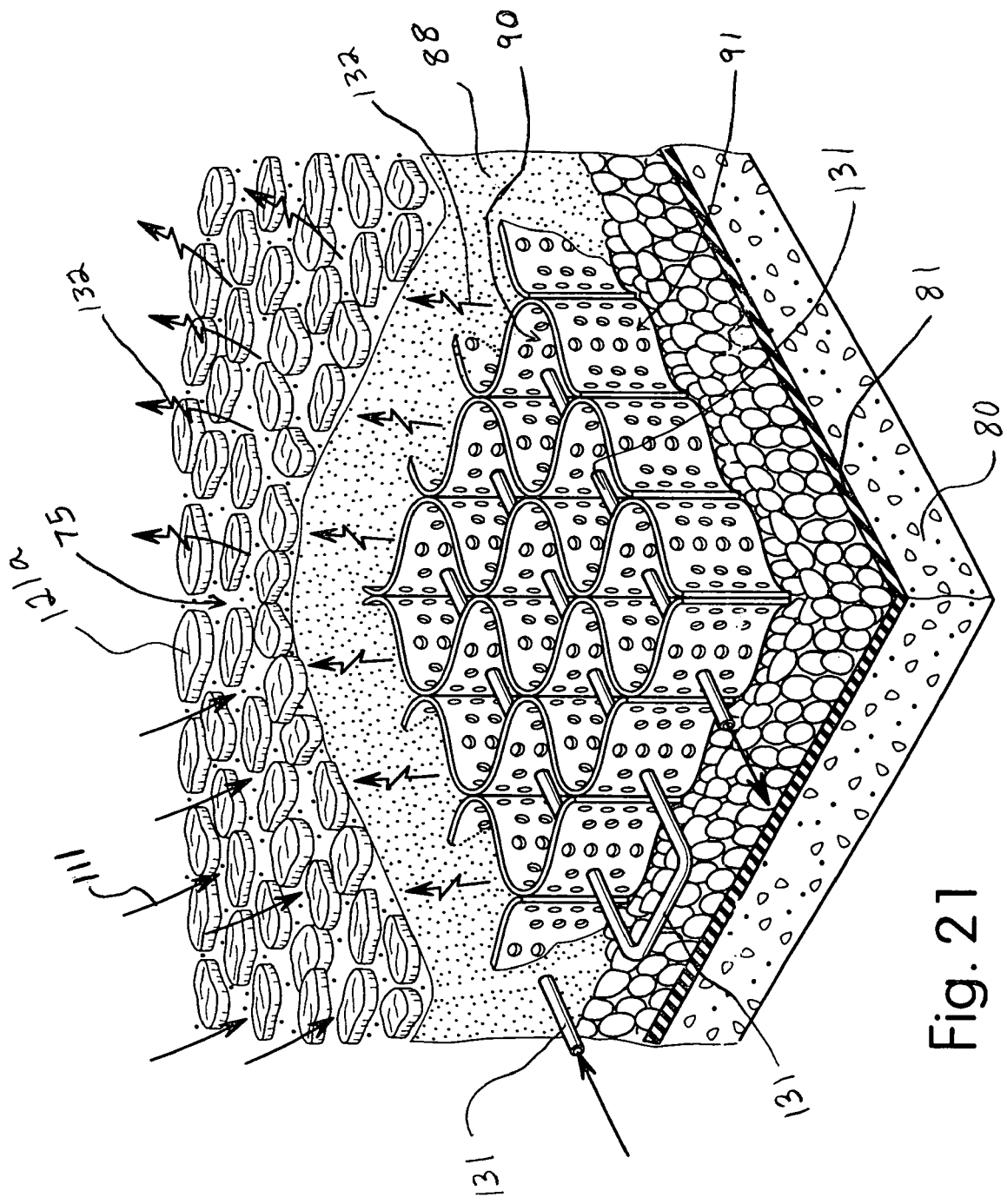
FIG. 21 is a cutaway and vertical cross-sectional perspective view of part of the filtration system.

In FIG. 21 pipe 131 is located in a back and forth (horizontal) pattern whereby pipe (131) preferably passes through all of individual cells (90) of cell media section (91). Within the scope of the invention is pipe (131) passing only through only some or a portion of the individual cells (90) of cell media section (91).

This embodiment of the invention is to pass liquid of sufficient temperature to keep the granular filter media (118) from freezing or being at such a low temperature that impedes downward movement of water (111), or to thaw granular filter media (118). Melted water (132) evaporates off; when starting a round of filtration cycles, the invention allows pre-cleaning water (132) to pass through to top surface (75). The liquid passed through pipe 131 is preferably water, and preferably heated water, but any other suitable heated or unheated liquid (e.g., antifreeze or salt water) can be used. The liquid passed through pipe (131) should be of sufficient temperature to prevent freezing of granular filter media (118) during operation of Deskins backwash recovery system (57), or just to raise the temperature of granular filter media (118) so as to improve the filtration function thereof.

Figure 14:
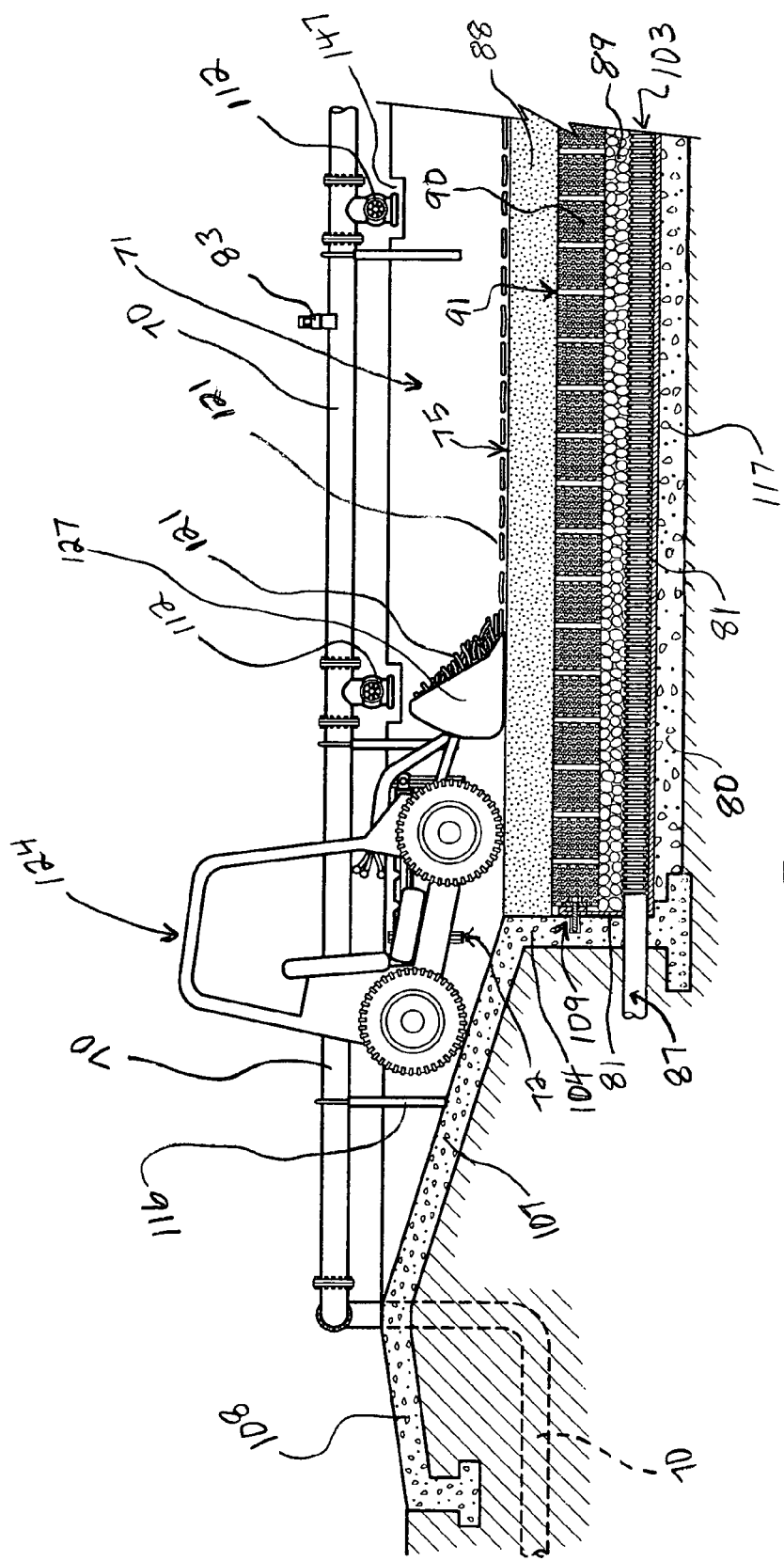
FIG. 14 is a side elevational view of a cross-sectional view of the front end loader operating on and removing sludge from top of the sand layer of the invention.
Figure 19:
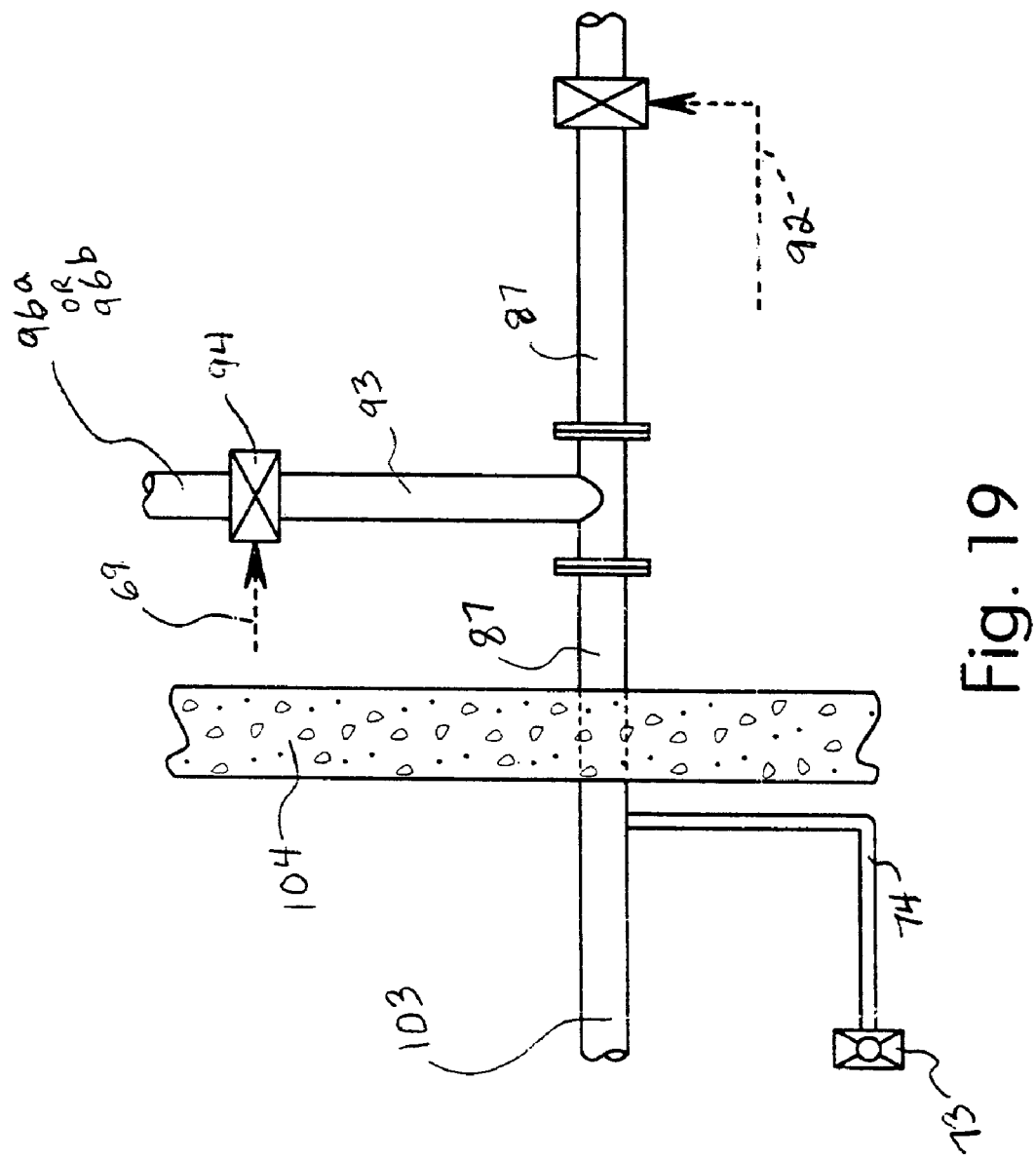
FIG. 19 is a partial top view of the drain piping and associated piping.
Figure 20:
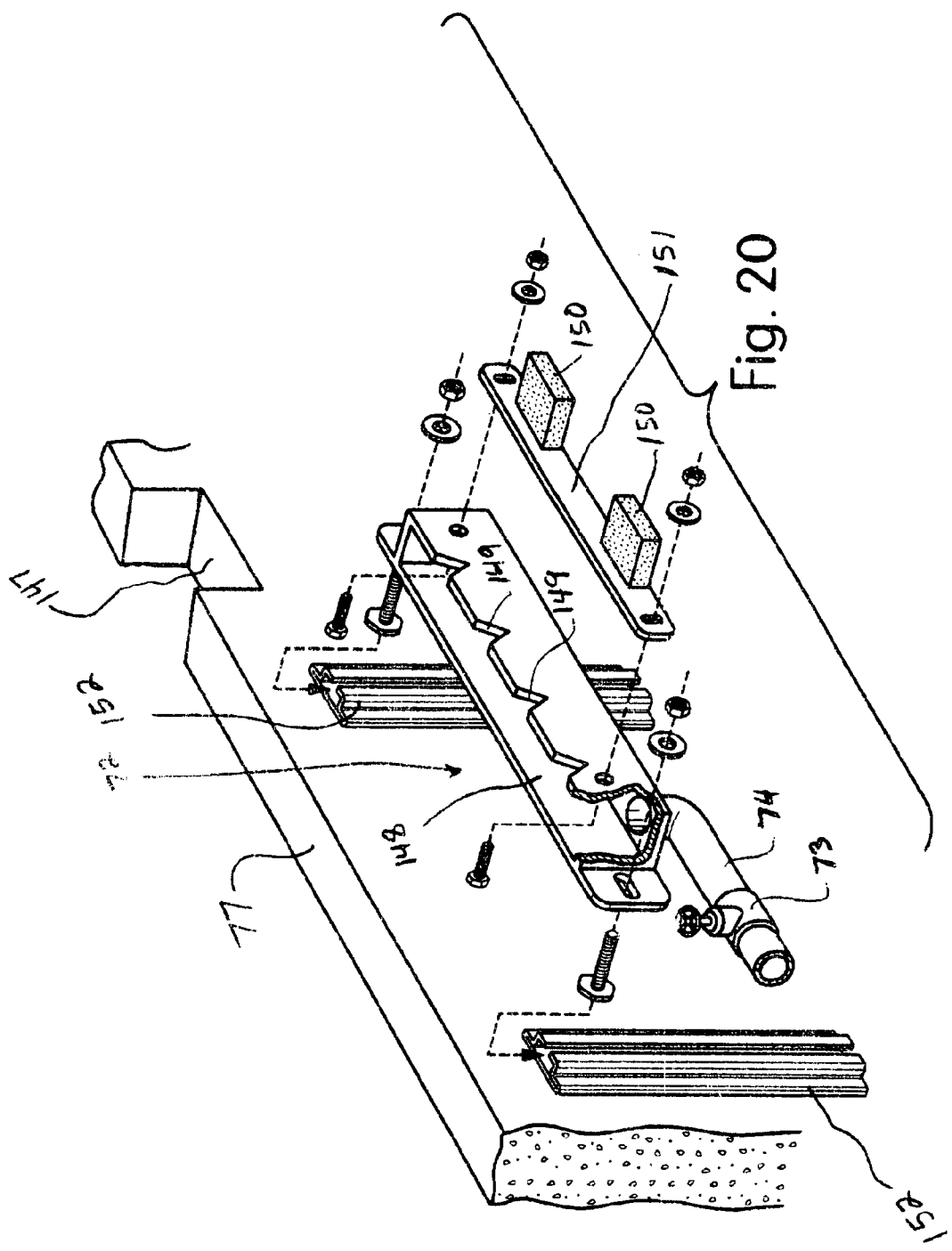
FIG. 20 is an exploded perspective view of the decanter assemblage.

FIG. 14 shows filtrant (121) being removed from surface (75) of filter sand (88). Front loader (124) can easily access and depart containers/enclosures (71) by means of front end slopes (107) and (108) and/or back end slopes (122) and (123). Front loader (124) can readily and easily be driven on surface (75) of granular filter media (118) due to the presence therein of cell media section (91). Bucket (127) easily scoops up filtrant sections (121) from surface (75) with minimal amount of filtrant sand (88).

Figure 30:
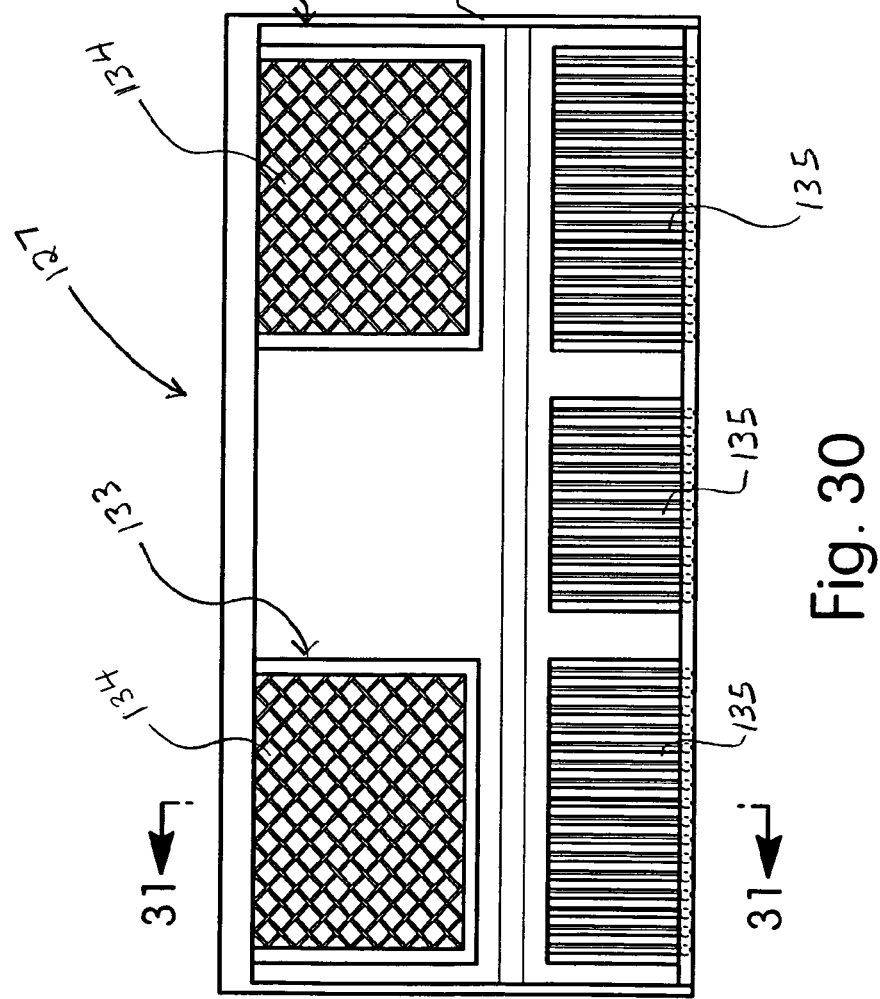
FIG. 30 is a front elevational view of the bucket of the invention.
Figure 31:
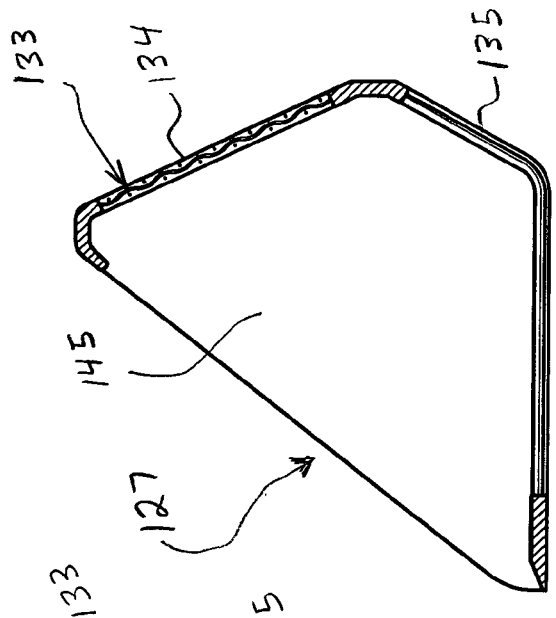
FIG. 31 is a vertical cross-sectional view of the bucket along line 31-31 in FIG. 30.

Bucket (127) is shown in detail in FIGS. 30 and 31.

Bucket (127) is preferably constructed of steel to hold a capacity of 18 cu. ft. when loaded from the bottom to the angular top. Any other suitable construction material and suitable bucket capacity can be used. Two view ports (133) are installed on the back with one on each side located in the upper portion of the bucket (127). [12"×16"×⅝"×⅝"×45° angular screens (134) are preferred for each view port (133)]. This allows the operator to view the cutting edge of the bucket (127) from the seated position of the tractor (124) and the screen (134) protects the solids from spillage. The bottom of the bucket (127) extending from the cutting edge, to say, ⅓ of the vertical pitch is fabricated from ⅝ inch steel bars (135) spaced evenly across the bottom with a spacing of ⅝ inch. The spacing of between steel bars (135) can be any suitable distance that allows collection of filtrant sections (121) and allows passage of filtrant sand (88). Bars (135) can be constructed of any suitable material and have any suitable thickness—both items are governed to the extent that sufficient strength requires. Two flat metal straps (not shown) preferably are added evenly spaced to the bottom of bucket (127) for extra strength. Side (144) and the side profile of bucket (127) is shown in FIG. 33.

Figure 34:
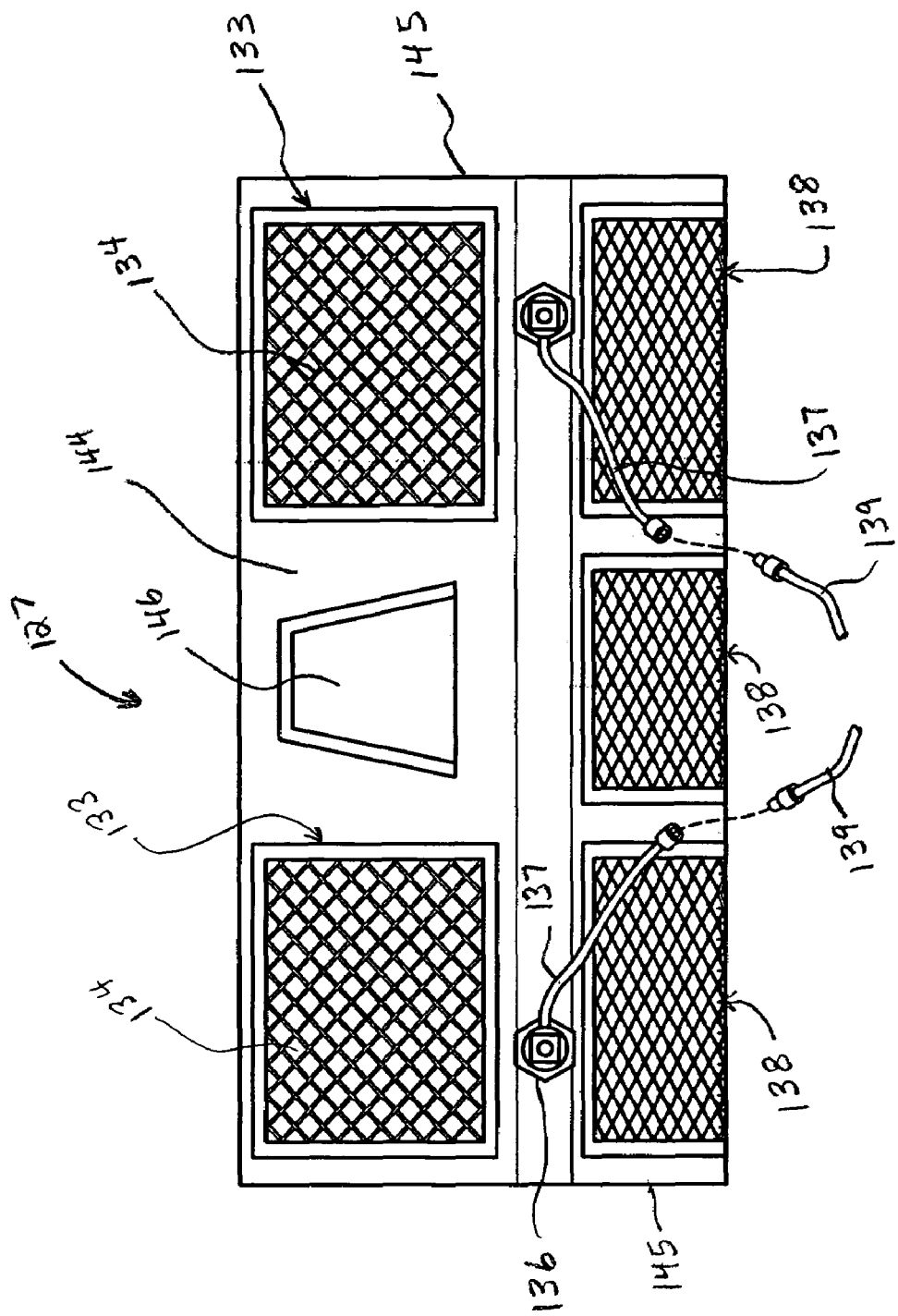
FIG. 34 is a back elevational view of the bucket of the invention.

As shown in FIGS. 32, 32A and 34, metal screen (138) can be used in place of each set of evenly-spaced bars (138). See metal screen (138) typically has spaces/openings of ¼ inch by ½ inch, however any suitable opening size can be used that allows collection of filtrant sections (121) and passage of filtrant sand (88) through screen (138).

On the back side of bucket (127) on the flat portion, two hydraulic vibrators (136) are attached (preferably with bolts). See FIGS. 33 and 34. Vibrators (136) are usually fabricated from hardened steel with brass rings and steel rotor. Hydraulic oil is pumped from auxiliary pump (not shown) on tractor (124) through high pressure hose (137) which enters into the vibrator (136). By the use of a bypass valve the hydraulic fluid moves the rotor in an unbalanced design to cause a vibration (for example, 22,000 rpm). Connection lines (139) between tractor (124) and vibrators (136) a spring-loaded male/female connector on both ends to prevent seal leakage. If desired, one vibrator (136) or three or more vibrators (136) can be used. Attachment plate (146) on the back of bucket (127) provides attachment means to tractor/front loader (124). The high frequency vibration loosens and separates the retrieval sand particles from the solids (the sand falls through the screens or bars).

Figure 12:
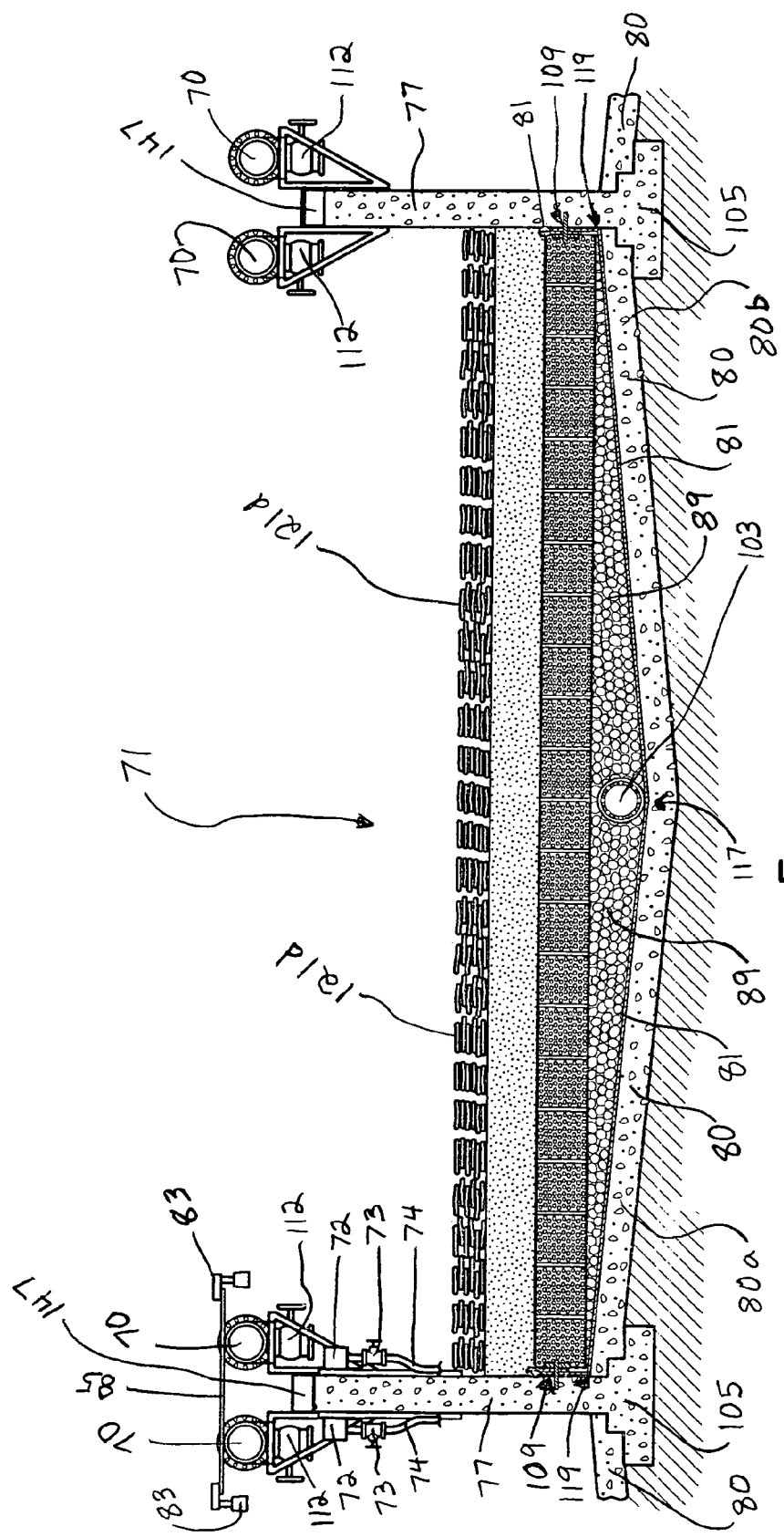
FIG. 12 is a front elevational view of a cross-sectional view, as indicated in FIG. 4, with the granular filter media present, with the last cycle of the process completed.
Figure 13:
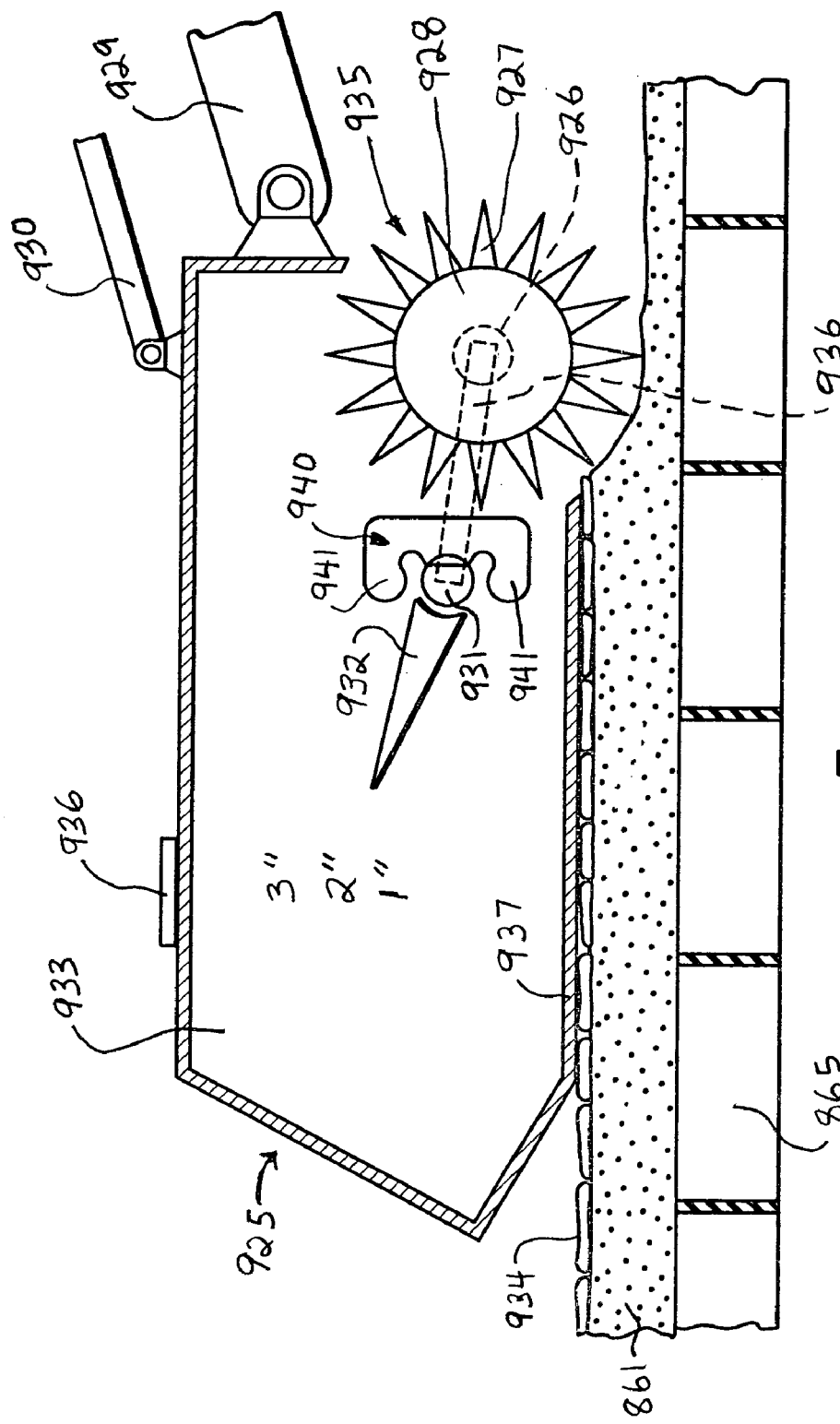
FIG. 13 is a side elevational view of the sludge retriever, of the previous Deskins process-scheme, operating on the top of a sludge drying sand bed which includes sand-cell media.

With regard to the previous Deskins process-scheme, see FIG. 13 Sludge retriever (925) was used to separate the dried sludge layer (934) from the sand (861) in the sand bed. An upper pivoted arm (930) was attached to a front-end loader, as was a lower pivoted arm (929). The other end of each of these pivoted arms was attached to a two cubic yard bucket/hopper (933). The lower side (937) of the bucket/hopper (933) slides along the sand bed slightly above or on the layer of dried sludge (934) being retrieved. The lower, front end (938) of this bucket/hopper (933) was upwardly slanted relative to the rest of the lower end. At the lower back end of the bucket/hopper was attached a rotary drum (935) including a shaft (926) around which a rotary (928), from which multiple raw of three inch tines/teeth (927) project, turned. As the rotary drum (935) turned (clockwise), pieces of dried sludge (934) and minimal amounts of sand (61) were tossed into the bucket/hopper (933). An arm (932) was attached to a ball pivot (931) which had a short arm (939) welded onto the end of the ball joint (931). Ball joint (931) was moved up and down in vertical slot (940) in the side retriever (925) and moved and bolted into one of the three short horizontal slots (941), whereby shaft (926) was moved up or down to the desired position. This arrangement (not shown) was repeated on the other side of the retriever (925). In this matter, the height position of shaft (926) could be adjusted and accordingly the distance that vanes (927) extended below lower side (937) of retriever (925). Typically, as shown in FIG. 12, vane (927) extension levels of 1 inch, 2 inches and 3 inches, were indicated by the marks "1", "2", and "3", respectively. The one inch level was usually used to chop up the dried sludge. The 2 inch level was shown in operation in FIG. 12. The three inch level was used, when the rotation direction of rotary (928) was reversed, to aerate the sand after the dried sludge had been removed. Air flow grill or filter (936) was located in the top surface of bucket (933) near its front.

Figure 35:
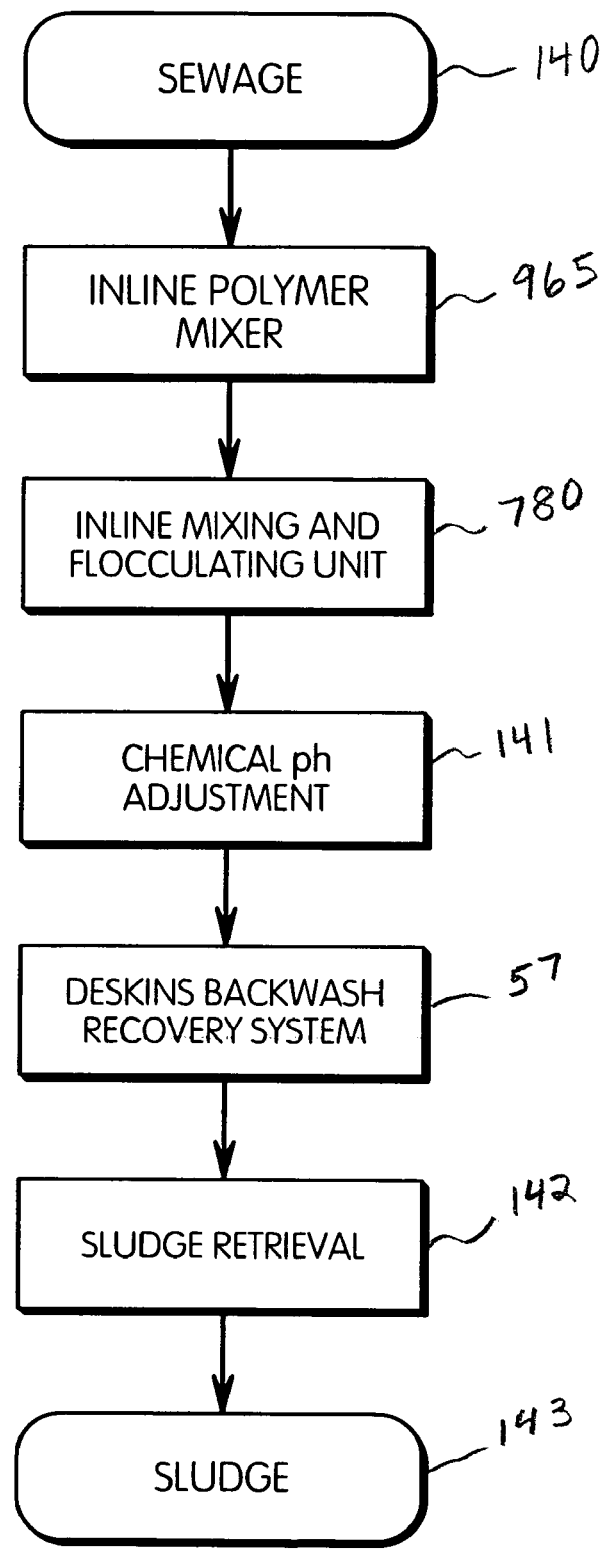
FIG. 35 is a diagrammatic scheme of a process of the invention.
Figure 36:
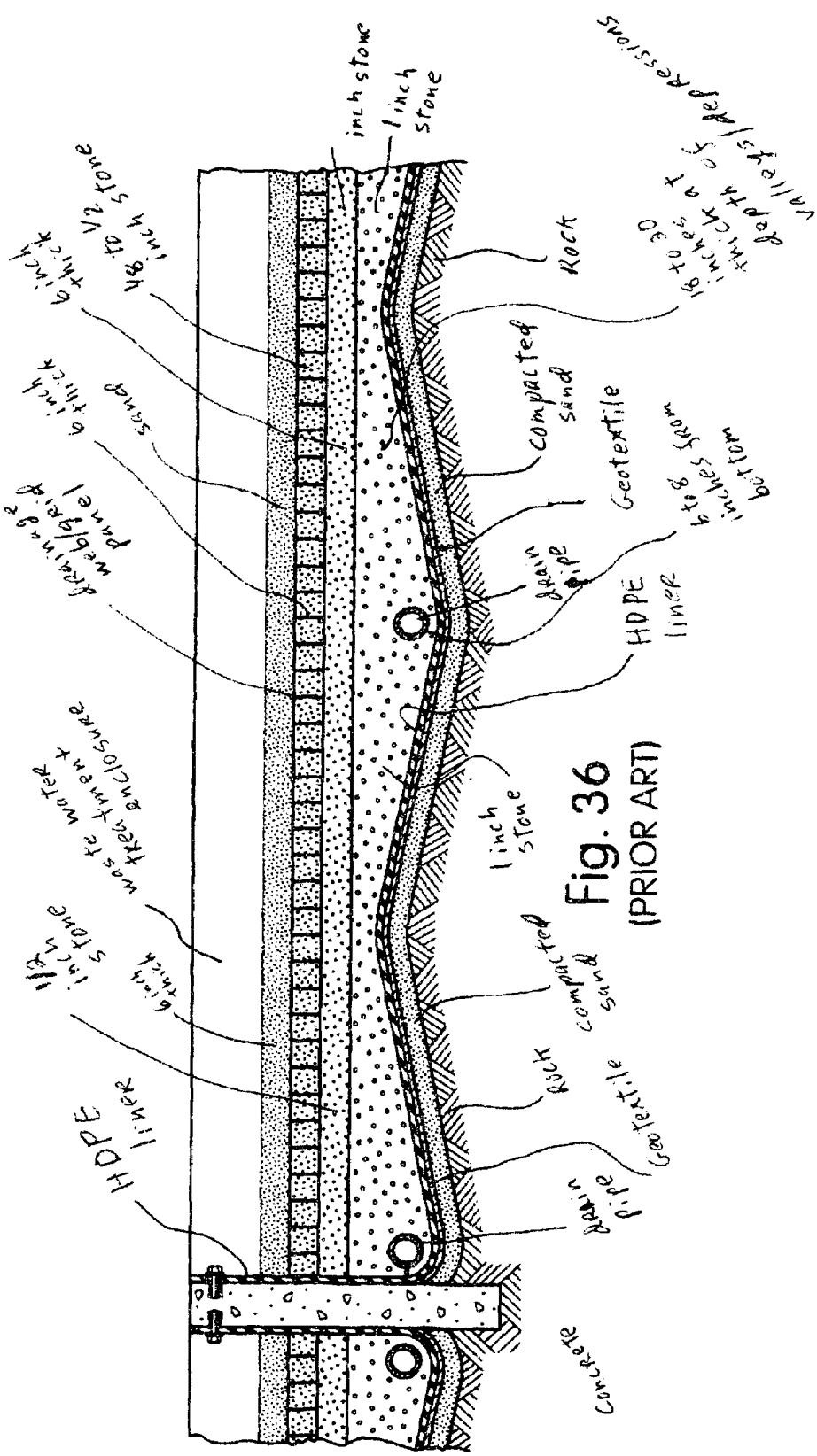
FIG. 36 is a front elevational view of a cross-sectional view of a prior art dewatering instillation.

The invention includes the process of dewatering sewage (e.g., primary- or secondary-treated sewage) that is the five step/stage process described in FIG. 35 Sewage (140) is obtained from a primary sewage treatment system, which is or includes a filtering step to remove large objects, grit and the like and a sedimentation tank step to remove suspended settleable solids, or from a secondary sewage treatment system. Activated polymer solution from inline polymer mixer (965) is injected into sewage (140) to aid in flocculation. Sewage (140) then moves into inline mixing-and-flocculating unit (780) wherein sewage (140) is mixed and flocculated to enhance chemically induced liquid-solids separation. Treated sewage (140) exiting from mixing-and-flocculating unit (780) is subjected to chemical pH adjustment (141) by the addition thereto by a base such as lime or caustic (potassium hydroxide or sodium hydroxide). The pH of sewage (140) is adjusted into the basic pH range or to a higher basic pH. Sewage (140) is then treated in Deskins backwash recovery system (57), that contains support grid (91) therein. The sequence(s) of thickening and dewatering are as described above for the treatment of water from water treatment plant (50). The insoluble solids and flocks in the sewage (140) collect on the top of fine filter sand layer (88) of granular filter media (118), and the water in the sewage (140) passes/filters through granular filter media (118). Once the solids and flocks located on top of dry, a layer(s) of dried sludge pieces (143) is obtained on top of fine filter sand layer (88) of granular filter media (118). The dried sludge pieces are then removed in sludge retrieval step (142) to provide dried sludge (143).

Where the chemical induced pH adjustment (141) of sewage (140) exiting mixer-flocculating system (780) is used, liquid caustic, lime or other suitable base is injected into the discharge side of mixer-flocculator unit (780) and the temperature of the water to inline polymer system (965) is increased, thereby increasing the liquid/solids pH balance. As the liquid/solids content exits the inline mixer-flocculator unit (780), an electronic driven diaphragm pump or gear driven pump pumps liquid caustic or lime into the discharge line of the flocculator-mixer unit (780). The pH of sludge (140) is increased to 12 by the chemical. The pH of sludge (140) will remain at 12 for 72 hours, and during this period of time, the temperature will reach 52° C. and will remain at that temperature for at least 12 hours. At the end of the 72 hour period during which the pH of sludge (140) is above 12, sludge (140) can then be air dried to achieve a percent solids of greater than 50 percent.

LIST OF PARTS NUMBERS

In connection with the figures, the following list of the names of the parts of the instant invention are noted:

| Numbers | Parts, Etc. |
|---|---|
| 50 | water treatment plant |
| 51 | raw water source |
| 52 | finished water distribution |
| 53 | water with residual solids from clarifier/blowdown |
| 54 | water with residual solids from filter backwash |
| 55 | water with residual solids reject |
| 56 | equalization (EQ) tank or solids holding tank |
| 57 | Deskins backwash recovery system |
| 58 | rainwater |
| 59 | flow of treated water from Deskins system to water treatment plant |
| 60 | EQ tank pump station |
| 61 | flow meter |
| 62 | suspended solids monitor |
| 63 | potable water line |
| 64 | electronic water conditioner |
| 65 | electronic (tankless) water heater |
| 66 | polymer drum |
| 67 | water line |
| 68 | electronic signal to polymer activation system |
| 69 | electronic signal to pre-cleaning valve |
| 70 | flocced composition pipe |
| 71 | granular filter media containers/enclosures |
| 72 | decanter |
| 73 | decanter valve |
| 74 | decanter discharge pipe |
| 75 | surface of filter sand layer |
| 76 | upper operating water level |
| 77 | non-porous (concrete) side dividing wall |
| 78 | water distribution valves |
| 79 | particles |
| 80 | non-porous (concrete) floor |
| 80a | sloped portion of concrete floor |
| 80b | sloped portion of concrete floor |
| 81 | non-porous liner |
| 82 | lower operating water level |
| 83 | water level sensor |
| 84 | sensor beam of level sensor |
| 85 | support for level sensors |
| 86 | auto valve for drain pipe |

| Numbers | Parts, Etc. |
|---|---|
| 87 | drain pipe (outside of container) |
| 88 | fine filter sand layer |
| 89 | coarse stone layer |
| 90 | cells of cell media section |
| 91 | cell media section |
| 92 | electronic signal system between water level sensor and drain valve |
| 93 | line to drain line |
| 94 | valve for pre-cleaning water line |
| 95 | line to valve |
| 96a | water plant line |
| 96b | pre-cleaning water line |
| 97 | drain line |
| 98 | filtrate recovery pump station |
| 99 | recovery water recycle line |
| 100 | treated water line |
| 101 | turbidimeter |
| 102 | treated water line to plant |
| 103 | drain pipe (inside of container) |
| 104 | front support (concrete) wall |
| 105 | footing supports for walls |
| 106 | upwards-moving pre-cleaning water |
| 107 | up-slope top of front end |
| 108 | down-slope top of front end |
| 109 | attachment of liner to wall |
| 110 | water in the container |
| 111 | plant water being inserted |
| 112 | valves for plant water insert pipe |
| 113 | electronic signal between water level sensor and intake valve |
| 114 | ribs in drain pipe |
| 115 | holes in valleys of drain pipe |
| 116 | support brackets for water pipe |
| 117 | valley in floor |
| 118 | granular filter media |
| 119 | intersection of floor and side wall |
| 120 | plant water to drain pipe |
| 121 | filtrant |
| 121a | filtrant (first filtration) |
| 121b | filtrant (second filtration) |
| 121c | filtrant (later filtration) |
| 121d | filtrant (last filtration) |
| 122 | up-slope top of back end |
| 123 | down-slope top of back end |
| 124 | front end loader |
| 125 | electronics for electronic (tankless) water heater |
| 126 | non-intrusive windings |
| 127 | front bucket |
| 128 | heated pipe coil |
| 129 | water supply line |
| 130 | electronic water conditioner |
| 131 | pipe running throughout cell media section |
| 132 | pre-cleaning water (106) passing to the top surface or melted water evaporating off (out) |
| 133 | view ports |
| 134 | screens for view ports |
| 135 | metal bars |
| 136 | hydraulic vibrators |
| 137 | high pressure hose |
| 138 | metal screens (in place of metal bars) |
| 139 | connection lines |
| 140 | sewage |
| 141 | chemical pH adjustment |
| 142 | sludge retrieval |
| 143 | sludge |
| 144 | backside of bucket |
| 145 | side wall of bucket plate |
| 146 | attachment plate of bucket to front loader (or tractor) |
| 147 | decanter slots in side separating walls |
| 148 | decanter trough |
| 149 | top side v-notches |
| 150 | floats for movable bar |
| 151 | slidable bar |
| 152 | slides |

In connection with the figures, the following list of the names of the parts of the previous Deskin process/scheme are noted:

| Numbers | Parts, etc. |
|---|---|
| 780 | mixer-flocculator units |
| 781 | input conduit (influent end of mixer); |
| 782 | flanges; |
| 783 | mixing zone 1; |
| 784 | polymer or flocculant injection lines; |
| 785 | manifold; |
| 786 | quick connect; |
| 787 | adjustable baffleplate placed at an angle; |
| 787a | pivot attachment; |
| 788 | electrical unit; |
| 789 | mixing zone 2; |
| 790 | fixed, vertical baffles; |
| 792 | fixed horizontal baffles; |
| 793 | mixing zone 3; |
| 794 | walls; |
| 796 | fixed, vertical baffle; |
| 797 | mixing zone 5; |
| 798 | recirculation baffles; |
| 799 | mixing zone 4; |
| 800 | output conduit; |
| 801 | mixer-flocculating system; |
| 802 | liquid in; |
| 805 | downflow segment; |
| 806 | bottomflow segment; |
| 807 | upflow segment; |
| 811 | recycle segment; |
| 849 | sand bed enclosures; |
| 850 | non-porous layer; |
| 851 | dividing wall; |
| 852 | support upon which dividing wall is positioned; |
| 853 | porous layer positioned directly above non-porous layer; |
| 854 | projection of porous layer; |
| 855 | non-porous pipe; |
| 857 | layer of sand underlaying sand-cell media section; |
| 861 | layer of sand overlaying sand-cell media section; |
| 866 | ? |
| 925 | sludge retriever; |
| 926 | shaft; |
| 927 | multiple 3 inch tines/teeth; |
| 928 | rotary; |
| 929 | lower pivoted arm attaching sludge retriever to front-end loader; |
| 930 | upper pivoted arm attaching sludge retriever to front-end loader; |
| 931 | ball pivot; |
| 932 | arm; |
| 933 | two cubic yard bucker/hopper; |
| 934 | dried sludge; |
| 935 | rotary drum; |
| 936 | air flow grill or filter |
| 937 | lower side; |
| 940 | vertical slot; |
| 941 | short horizontal slots; |
| 965 | polymer mixing-feeding system; |
| 966 | tube; |
| 967 | inner chamber; |
| 968 | vessel; |
| 969 | retention chamber; |
| 970 | exit tube; |
| 972 | tube; |
| 973 | water-polymer mixing unit; |
| 974 | check valve; |
| 975 | hollow shaft; |
| 976 | aspirator; |
| 977 | motor; |
| 978 | seal; |
| 979 | check valve; |
| 980 | ball valve; |
| 981 | flow indicator; |
| 982 | thin filming process. |

What is claimed is:

1. A process of dewatering a composition composed of water and particulate solids, comprising applying at least once some of the composition to a top surface of a granular filter media of a dry cell, filter or bed, the granular filter media dry cell, filter or bed comprises a non-porous container having an exit for water and having side walls and a bottom, the bottom having two complementary portions that slant downward toward each other so as to form a valley or depression where the two complementary portions meet, a non-porous liner located on inner surface of the bottom, a drain pipe located on or near top of the liner in the valley, one end portion of the drain pipe extending through the exit, remainder of the drain pipe having a multitude of small openings around at least a major portion of circumference thereof, a porous layer of a large filter media is located in the bottom of the container with the drain pipe being located in the layer of large filter media, a grid providing surface and subsurface bed stabilization having open passageways is located on top of the layer of the large media, a fine filter media is located in the open passageways of the grid, and a porous layer of filter sand is located on top of the grid, wherein the large filter media, fine filter media, and filter sand have an effective gradation to allow particulate solids to collect on the top surface of the granular filter media, whereby the water is removed from the composition by passing of the water through the granular filter media of the dry cell, filter or bed with the particulate solids in the composition collecting on the top surface of the granular filter media, and removing the water from the container through the drain pipe and exit.

2. The process of claim 1, wherein a sequence of applying the composition is done at least twice.

3. The process of claim 1, wherein a sequence of applying the composition is done five or six times.

4. The process of claim 1, wherein the porous layer includes a top layer of carbon, or a mixture of carbon and the filter sand.

5. The process of claim 1, wherein there is a 95 percent reduction in energy costs compared to mechanical dewatering equipment/processes.

6. The process of claim 1, wherein rainwater is collected in the container and passed into water in a water treatment plant.

7. The process of claim 1 comprising a sequence of applying the composition to the granular filter media of the dry cell, filter, or bed in each of at least two of the containers, to dewater the composition.

8. The process of claim 7, wherein the sequence of applying the composition is done at least twice.

9. The process of claim 7, wherein the sequence of applying the composition is done five or six times.

10. The process of claim 1, wherein recycling of effluent water from residual solids processed through the granular filter media dry cell, filter or bed to a water treatment plant produces a "zero discharge", closed loop cycle.

11. The process of claim 1, wherein effluent being discharged from the granular filter media dry cell, filter or bed contains turbidity of 2 NTU or less due to proper flocculation and media filtration.

12. The process of claim 11, wherein the flocculation includes a wherein proper polymer activation using a polymer activation process improved by the addition of an inline electric or gas water conditioner and/or a tankless water heater causing softening and/or heating the make up water to the polymer activation process.

13. A process of dewatering a composition composed of water and particulate solids, comprising:

(a) mixing the composition with a coagulant or flocculant aid;
(b) mixing and flocculating the composition from step (a), to provide flock-rich composition;
(c) chemically adjusting the pH of the flock-rich composition of step (b) into the basic pH range or to a higher basic pH; and
(d) conducting a sequence of applying at least once some of the flock-rich composition of step (c) to a top surface of a granular filter medium of a granular filter media dry cell, filter or bed, the granular filter media dry cell, filter or bed comprises a non-porous container having an exit for water and having side walls and a bottom, the bottom having two complementary portions that slant downward toward each other so as to form a valley or depression where the two complementary portions meet, a non-porous liner located on inner surface of the bottom, a drain pipe located on or near top of the liner in the valley, one end portion of the drain pipe extending through the exit, remainder of the drain pipe having of multitude of small openings around at least a major portion of circumference thereof, a porous layer of a large filter media is located in the bottom of the container with the drain pipe being located in the layer of large filter media, a grid providing surface and subsurface bed stabilization having open passageways is located on top of the layer of the large media, a fine filter media is located in the open passageways of the grid, and a porous layer of filter sand is located on top of the grid, wherein the large filter media, fine filter media and filter sand have an effective gradation to allow particulate solids to collect on the top surface of the granular filter media, whereby the water is removed from the composition by passing of the water through the granular filter media of the dry cell, filter or bed with the particulate solids in the composition collecting on the top surface of the granular filter media, and removing the water from the container through the drain pipe and exit.

14. The process of claim 13, wherein the sequence of applying the composition and backflushing with water is done at least twice.

15. The process claim 13, wherein the sequence of applying the composition and backflushing with water is done five or six times.

16. The process of claim 13, wherein the granular filter media is backwashed with water, the backwash water are removed, the particulate solids on the top surface of the granular filter media is dried and the dried particulate solids are removed from the top surface of the granular filter media.

17. A process of dewatering a composition composed of water and particulate solids, comprising applying at least once some of the composition to a top surface of a granular filter media of a dry cell, filter or bed, the granular filter media dry cell, filter or bed comprises a non-porous container having an exit for water and having side walls and a bottom, the bottom having two complementary portions that slant downward toward each other so as to form a valley or depression where the two complementary portions meet, a non-porous liner located on inner surface of the bottom, a drain pipe located on or near top of the liner in the valley, one end portion of the drain pipe extending through the exit, remainder of the drain pipe having of multitude of small openings around at least a major portion of circumference thereof, a porous layer of a large filter media is located in the bottom of the container with the drain pipe being located in the layer of large filter media, a grid providing surface and subsurface bed stabilization having open passageways is located on top of the layer of the large media, a fine filter media is located in the open passageways of the grid, and a porous layer of filter sand is located on top of the grid, wherein the large filter media, fine filter media and filter sand have an effective gradation to allow particulate solids to collect on the top surface of the granular filter media, whereby the water is removed from the composition by passing of the water through the granular filter media of the dry cell, filter or bed with the particulate solids in the composition collecting on the top surface of the granular filter media, removing the water from the container through the drain pipe and exit, and using a front loader that has bucket attachment to remove solids with slots in the bottom to allow the discharge of sand during a retrieval process, two viewing ports on upper wall are of an angular metal, and two high frequency vibrators attached to the bucket to assist in the separation of sand from the solids during the retrieval process.

18. A process of dewatering a composition composed of water and particulate solids, comprising applying at least once some of the composition to a top surface of a granular filter media of a dry cell, filter or bed, the granular filter media dry cell, filter or bed comprises a non-porous container having an exit for water and having side walls and a bottom, the bottom having two complementary portions that slant downward toward each other so as to form a valley or depression where the two complementary portions meet, a non-porous liner located on inner surface of the bottom, a drain pipe located on or near top of the liner in the valley, one end portion of the drain pipe extending through the exit, remainder of the drain pipe having of multitude of small openings around at least a maior portion of circumference thereof, a porous layer of a large filter media is located in the bottom of the container with the drain pipe being located in the layer of large filter media, a grid providing surface and subsurface bed stabilization having open passageways is located on top of the layer of the large media, a fine filter media is located in the open passageways of the grid, and a porous layer of filter sand is located on top of the grid, wherein the large filter media, fine filter media and filter sand have an effective gradation to allow particulate solids to collect on the top surface of the granular filter media, whereby the water is removed from the composition by passing of the water through the granular filter media of the dry cell, filter or bed with the particulate solids in the composition collecting on the top surface of the granular filter media, removing the water from the container through the drain pipe and exit, decanting to accelerate the removal of water from the filter by drawing water from the surface over a weir fixed or stationary, and into a receptacle having an outlet directly connected to an underdrain with valving control.

* * * * *